(12) United States Patent
Cassisi et al.

(10) Patent No.: US 11,618,637 B2
(45) Date of Patent: Apr. 4, 2023

(54) WORKPIECE DIVERTER STATION, CONVEYOR SYSTEM, AND METHODS FOR UTILIZING THE SAME

(71) Applicant: Android Industries LLC, Auburn Hills, MI (US)

(72) Inventors: Anthony B. Cassisi, Dryden, MI (US); Brad McMillan, Rochester Hills, MI (US); Kerry Verran, Davison, MI (US); Anthony Willard Pierce, Owosso, MI (US); John Edward Donnay, West Bloomfield, MI (US)

(73) Assignee: Android Industries LLC

( * ) Notice: Subject to any disclaimer, the term of this patent is extended or adjusted under 35 U.S.C. 154(b) by 79 days.

(21) Appl. No.: 17/198,888

(22) Filed: Mar. 11, 2021

(65) Prior Publication Data

US 2022/0289499 A1  Sep. 15, 2022

(51) Int. Cl.
*B65G 47/54* (2006.01)
*B65G 13/07* (2006.01)
*B65G 47/82* (2006.01)
*B65G 47/244* (2006.01)

(52) U.S. Cl.
CPC .............. *B65G 47/54* (2013.01); *B65G 13/07* (2013.01); *B65G 47/244* (2013.01); *B65G 47/82* (2013.01)

(58) Field of Classification Search
CPC ...... B65G 47/54; B65G 13/07; B65G 47/244; B65G 47/82
See application file for complete search history.

(56) References Cited

U.S. PATENT DOCUMENTS

| | | | | |
|---|---|---|---|---|
| 2,822,771 | A * | 2/1958 | Hale | D05B 19/00 112/65 |
| 6,746,009 | B2 * | 6/2004 | Engarto | B65H 5/023 198/457.03 |
| 7,360,638 | B2 * | 4/2008 | Ko | H01R 27/00 198/575 |
| 8,684,169 | B2 * | 4/2014 | Itoh | B65G 47/54 198/597 |
| 10,059,522 | B2 * | 8/2018 | Wargo | B65G 47/244 |
| 10,358,298 | B2 * | 7/2019 | Schroader | B07C 3/08 |
| 10,773,897 | B2 * | 9/2020 | Schroader | B65G 47/54 |
| 2022/0274786 | A1 * | 9/2022 | Miyahara | B65G 13/10 |

* cited by examiner

*Primary Examiner* — Gene O Crawford
*Assistant Examiner* — Lester Rushin, III
(74) *Attorney, Agent, or Firm* — Miller Johnson

(57) ABSTRACT

A workpiece diverter station is disclosed. The workpiece diverter station includes: a base frame; an X-direction workpiece transporter subassembly; a Z-direction lift assembly; and a Y-direction workpiece transporter subassembly. The X-direction workpiece transporter subassembly is axially fixedly supported with respect to the base frame in a Z-direction. The Z-direction lift assembly is supported by the base frame. The Y-direction workpiece transporter subassembly is connected to the Z-direction lift assembly and is axially movably supported with respect to the base frame in the Z-direction. A portion of a workpiece diverter station is also disclosed. A method for operating a workpiece diverter station is also disclosed. A method for servicing a portion of a workpiece diverter station is also disclosed.

22 Claims, 44 Drawing Sheets

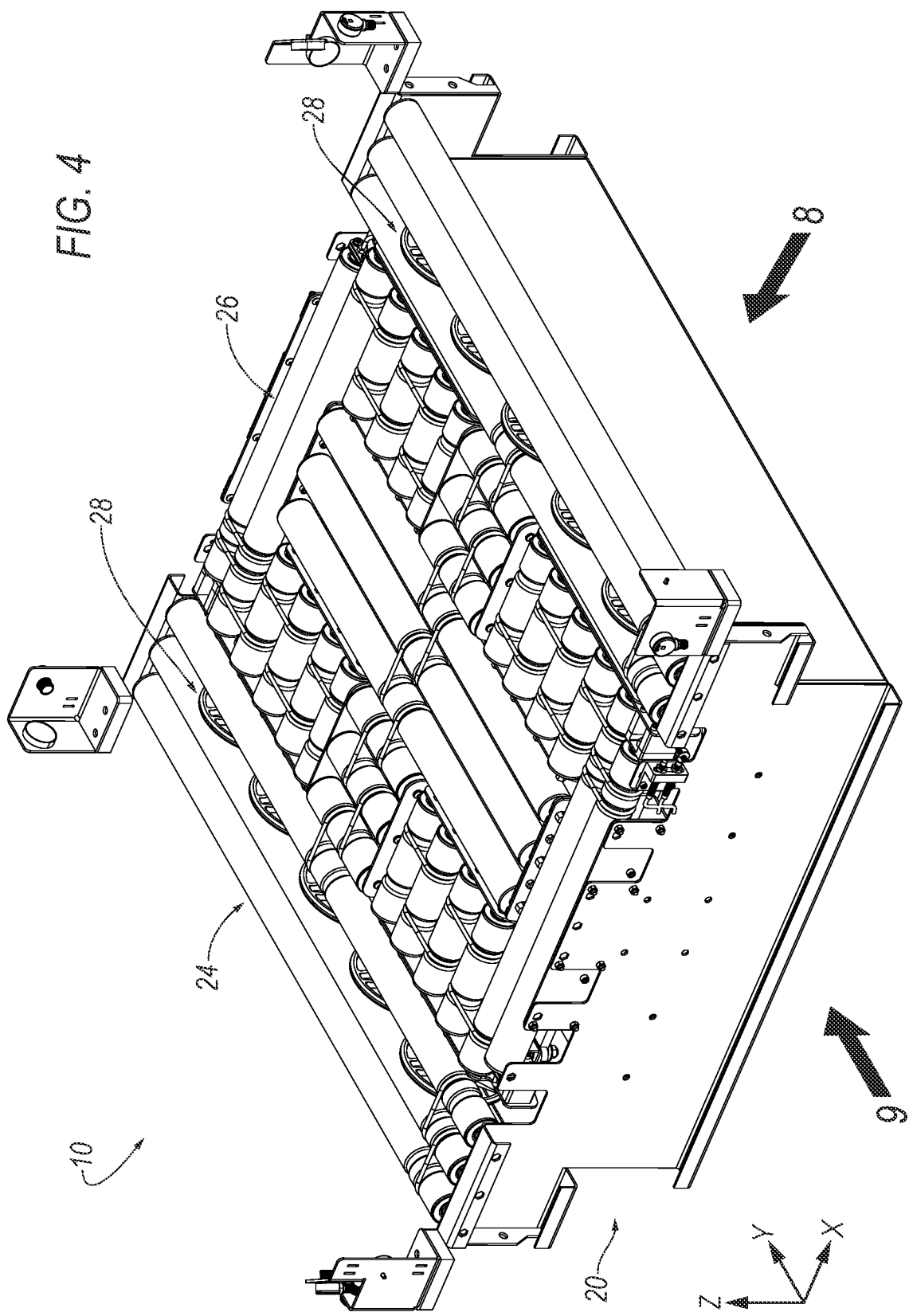

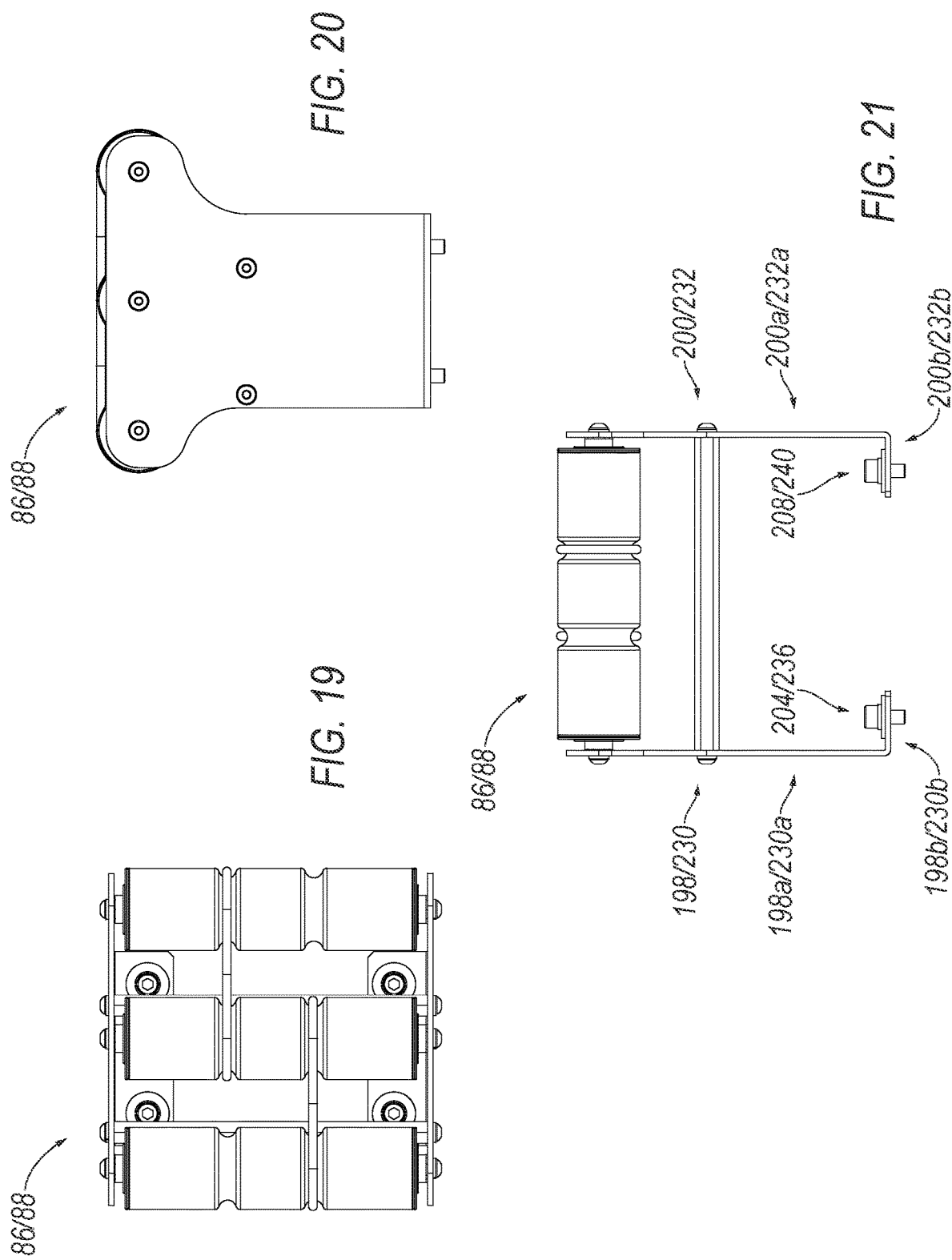

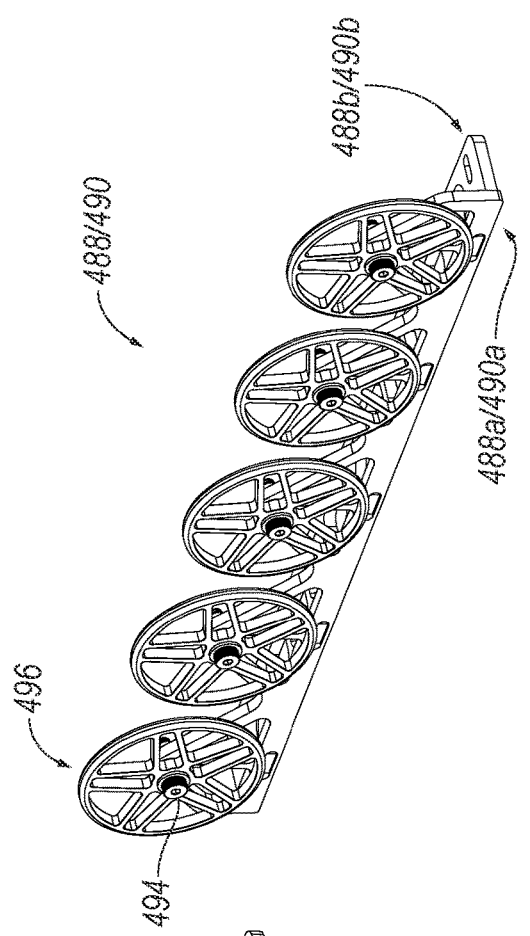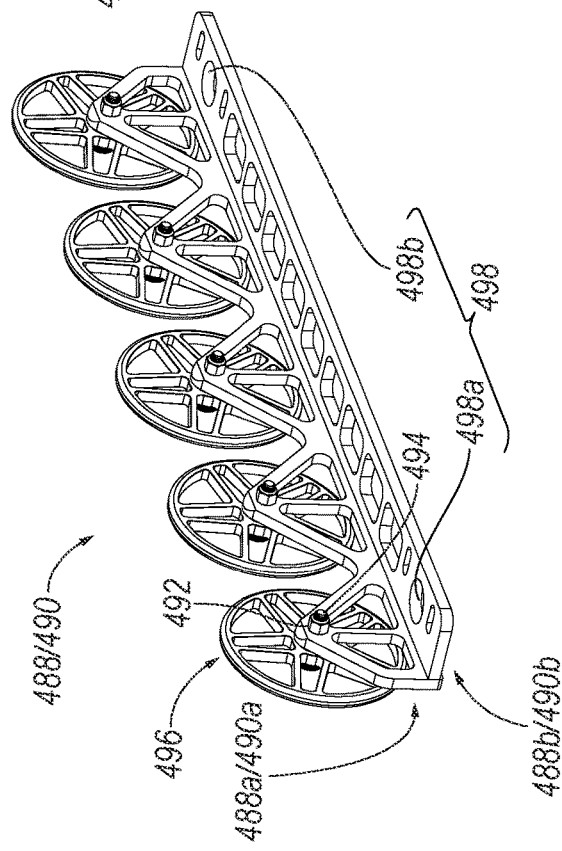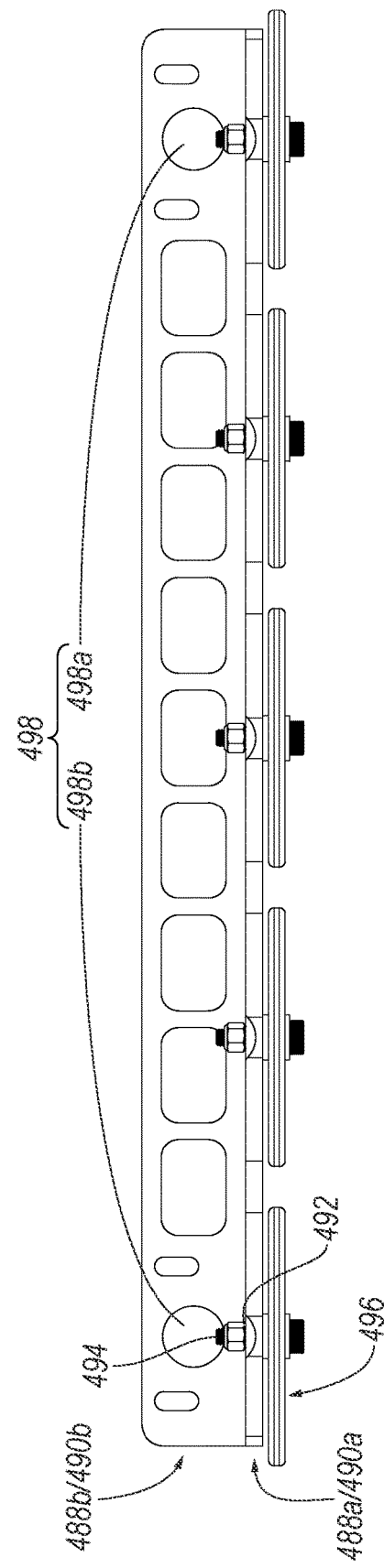

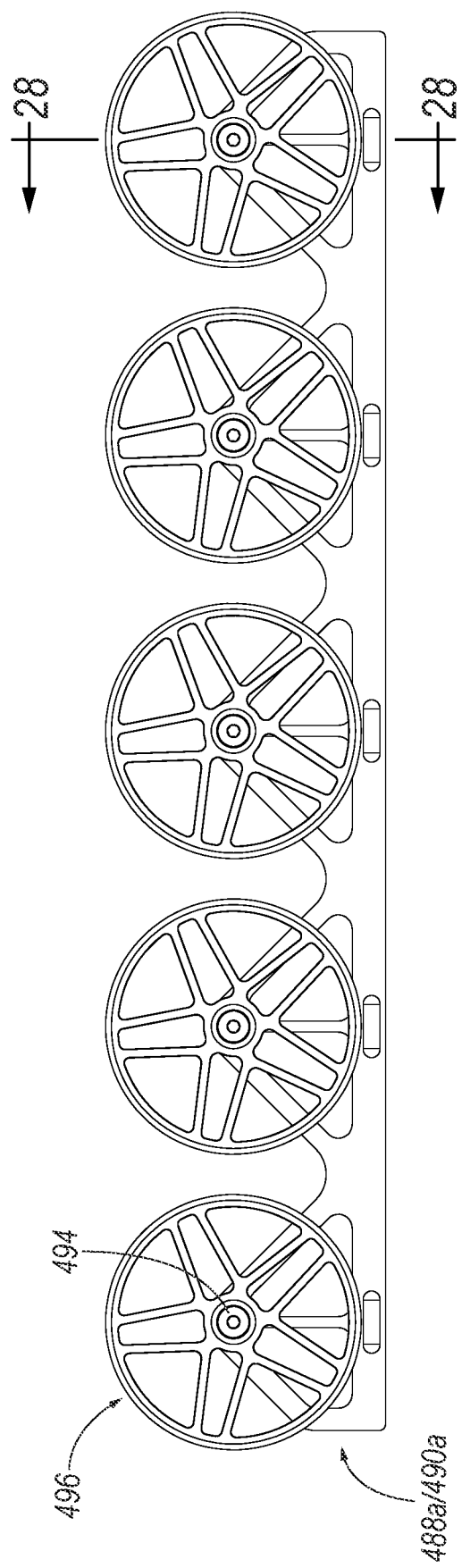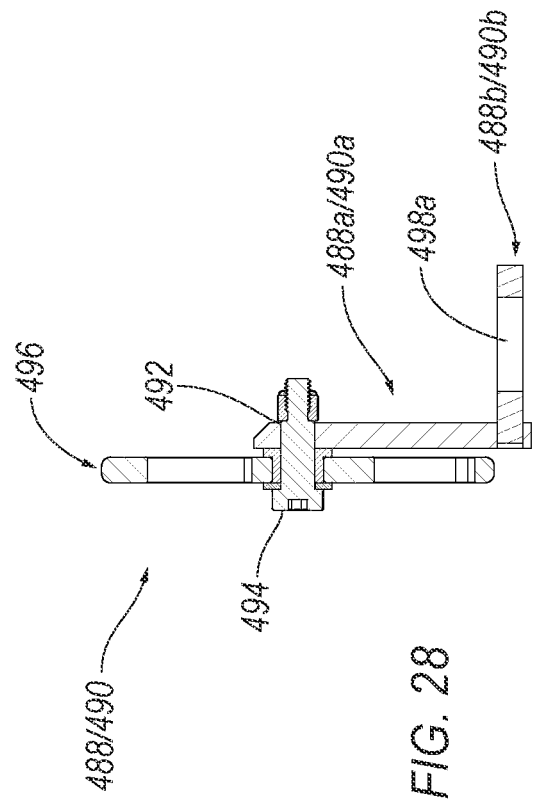

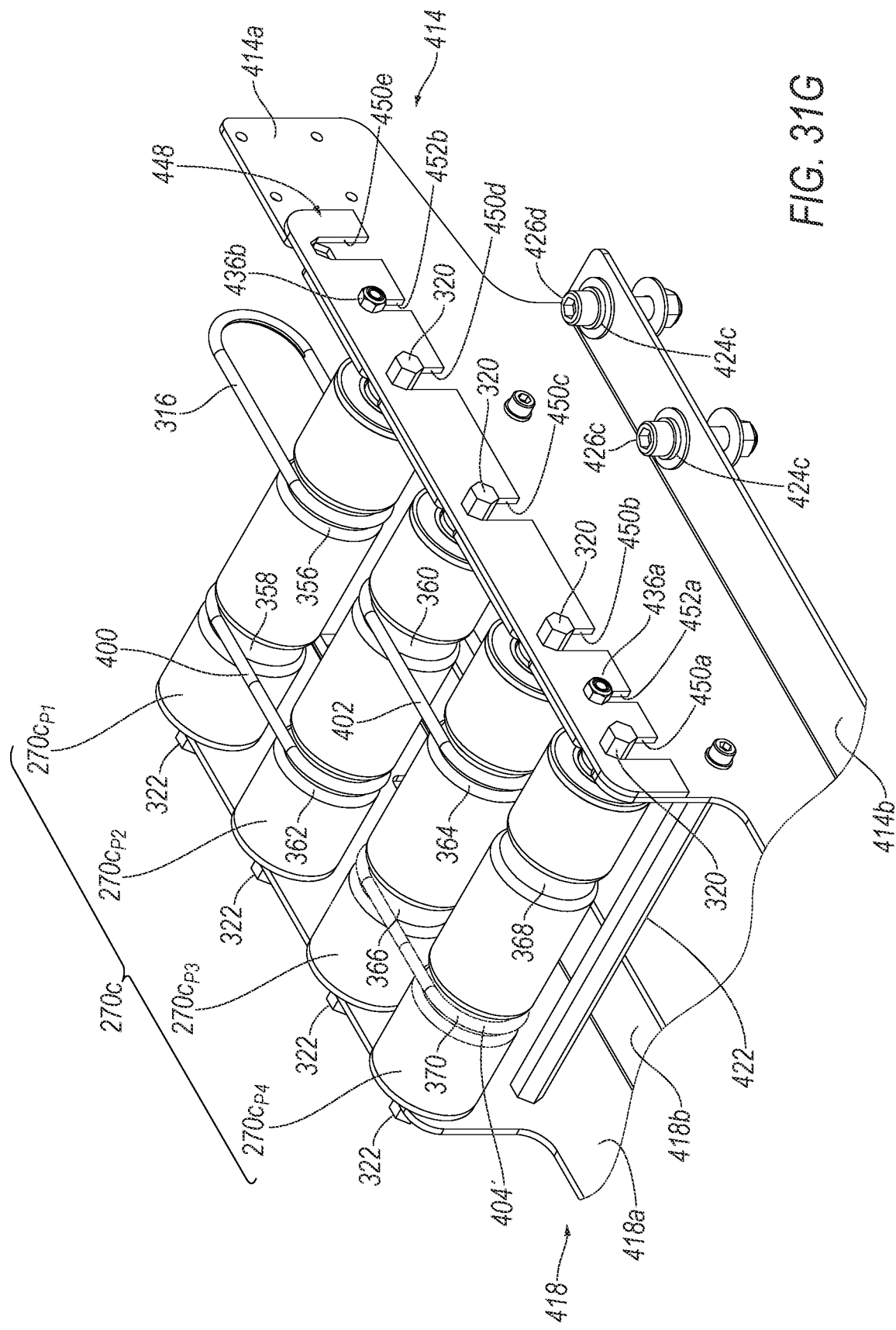

WORKPIECE DIVERTER STATION, CONVEYOR SYSTEM, AND METHODS FOR UTILIZING THE SAME

TECHNICAL FIELD

The disclosure relates generally to a workpiece diverter station, a conveyor system, and methodologies for utilizing the same.

BACKGROUND

This section provides background information related to the present disclosure and is not necessarily prior art.

While known workpiece diverter stations and conveyor systems have proven to be acceptable for various applications, such workpiece diverter stations and conveyor systems are nevertheless susceptible to improvements that may enhance their overall performance and cost. Therefore, a need exists to develop workpiece diverter stations and conveyor systems that advance the art.

SUMMARY

This section provides a general summary of the disclosure, and is not a comprehensive disclosure of its full scope or all of its features.

One aspect of the disclosure provides a workpiece diverter station. The workpiece diverter station includes: a base frame; an X-direction workpiece transporter subassembly; a Z-direction lift assembly; and a Y-direction workpiece transporter subassembly. The X-direction workpiece transporter subassembly is axially fixedly supported with respect to the base frame in a Z-direction. The Z-direction lift assembly is supported by the base frame. The Y-direction workpiece transporter subassembly is connected to the Z-direction lift assembly and is axially movably supported with respect to the base frame in the Z-direction.

Implementations of the disclosure may include one or more of the following optional features. In some implementations, the X-direction workpiece transporter subassembly includes: at least one roller of a first plurality of proximal rollers; at least one roller of a first plurality of distal rollers; and a plurality of intermediate rollers. The at least one roller includes a proximal powered roller. The at least one roller includes a distal powered roller. The plurality of intermediate rollers include at least one passive roller.

In some examples, the X-direction workpiece transporter subassembly further includes a second plurality of proximal rollers and a second plurality of distal rollers. The second plurality of proximal rollers includes at least one passive roller. The second plurality of distal rollers include at least one passive roller. In other examples, all of the first plurality of proximal rollers, the second plurality of proximal rollers, the first plurality of distal rollers, the second plurality of distal rollers, and the plurality of intermediate rollers are rotatably connected for synched rotation by a plurality of plurality of loop members.

In some instances, the Y-direction workpiece transporter subassembly includes: at least one roller of a plurality of proximal rollers; at least one roller of a plurality of distal rollers; and a plurality of intermediate rollers. The at least one roller of the plurality of proximal rollers include a proximal powered roller. The at least one roller of the plurality of distal rollers include a distal powered roller. The plurality of intermediate rollers include at least one passive roller. In other instances, all of the plurality of proximal rollers, the plurality of distal rollers, and the plurality of intermediate rollers are rotatably connected for synched rotation by a plurality of plurality of loop members.

In some configurations, the base frame includes at least one support beam arranged within a cavity of the base frame. In other configurations, the Z-direction lift assembly includes at least one axial lifter supported by the at least one support beam. The Y-direction workpiece transporter subassembly is supported by the at least one axial lifter.

In some implementations, the workpiece diverter station further includes a fluid source connected to at least one Z-direction lifting actuator of the Z-direction lift assembly. In other implementations, the at least one Z-direction lifting actuator is an inflatable device.

In some examples, the workpiece diverter station further includes at least one motor connected to at least one roller of the X-direction workpiece transporter subassembly. In other examples, the workpiece diverter station further includes at least one motor connected to at least one roller of the Y-direction workpiece transporter subassembly. In yet other examples, the workpiece diverter station further includes a Y-direction workpiece guiding subassembly connected to the Y-direction workpiece transporter subassembly.

Another aspect of the disclosure includes a portion of a workpiece diverter station. The portion of a workpiece diverter station includes: a base frame; and at least one subassembly. The at least one subassembly includes: a plurality of rollers; a plurality of loop members; and at least one servicing access clamp plate. The plurality of rollers are arranged in parallel with one another. The plurality of rollers include: a first powered roller supported by the base frame; a second powered roller supported by the base frame; at least one passive roller. The plurality of loop members rotatably connect the plurality of rollers for synched rotation. The at least one servicing access clamp plate removably-connects at least two rollers of the plurality of rollers to the base frame.

Implementations of the disclosure may include one or more of the following optional features. In some implementations, the at least one subassembly includes: an X-direction workpiece transporter subassembly; and a Y-direction workpiece transporter subassembly. The plurality of rollers of the Y-direction workpiece transporter subassembly are orthogonally arranged with respect to the plurality of rollers of the X-direction workpiece transporter subassembly.

In some implementations, a portion of the X-direction workpiece transporter subassembly includes: a first panel extension bracket; a second panel extension bracket; and a plurality of intermediate rollers. The first panel extension bracket is connected to the base frame. The second panel extension bracket is connected to the base frame. The plurality of intermediate rollers extend between and are directly supported by the first panel extension bracket and the second panel extension bracket. The at least one passive roller includes the plurality of intermediate rollers.

In some examples, the at least one servicing access clamp plate includes a first servicing access clamp plate and a second servicing clamp plate. The first servicing access clamp plate removably-secures a first end of each roller of the plurality of intermediate rollers to the first panel extension bracket. The second servicing clamp plate removably-secures a second end of each roller of the plurality of intermediate rollers to the second panel extension bracket.

In some instances, a portion of the Y-direction workpiece transporter subassembly includes: at least one outer bracket; at least one inner bracket; and at least one plurality of intermediate rollers. The at least one outer bracket is connected to the base frame. The at least one inner bracket is connected to the base frame. The at least one plurality of intermediate rollers extend between and are directly supported by the at least one outer bracket and the at least one inner bracket. The at least one passive roller includes the at least one plurality of intermediate rollers.

In other configurations, the at least one servicing access clamp plate includes a first servicing access clamp plate and a second servicing access clamp plate. The first servicing access clamp plate removably-secures a first end of each roller of a first plurality of intermediate rollers of the at least one plurality of intermediate rollers to a first region of the at least one outer bracket. The second servicing access clamp plate removably-secures a first end of each roller of a second plurality of intermediate rollers of the at least one plurality of intermediate rollers to a second region of the at least one outer bracket.

Yet another aspect of the disclosure includes a method for operating a workpiece diverter station of conveyor system. The conveyor system includes an upstream conveyor line branch, a first downstream conveyor line branch, and a second downstream conveyor line branch. The method includes: providing a workpiece from the upstream conveyor line branch to the workpiece diverter station; receiving an input at input at a central processing unit if the workpiece should be directed from the workpiece diverter station to the first downstream conveyor line branch or the second downstream conveyor line branch; responsive to the received input, transporting the workpiece downstream of the workpiece diverter station by arranging a Y-direction workpiece transporter subassembly of the workpiece diverter station in one of two orientations including: a down orientation that is axially aligned with a X-direction workpiece transporter subassembly of the workpiece diverter station for transporting the workpiece along a first conveyor path; and an up orientation that is axially offset from and is not axially aligned with the X-direction workpiece transporter subassembly of the workpiece diverter station for transporting the workpiece along a second conveyor path that is different from the first conveyor path.

Implementations of the disclosure may include one or more of the following optional features. In some implementations, the arranging a Y-direction workpiece transporter subassembly of the workpiece diverter station in the up orientation includes: sending a signal from the central processing unit to at least one Z-direction lifting actuator of a Z-direction lift assembly that axially offsets the Y-direction workpiece transporter subassembly from the X-direction workpiece transporter subassembly.

Another aspect of the disclosure includes a method for servicing a portion of a workpiece diverter station. The method includes: providing a plurality of loop members that rotatably connect a plurality of rollers for synched rotation; providing at least one servicing access clamp plate that removably-connects at least two rollers of the plurality of rollers to a base frame; determining that a loop member of the plurality of loop members is compromised; removing the at least one servicing access clamp plate from the base frame; removing some but not all of the plurality of rollers from the base frame; replacing the compromised loop member with a new loop member; and re-attaching the at least one servicing access clamp plate to the base frame.

Implementations of the disclosure may include one or more of the following optional features. In some implementations, the removing the at least one servicing access clamp plate from the base frame includes: removing one or more fasteners that secures the at least one servicing access clamp plate to the base frame; lifting the at least one servicing access clamp plate axially away from the base frame; and discarding the compromised loop member. In other examples, after replacing the compromised loop member with a new loop member, the method further includes: arranging the new loop member upon the removed rollers of the plurality of rollers that were removed from the base frame; and re-arranging the removed rollers back upon the base frame.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

FIG. 4 is a perspective view of the exemplary workpiece diverter station of FIGS. 1A-1B.

FIG. 19 is a top view of the portion of the X-direction workpiece transporter subassembly of either of FIGS. 17 and 18.

FIG. 20 is a side view of the portion of the X-direction workpiece transporter subassembly of either of FIGS. 17 and 18.

FIG. 21 is a front view of the portion of the X-direction workpiece transporter subassembly of either of FIGS. 17 and 18.

FIG. 24 is a first perspective view of an exemplary Y-direction workpiece guide of an exemplary Y-direction workpiece guiding subassembly of the workpiece diverter station of FIG. 10.

FIG. 25 is a second perspective view of the exemplary Y-direction workpiece guide FIG. 24.

FIG. 26 is a top view of the exemplary Y-direction workpiece guide FIG. 24.

FIG. 27 is a side view of the exemplary Y-direction workpiece guide FIG. 24.

FIG. 28 is a cross-sectional view of the exemplary Y-direction workpiece guide according to line 28-28 of FIG. 27.

FIGS. 31A-31G are perspective views of a portion of the Y-direction workpiece transporter subassembly of the workpiece diverter station of FIG. 10 being serviced.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The figures illustrate exemplary implementations of a workpiece diverter station, a conveyor system, and methodologies for utilizing the same. Based on the foregoing, it is to be generally understood that the nomenclature used herein is simply for convenience and the terms used herein should be given the broadest meaning by one of ordinary skill in the art.

Figure 1A:
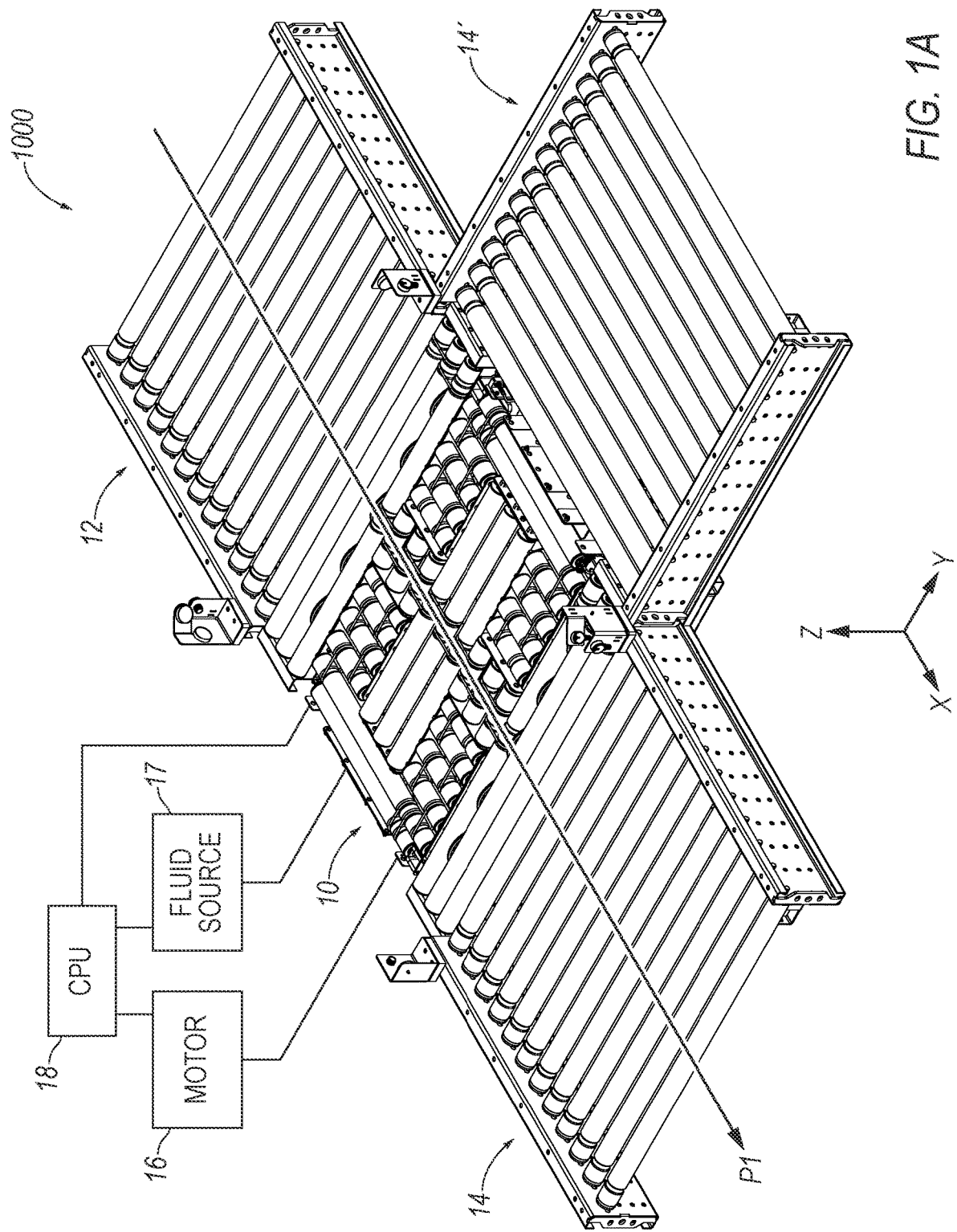
FIG. 1A is a perspective view of an exemplary conveyor system including an exemplary workpiece diverter station arranged in a first orientation.
Figure 1B:
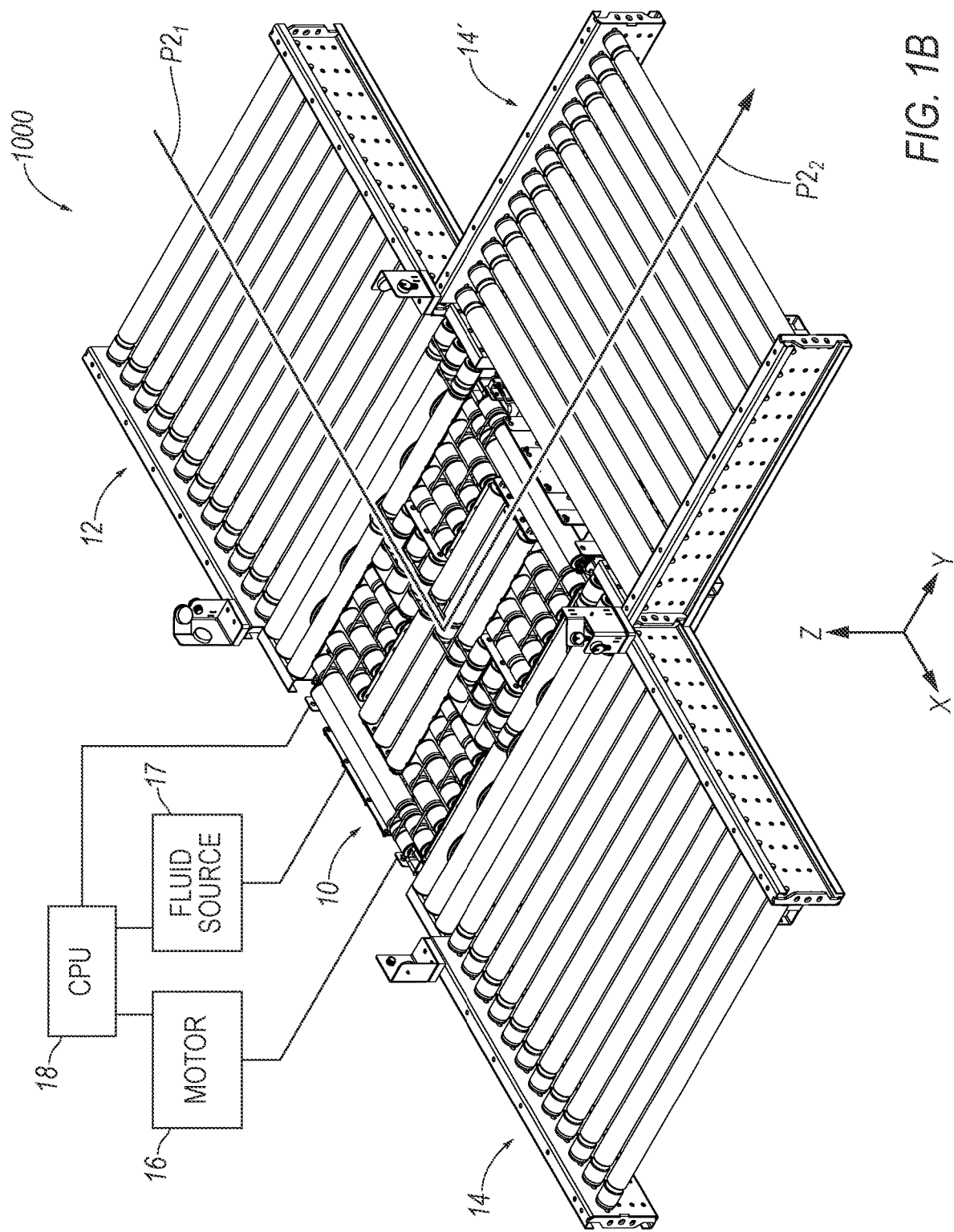
FIG. 1B is a perspective view of the conveyor system of FIG. 1A including the workpiece diverter station of FIG. 1A arranged in a second orientation.
Figure 2A:
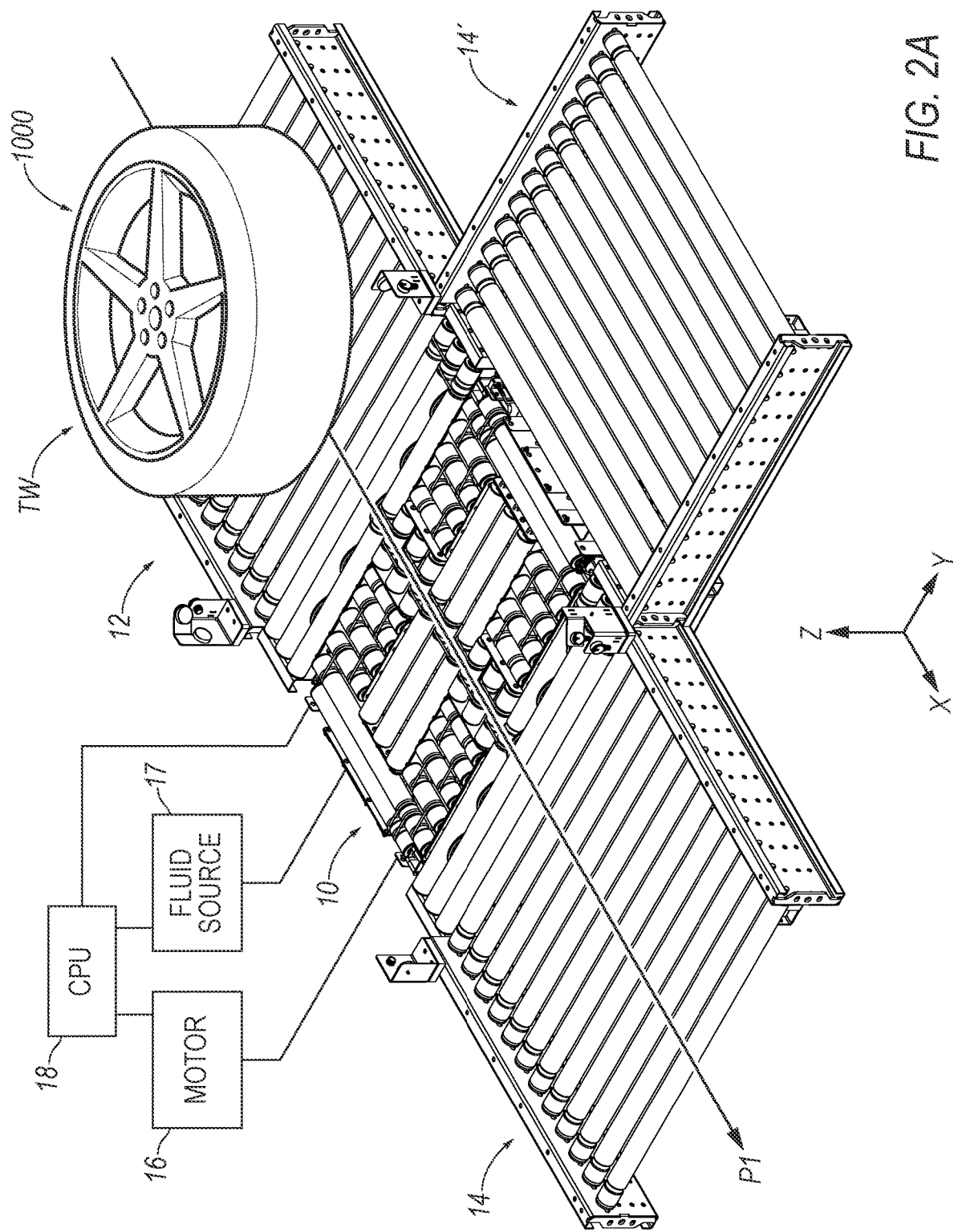
FIGS. 2A-2C are perspective views of the conveyor system according to FIG. 1A including the workpiece diverter station arranged in the first orientation for transporting a workpiece along a first conveying path.
Figure 2B:
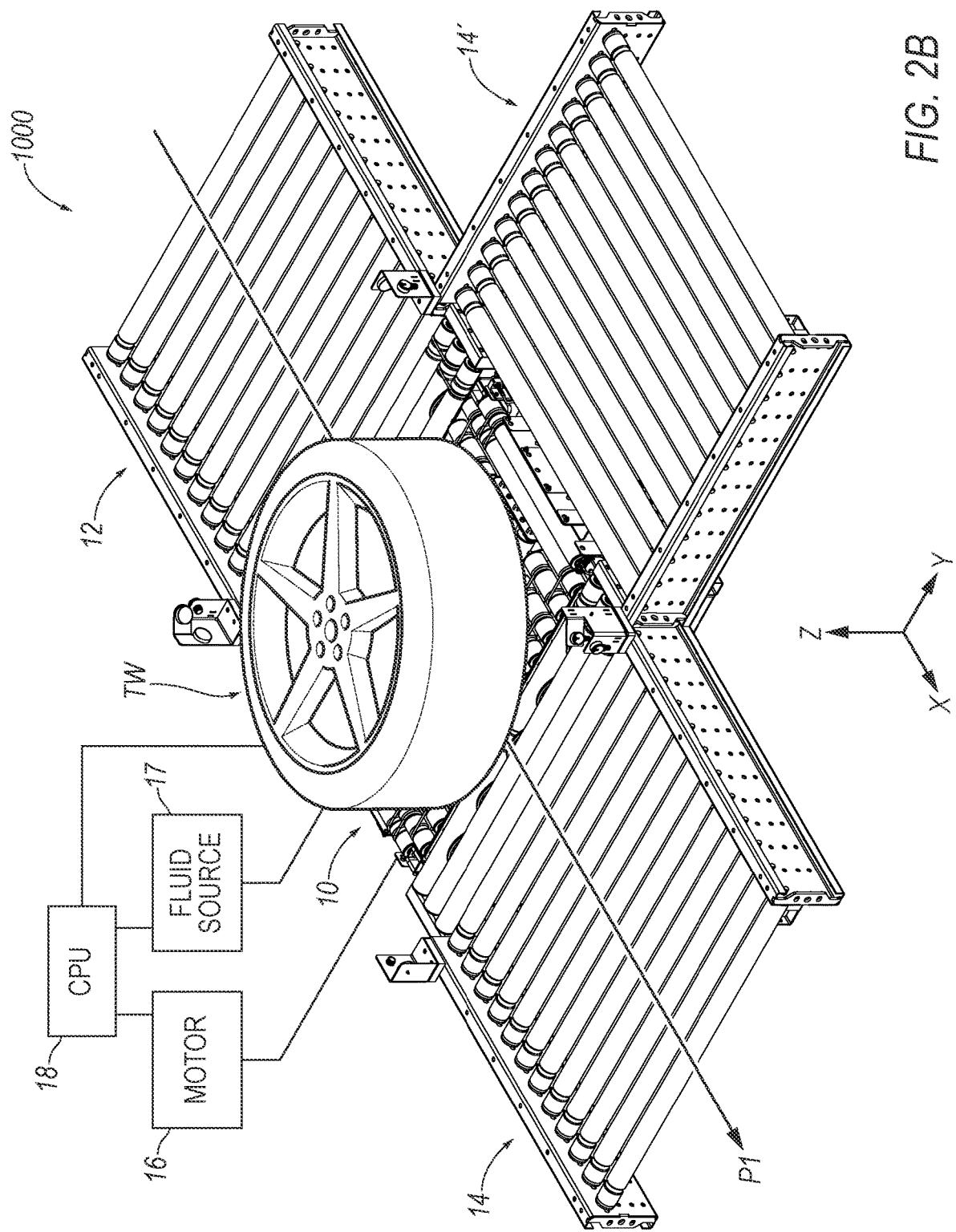
Figure 2C:
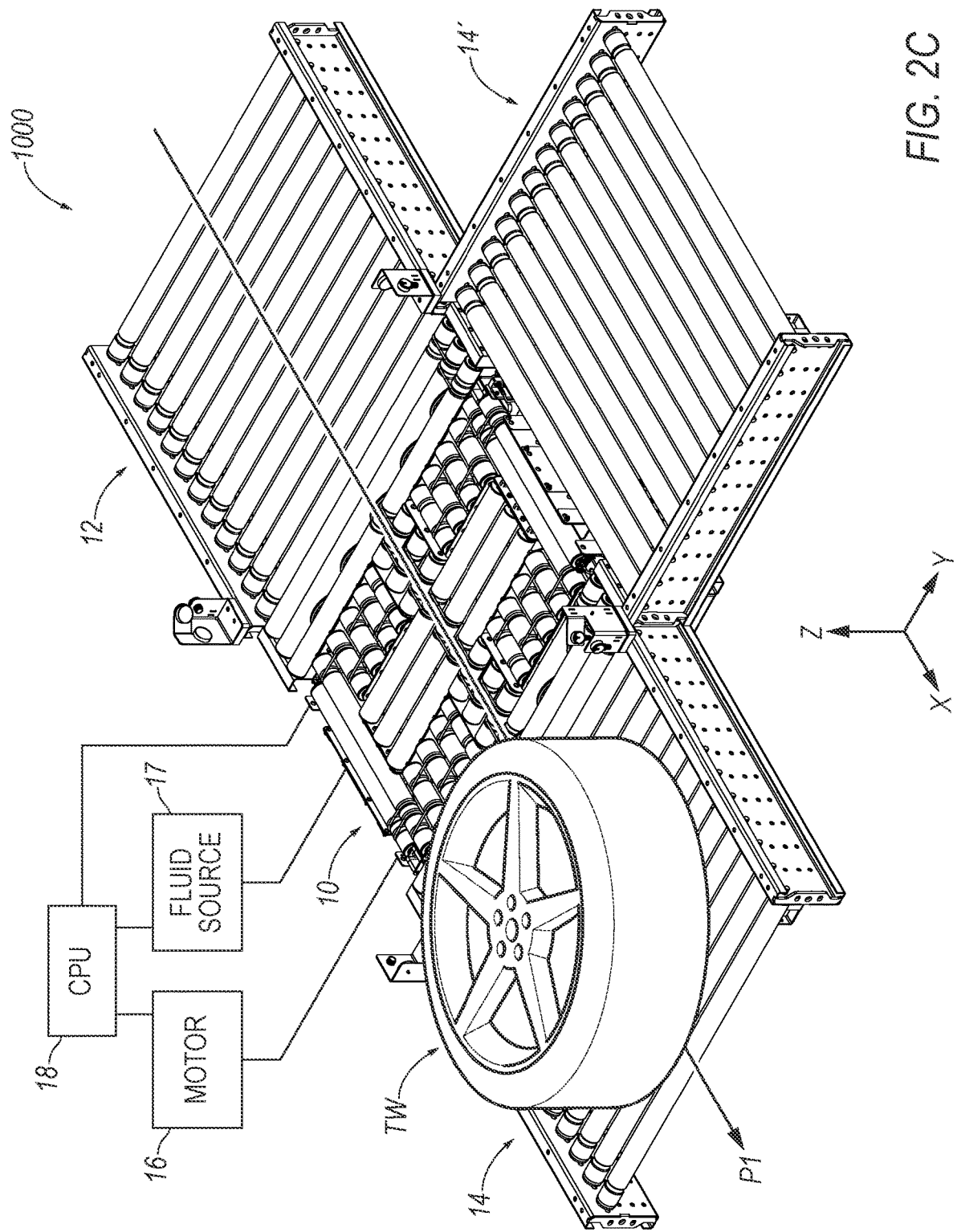

Referring to FIGS. 1A and 1, a workpiece diverter station is shown generally at 10. The workpiece diverter station 10 may connect an upstream conveyor line branch 12 to two or more (e.g., three) downstream conveyor line branches (see, e.g., downstream conveyor line branches 14, 14') for forming a conveyor intersection, a conveyor node, or a conveyor system, which is shown generally at 1000. The two or more downstream conveyor line branches 14, 14' may include a first downstream conveyor line branch 14 and a second downstream conveyor line branch 14'. In some implementations, the conveyor system includes a third downstream conveyor line branch (not shown), arranged opposite the second downstream conveyor line branch 14'. A three-dimensional Cartesian coordinate system is also shown generally at FIGS. 1A and 1B in order to infer three unique directions such as, for example: an X-direction, a Y-direction, and a Z-direction, that will be referred to in the following disclosure.

With reference to FIGS. 2A-2C and 3A-3C, one or more workpieces, which is shown generally at TW, is/are transported by the exemplary conveyor system 1000. Although the workpiece diverter station 10 is shown at FIGS. 2A-2C and 3A-3C transporting the one or more workpieces TW in the X-direction and the Y-direction, the workpiece diverter station 10 may also be configured to transport the one or more workpieces TW in equally opposite directions. For example, when a workpiece TW is transported from the upstream conveyor line branch 12 to the workpiece diverter station 10 in the X-direction, the workpiece diverter station 10 may be stopped or paused and then transport the workpiece TW in a reverse direction opposite of the X-direction such that the workpiece TW is transported from the workpiece diverter station 10 back to the upstream conveyor line branch 12. The one or more workpieces TW may be, for example, one or more tire-wheel assemblies (see also, e.g., an exemplary tire-wheel assembly at FIG. 34). Although the one or more workpieces are illustrated at FIGS. 2A-2C and 3A-3C to be a tire-wheel assembly TW, the workpiece diverter station 10 and the conveyor system 1000 are not limited to transporting tire-wheel assemblies TW, and, as such, the workpiece diverter station 10 and the conveyor system 1000 may transport any desirable workpiece. Although one workpiece being, for example, one tire-wheel assembly TW is seen at FIGS. 2A-2C and 3A-3C, the conveyor system 1000 is not limited to transporting one workpiece being, for example, one tire-wheel assembly TW, and, as such, the conveyor system 1000 may transport one or more other workpieces, such as, for example one or more tires T (see, e.g., FIGS. 32A-32D), one or more wheels (see, e.g., FIGS. 33A-33B), or the like.

Figure 15A:
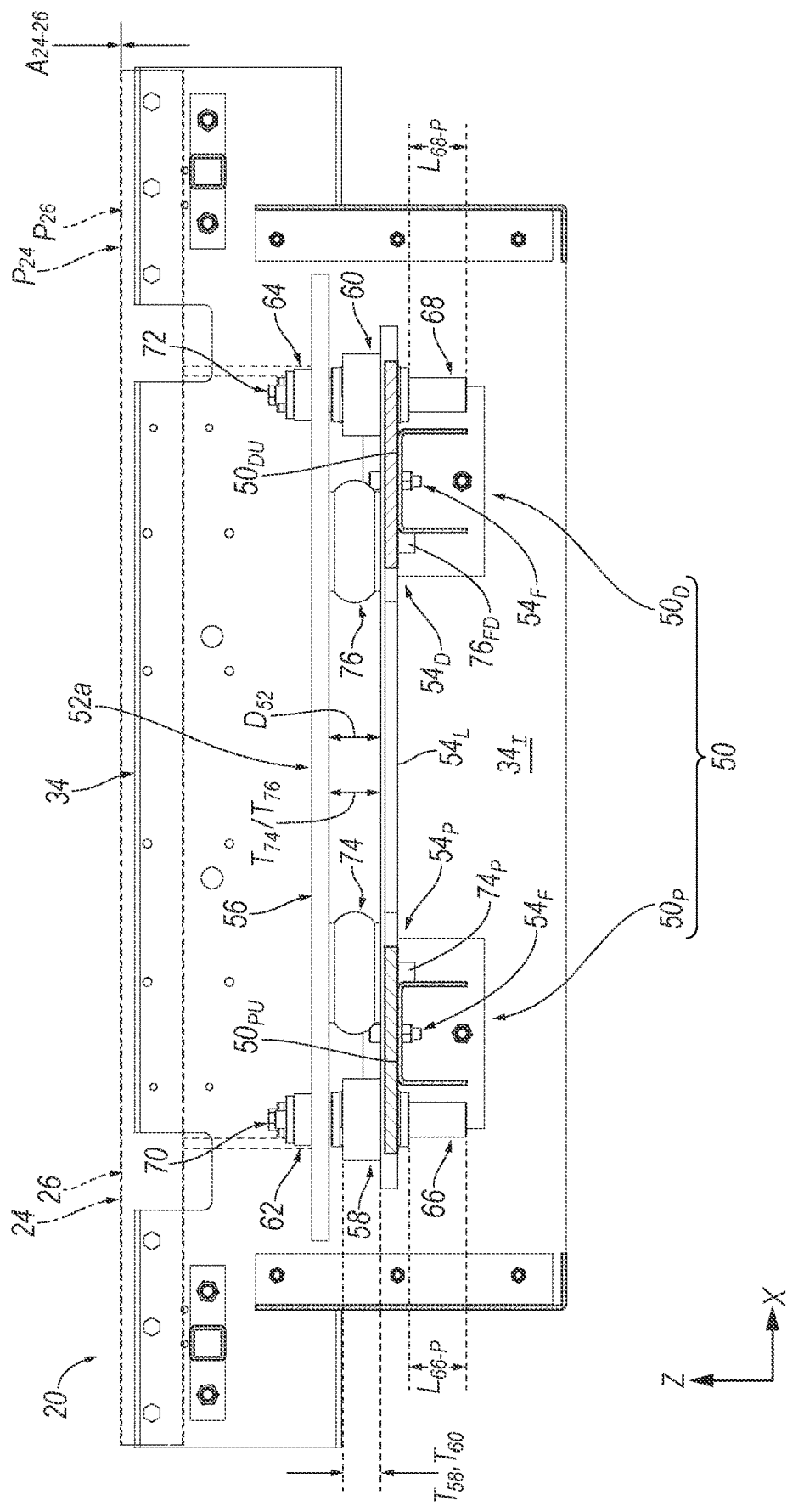
FIG. 15A is a cross-sectional view of the base frame according to line 15-15 of FIG. 13 when a Z-direction lift assembly is arranged in a first orientation.

Referring to FIGS. 1A and 2A-2C, in a first exemplary configuration, when a workpiece TW traverses the workpiece diverter station 10, one or more portions (see, e.g., a Y-direction workpiece transporter subassembly 26 at FIGS. 10 and 22A-23 and an optional Y-direction workpiece guiding subassembly 28 at FIGS. 10 and 24-28) of the workpiece diverter station 10 remain arranged in a first orientation or "down" orientation (see, e.g., also generally a dashed box 26 at FIG. 15A that generally representing the Y-direction workpiece transporter subassembly 26 including a plane $P_{26}$ extending across a top of the dashed box 26 that generally represents a plane extending across an upper-most workpiece supporting surface of the rollers of the Y-direction workpiece transporter subassembly 26). Accordingly, when the workpiece diverter station 10 is arranged in such a configuration, a workpiece TW that traverses the workpiece diverter station 10 travels along a first conveying path P1 in the X-direction to a first destination (e.g., at or downstream of the first downstream conveyor line branch 14). The first conveying path P1 is substantially linear and extends across, for example: (1) the upstream conveyor line branch 12; (2) the workpiece diverter station 10; and (3) the first downstream conveyor line branch 14.

Figure 3A:
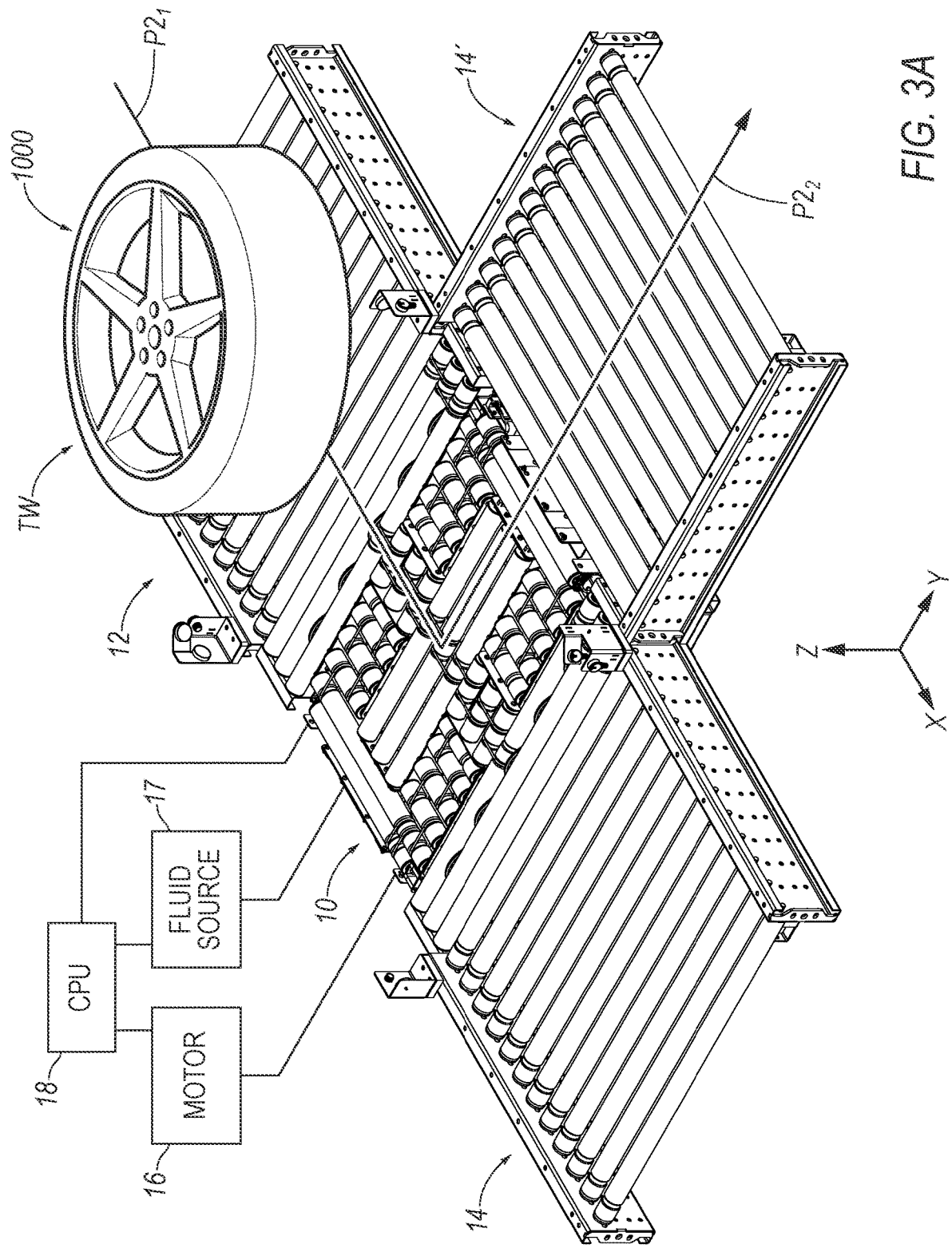
FIGS. 3A-3C are perspective views of the conveyor system according to FIG. 1B including the workpiece diverter station arranged in the second orientation for transporting a workpiece along a second conveying path.
Figure 3B:
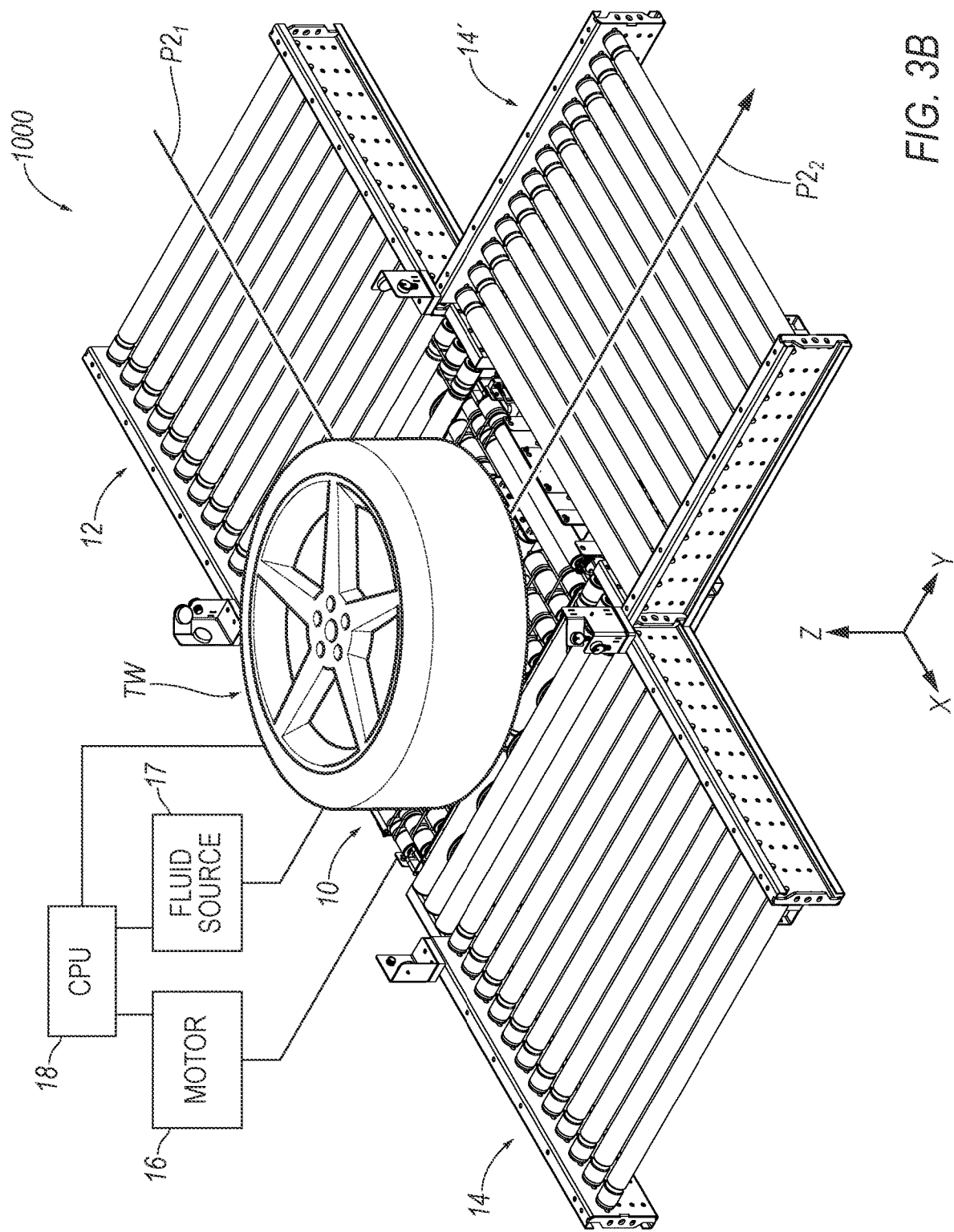
Figure 3C:
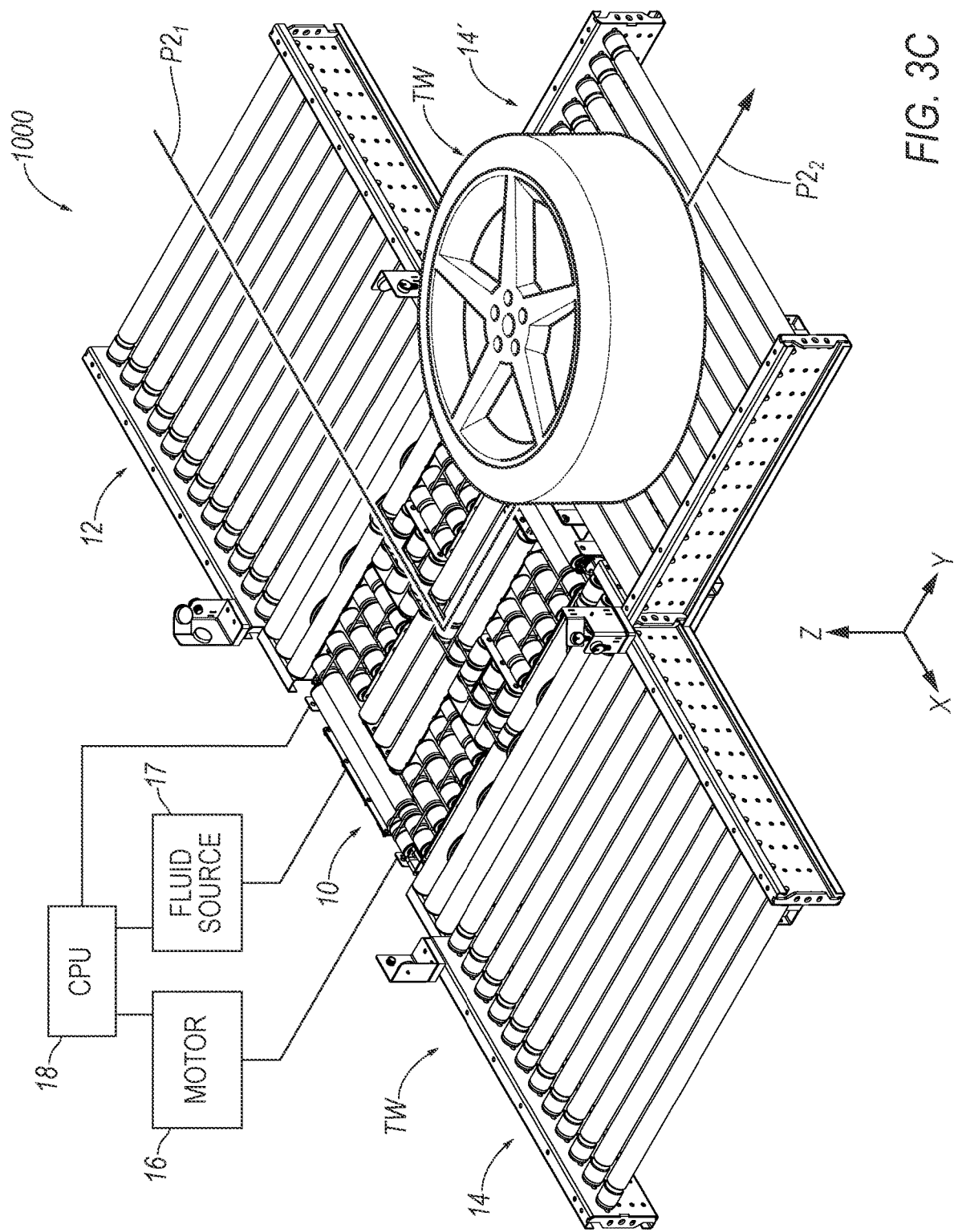
Figure 5:
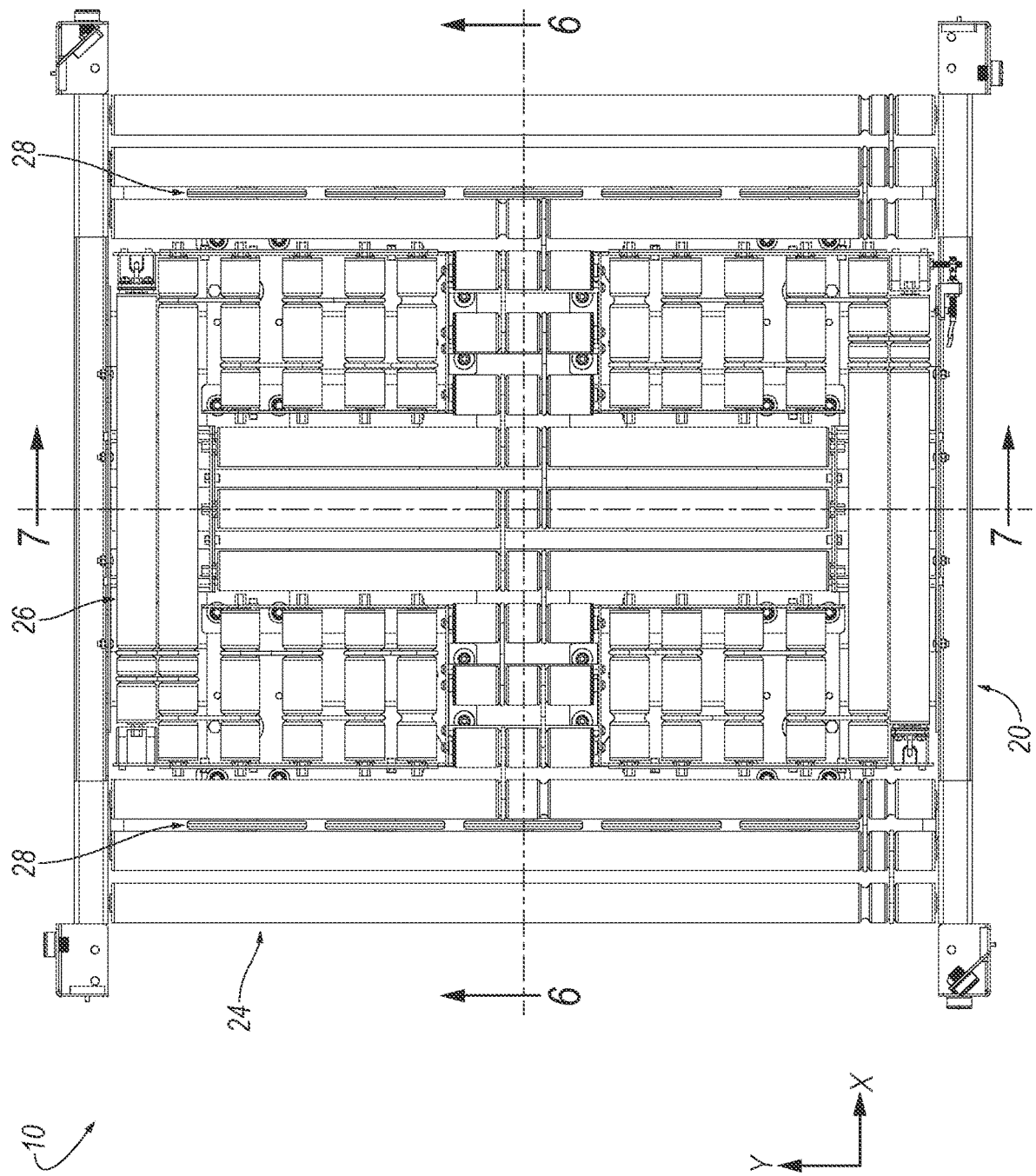
FIG. 5 is a top view of the workpiece diverter station of FIG. 4.
Figure 6:
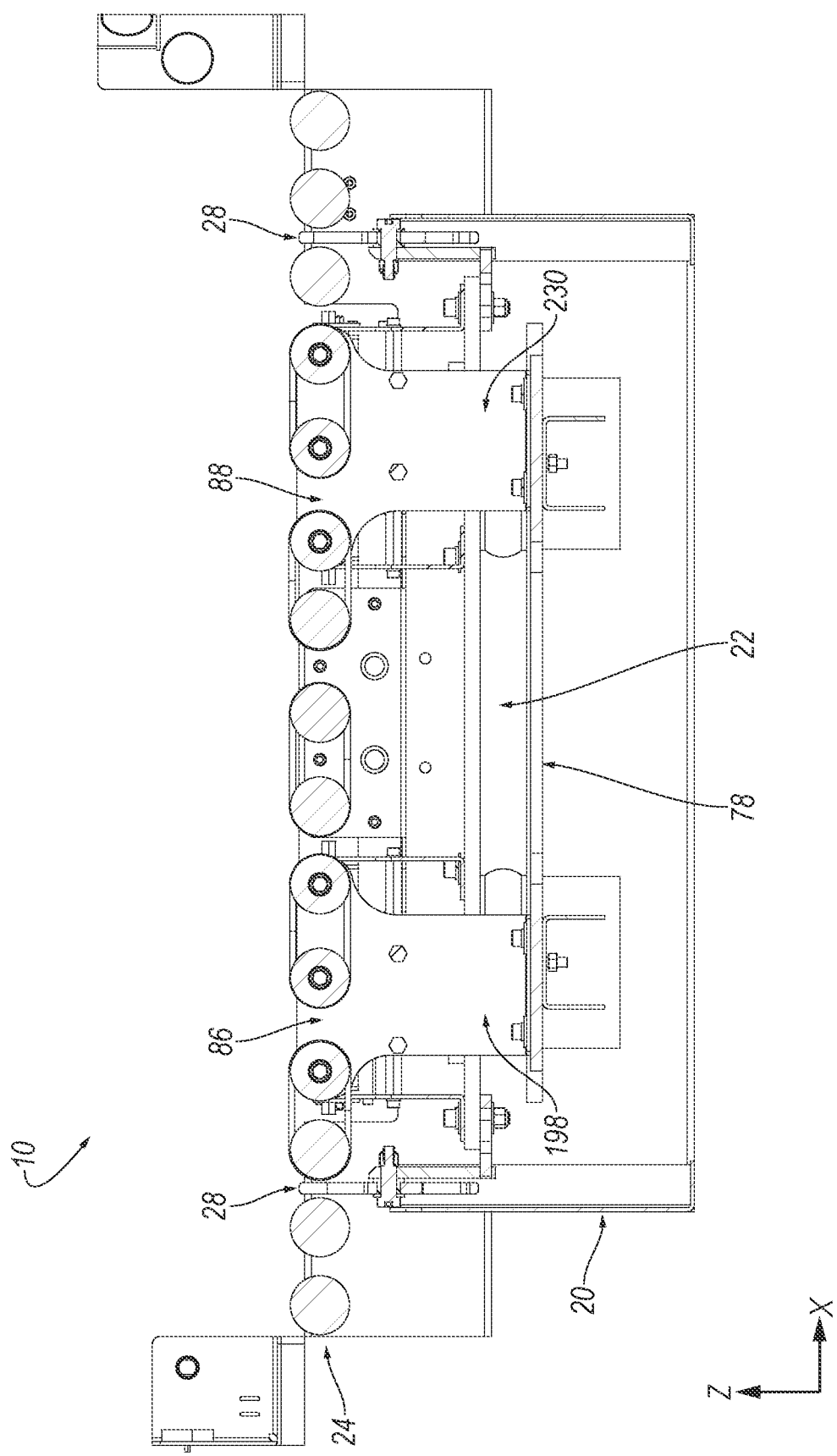
FIG. 6 is a cross-sectional view of the workpiece diverter station according to line 6-6 of FIG. 5.
Figure 7:
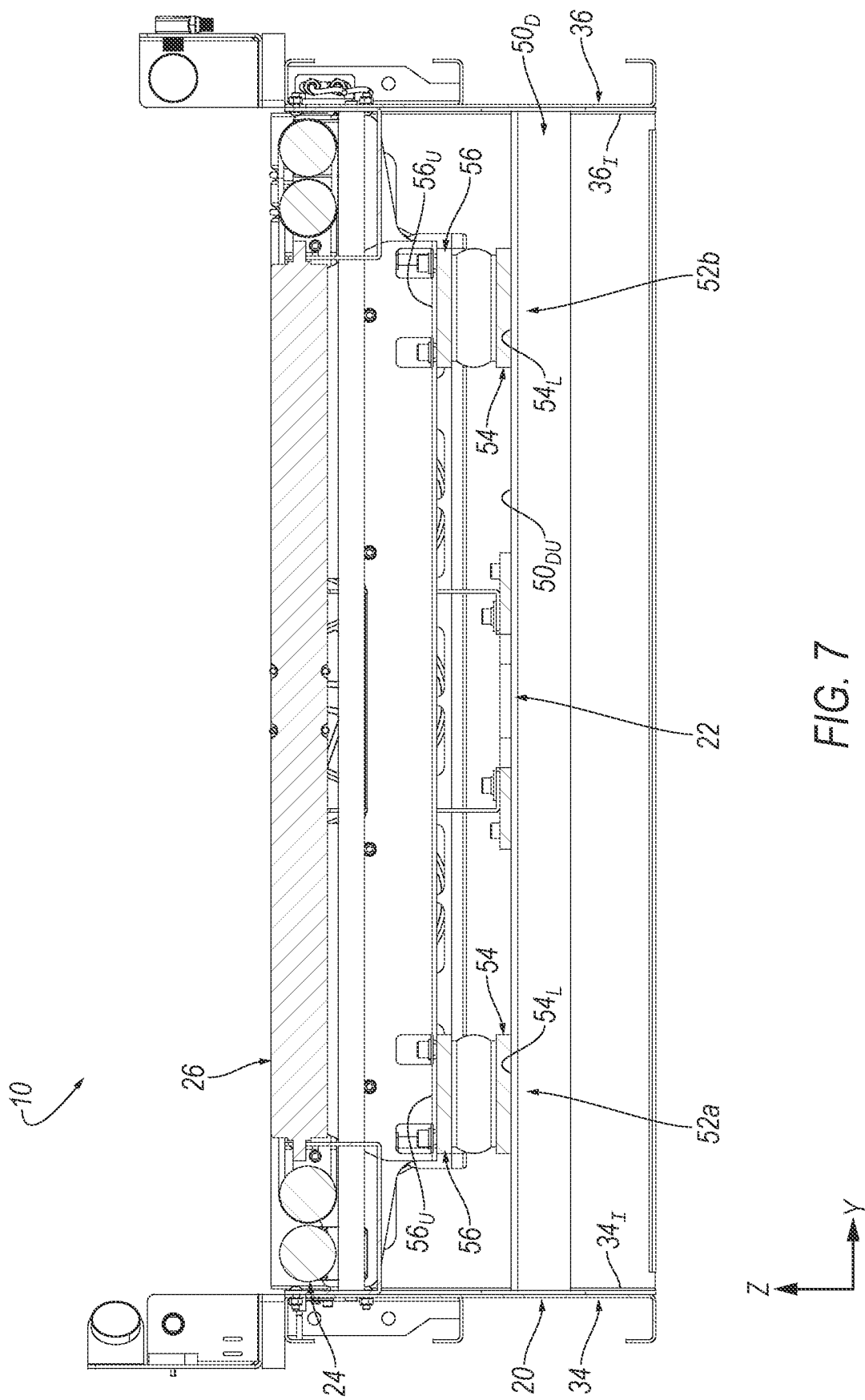
FIG. 7 is a cross-sectional view of the workpiece diverter station according to line 7-7 of FIG. 5.
Figure 8:
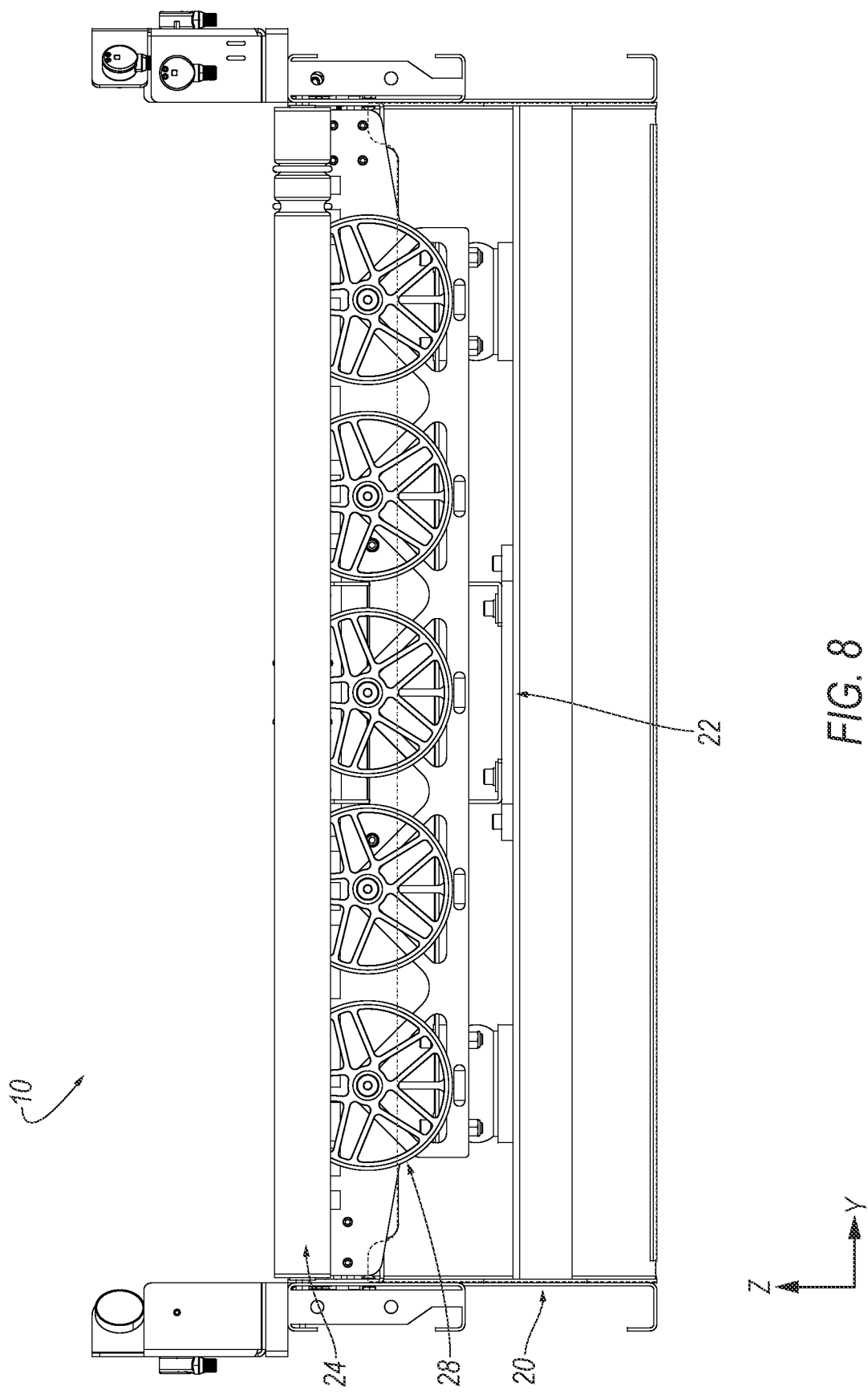
FIG. 8 is a side view of the workpiece diverter station of FIG. 4 with a side panel of a base frame of the workpiece diverter station removed according to arrow 8.
Figure 15B:
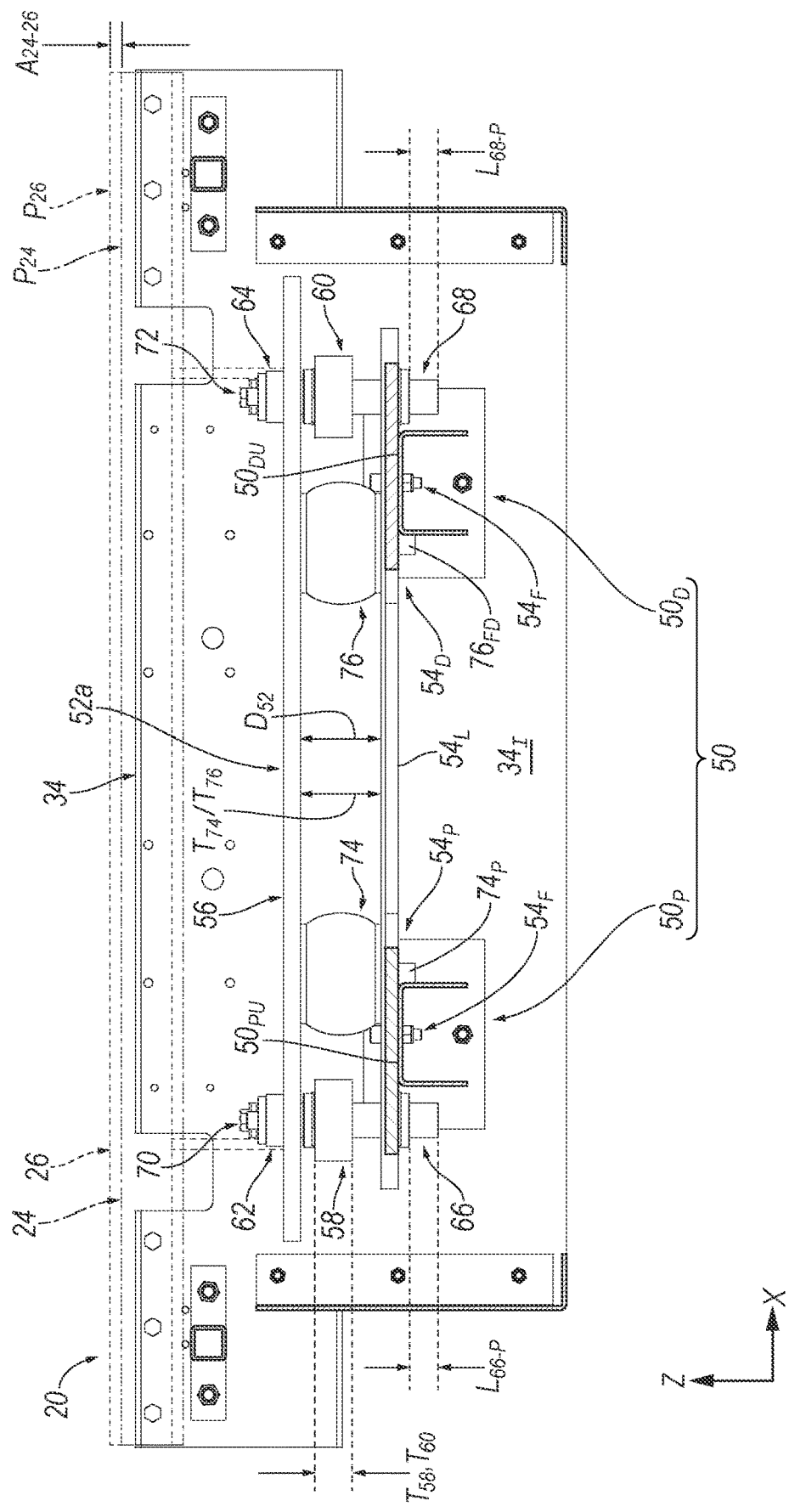
FIG. 15B is another cross-sectional view of the base frame according to line 15-15 of FIG. 13 when the Z-direction lift assembly is arranged in a second orientation.

Referring to FIGS. 1B and 3A-3C, in a second exemplary configuration, when a workpiece TW traverses the workpiece diverter station 10, one or more portions see, e.g., the Y-direction workpiece transporter subassembly 26 at FIGS. 10 and 22A-23 and the optional Y-direction workpiece guiding subassembly 28 at FIGS. 10 and 24-28) of the workpiece diverter station 10 transitions from the first or "down" orientation (see, e.g., FIGS. 1A, 2B, and also generally at the dashed box 26 at FIGS. 15A-15B and a dashed box 24 at FIGS. 15A-15B that generally represents an X-direction workpiece transporter subassembly 24 including a plane $P_{24}$ extending across a top of the dashed box 24 that generally represents a plane extending across an upper-most workpiece supporting surface of the rollers of the X-direction workpiece transporter subassembly 24) to a second or "up" orientation in the Z-direction (see, e.g., FIGS. 1B, 3B, and also generally at the dashed box 26 at FIG. 15B). As seen at FIG. 15B, a displacement of the plane $P_{26}$ from the plane $P_{24}$ results in an axially-displaced distance $A_{24-26}$ of the Y-direction workpiece transporter subassembly 26 from the X-direction workpiece transporter subassembly 24; as such, a workpiece TW may contact the rollers of the Y-direction workpiece transporter subassembly 26 and not the rollers of the X-direction workpiece transporter subassembly 24.

Accordingly, when the workpiece diverter station 10 is arranged in such a configuration, a workpiece TW that traverses the workpiece diverter station 10 travels along a second conveying path P2 (that includes both of the X-direction and the Y-direction) to a second destination (e.g., at or downstream of the second downstream conveyor line branch 14') different from the first destination. The second conveying path P2 includes a first substantially linear segment $P2_1$ in the X-direction and a second substantially linear segment $P2_2$ in the Y-direction that is substantially perpendicular to the first substantially linear segment $P2_1$. The first substantially linear segment $P2_1$ extends across, for example: (1) the upstream conveyor line branch 12; and (2) a portion of the workpiece diverter station 10. A distal end of the first substantially linear segment $P2_1$ is connected to a proximal end of the second substantially linear segment $P2_2$; the second substantially linear segment $P2_2$ extends across, for example: (1) another portion of the workpiece diverter station 10; and (2) the second downstream conveyor line branch 14'.

With continued reference to FIGS. 1A and 1B, the workpiece diverter station 10 may include or be connected to, for example, one or more motors, which is/are seen generally at 16. The one or more motors 16 may be connected to one or more components (e.g., one or more active (i.e., "powered" or "master") rollers $80_A$, $82_A$, $266_A$, $268_A$, or the like of the workpiece diverter station 10.

As will be described in the following disclosure, the powered roller $80_A$ (referred to in the following disclosure as an "intermediate powered roller $80_A$") and the powered roller $82_A$ (referred to in the following disclosure as an "intermediate powered roller $82_A$") are associated with the X-direction workpiece transporter subassembly 24. The powered rollers $80_A$, $82_A$ are arranged in parallel and spaced apart from one another. A plurality of passive rollers (see, e.g., rollers $80_{P2}$, $82_{P2}$, $84_{P1}$, $84_{P2}$, $84_{P4}$, $86_{P1}$, $86_{P2}$, $86_{P3}$, $88_{P1}$, $88_{P2}$, $88_{P3}$ but not the rollers $80_{P1}$, $82_{P1}$) of the X-direction workpiece transporter subassembly 24 are arranged between, in parallel with, and rotatably-connected to both of the powered rollers $80_A$, $82_A$. When one or more motors 16 are actuated for directly impart rotation to the powered rollers $80_A$, $82_A$, the plurality of passive rollers $80_{P1}$, $80_{P2}$, $82_{P1}$, $82_{P2}$, $84_{P1}$, $84_{P2}$, $84_{P4}$, $86_{P1}$, $86_{P2}$, $86_{P3}$, $88_{P1}$, $88_{P2}$, $88_{P3}$ are rotationally synched with the rotational direction of the powered rollers $80_A$, $82_A$; accordingly, when the one or more motors 16 de/actuate rotation of the powered rollers $80_A$, $82_A$, the synched rotation of the plurality of passive rollers $80_{P1}$, $80_{P2}$, $82_{P1}$, $82_{P2}$, $84_{P1}$, $84_{P2}$, $84_{P4}$, $86_{P1}$, $86_{P2}$, $86_{P3}$, $88_{P1}$, $88_{P2}$, $88_{P3}$ results in simultaneous starting or stopping of the corresponding rotational movement associated with the powered rollers $80_A$, $82_A$, which eliminates over-speed or under-speed rotational movement of the plurality of passive rollers $80_{P1}$, $80_{P2}$, $82_{P1}$, $82_{P2}$, $84_{P1}$, $84_{P2}$, $84_{P4}$, $86_{P1}$, $86_{P2}$, $86_{P3}$, $88_{P1}$, $88_{P2}$, $88_{P3}$.

As will be described in the following disclosure, the powered roller $266_A$ (referred to in the following disclosure as a "proximal active roller $266_A$") and the powered roller $268_A$ (referred to in the following disclosure as a "distal active roller $268_A$") are associated with a Y-direction workpiece transporter subassembly 26. The powered rollers $266_A$, $268_A$ are arranged in parallel and spaced apart from one another. A plurality of passive rollers (see, e.g., rollers $266_P$, $268_P$, $270a_{P1}$, $270a_{P2}$, $270a_{P3}$, $270a_{P4}$, $270b_{P1}$, $270b_{P2}$, $270b_{P3}$, $270b_{P4}$, $270c_{P1}$, $270c_{P2}$, $270c_{P3}$, $270c_{P4}$, $270d_{P1}$, $270d_{P2}$, $270d_{P3}$, $270d_{P4}$) of the Y-direction workpiece transporter subassembly 26 are arranged between, in parallel with, and rotatably-connected to both of the powered rollers $266_A$, $268_A$. When one or more motors 16 are actuated for directly impart rotation to the powered rollers $266_A$, $268_A$, the plurality of passive rollers $266_P$, $268_P$, $270a_{P1}$, $270a_{P2}$, $270a_{P3}$, $270a_{P4}$, $270b_{P1}$, $270b_{P2}$, $270b_{P3}$, $270b_{P4}$, $270c_{P1}$, $270c_{P2}$, $270c_{P3}$, $270c_{P4}$, $270d_{P1}$, $270d_{P2}$, $270d_{P3}$, $270d_{P4}$ are rotationally synched with the rotational direction of the powered rollers $266_A$, $268_A$; accordingly, when the one or more motors 16 de/actuate rotation of the powered rollers $266_A$, $268_A$, the synched rotation of the plurality of passive rollers $266_P$, $268_P$, $270a_{P1}$, $270a_{P2}$, $270a_{P3}$, $270a_{P4}$, $270b_{P1}$, $270b_{P2}$, $270b_{P3}$, $270b_{P4}$, $270c_{P1}$, $270c_{P2}$, $270c_{P3}$, $270c_{P4}$, $270d_{P1}$, $270d_{P2}$, $270d_{P3}$, $270d_{P4}$ results in simultaneous starting or stopping of the corresponding rotational movement associated with the powered rollers $266_A$, $268_A$, which eliminates over-speed or under-speed rotational movement of the plurality of passive rollers $266_P$, $268_P$, $270a_{P1}$, $270a_{P2}$, $270a_{P3}$, $270a_{P4}$, $270b_{P1}$, $270b_{P2}$, $270b_{P3}$, $270b_{P4}$, $270c_{P1}$, $270c_{P2}$, $270c_{P3}$, $270c_{P4}$, $270d_{P1}$, $270d_{P2}$, $270d_{P3}$, $270d_{P4}$.

Furthermore, a central processing unit (CPU) 18 (see also, e.g., FIG. 31) may be connected to one or more components (e.g., a fluid source 17 connected to a Z-direction lift assembly 22, one or more workpiece sensors 46, or the like) of the workpiece diverter station 10 and the one or more motors 16. The CPU 18 may be wirelessly connected and/or hardwired connected to one or components of the workpiece diverter station 10 and the one or more motors 16 for controlling one or components of the workpiece diverter station 10 and the one or more motors 16. Control of the of the one or more components may include, for example, sending one or more signals to the powered rollers $80_A$, $82_A$ or the powered rollers $266_A$, $268_A$ for impart synched rotation or ceasing synched rotation of respectively, the plurality of passive rollers $80_{P1}$, $80_{P2}$, $82_{P1}$, $82_{P2}$, $84_{P1}$, $84_{P2}$, $84_{P4}$, $86_{P1}$, $86_{P2}$, $86_{P3}$, $88_{P1}$, $88_{P2}$, $88_{P3}$ or the plurality of passive rollers $266_P$, $268_P$, $270a_{P1}$, $270a_{P2}$, $270a_{P3}$, $270a_{P4}$, $270b_{P1}$, $270b_{P2}$, $270b_{P3}$, $270b_{P4}$, $270c_{P1}$, $270c_{P2}$, $270c_{P3}$, $270c_{P4}$, $270d_{P1}$, $270d_{P2}$, $270d_{P3}$, $270d_{P4}$.

Figure 9:
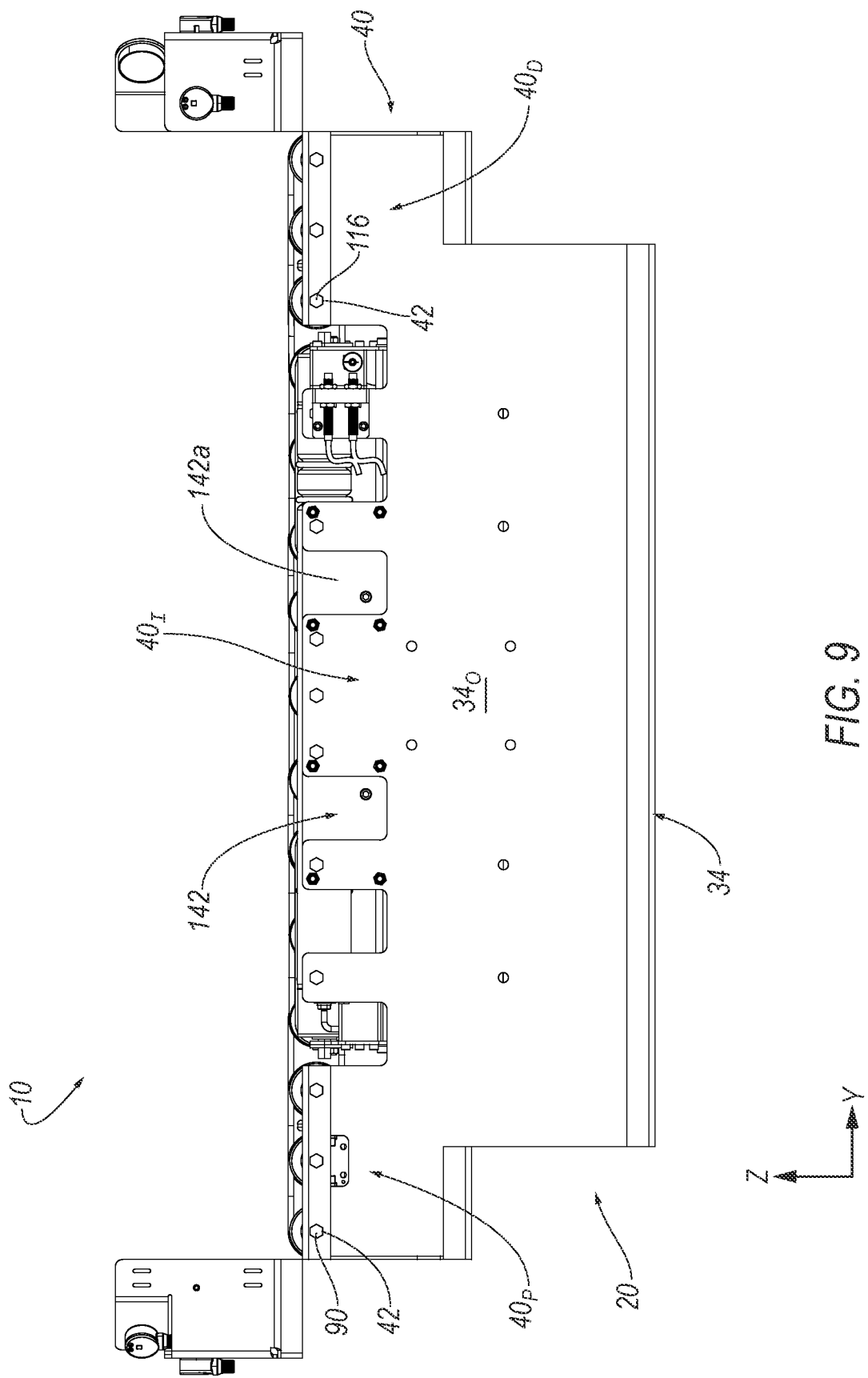
FIG. 9 is a side view of the workpiece diverter station of FIG. 4 according to arrow 9.
Figure 10:
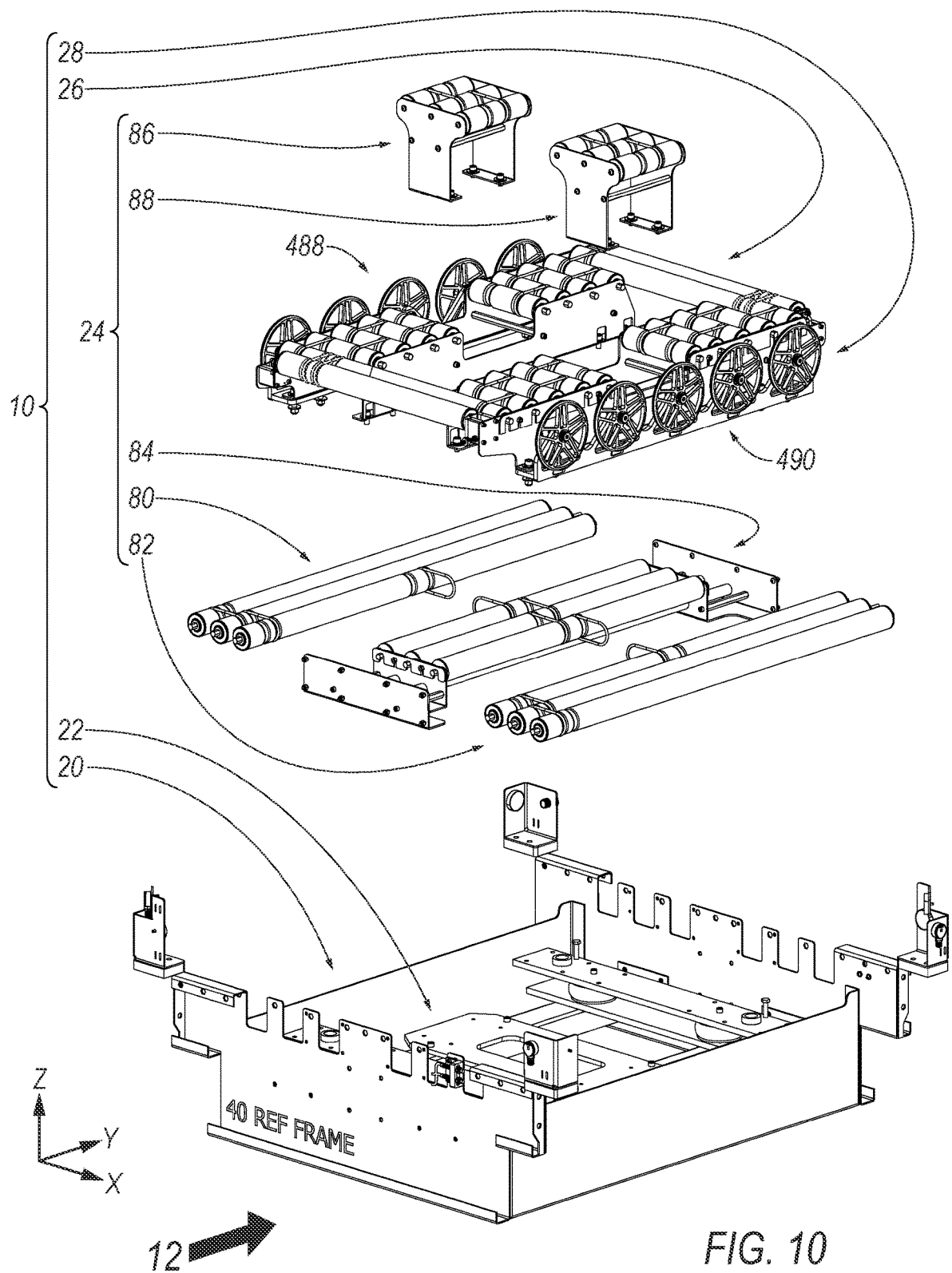
FIG. 10 is an exploded view of the exemplary workpiece diverter station of FIG. 4.

A plurality of views of a plurality of components and subassemblies of the workpiece diverter station 10 are shown generally at FIGS. 4-28. With reference to FIG. 10, the plurality of components and subassemblies may include, for example: a base frame 20 (see, e.g., FIGS. 10-15B) that contains and supports a plurality of components and subassemblies forming a Z-direction lift assembly 22 (see, e.g., FIGS. 10-11, 13-15B); a plurality of components and subassemblies forming the X-direction workpiece transporter subassembly 24 (see, e.g., FIGS. 10 and 16A-21); a plurality of components and subassemblies forming the Y-direction workpiece transporter subassembly 26 (see, e.g., FIGS. 10 and 22A-23); and a plurality of components and subassemblies forming an optional Y-direction workpiece guiding subassembly 28 (see, e.g., FIGS. 10 and 24-28).

As will be described in the following disclosure, each of the X-direction workpiece transporter subassembly 24 and the Y-direction workpiece transporter subassembly 26 may include pluralities of rollers (see, e.g., pluralities of rollers 80, 82, 84, 86, 86 associated with the X-direction workpiece transporter subassembly 24 and pluralities of rollers 268, 268, 270 associated with the Y-direction workpiece transporter subassembly 26) that may be geometrically configured in, for example, length, as desired, in order to be selectively configured to accommodate a sizing geometry (e.g., a tire diameter $T_D$) of the workpiece TW that traverses the workpiece diverter station 10. If the workpiece TW is, for example, a tire-wheel assembly, the sizing geometry of the rollers of each of the X-direction workpiece transporter subassembly 24 and the Y-direction workpiece transporter subassembly 26 may be configured to accommodate, for example, a pickup truck tire T that may include a tire diameter $T_D$ of, for example, approximately 40-inches (40").

Furthermore, as will be described in the following disclosure, each of the X-direction workpiece transporter subassembly 24 and the Y-direction workpiece transporter subassembly 26 may be rotatably-connected by a plurality of loop members (see, e.g., the plurality of loop members 110-114, 136-140, 190-196, 226-228, 258-260 associated with the X-direction workpiece transporter subassembly 24 and the plurality of loop members 288-294, 312-318, 338-392, 394-398, 400-404, 406-410 associated with the Y-direction workpiece transporter subassembly 26). Although the term "loop" is broadly utilized to describe each loop member of the plurality of loop members 110-114, 136-140, 190-196, 226-228, 258-260, 288-294, 312-318, 338-392, 394-398, 400-404, 406-410, each loop member may be alternatively referred to and include a "belt," "chain," "band," or the like.

Figure 11:
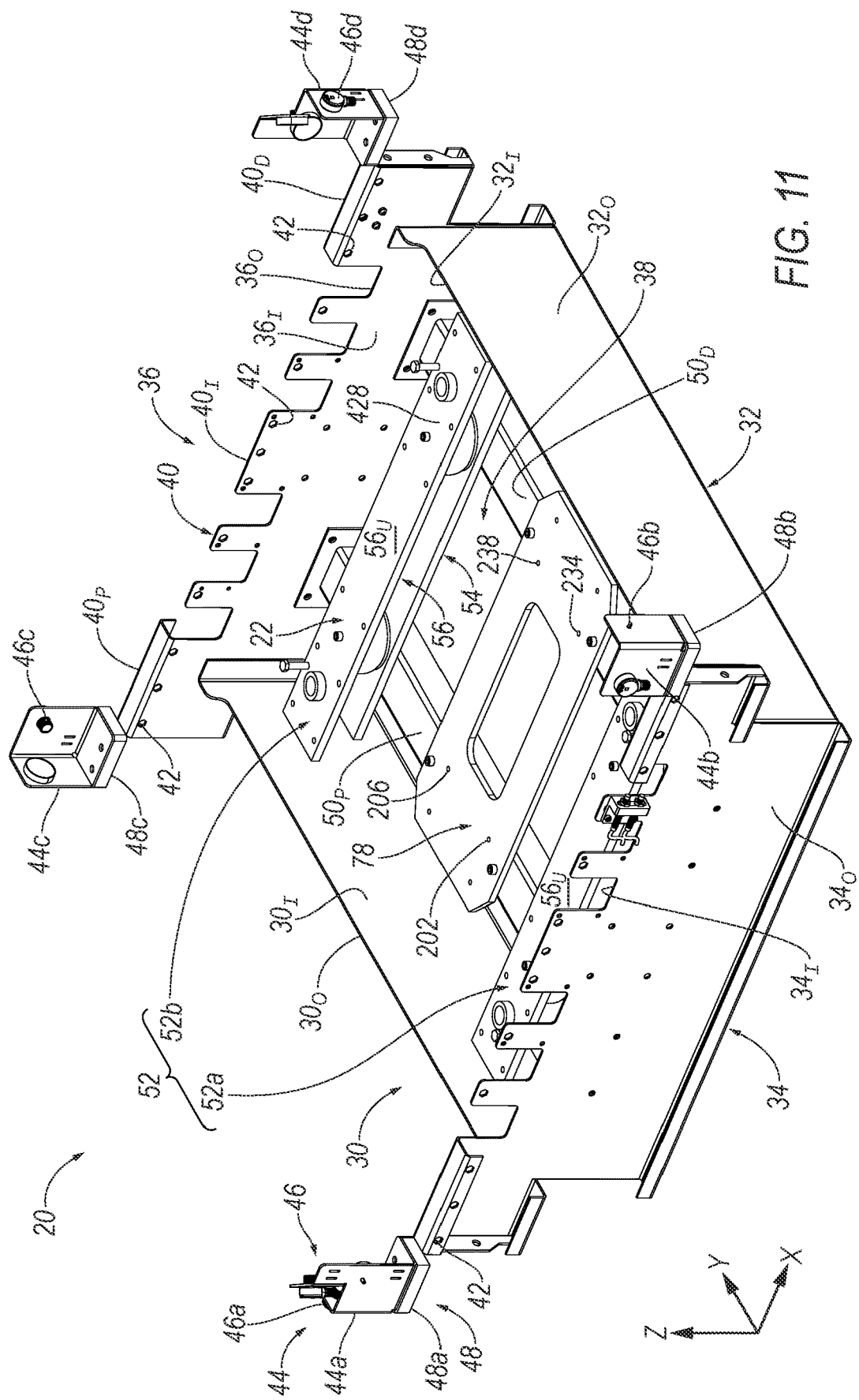
FIG. 11 is a perspective view of the exemplary base frame of the workpiece diverter station of FIG. 10.
Figure 12:
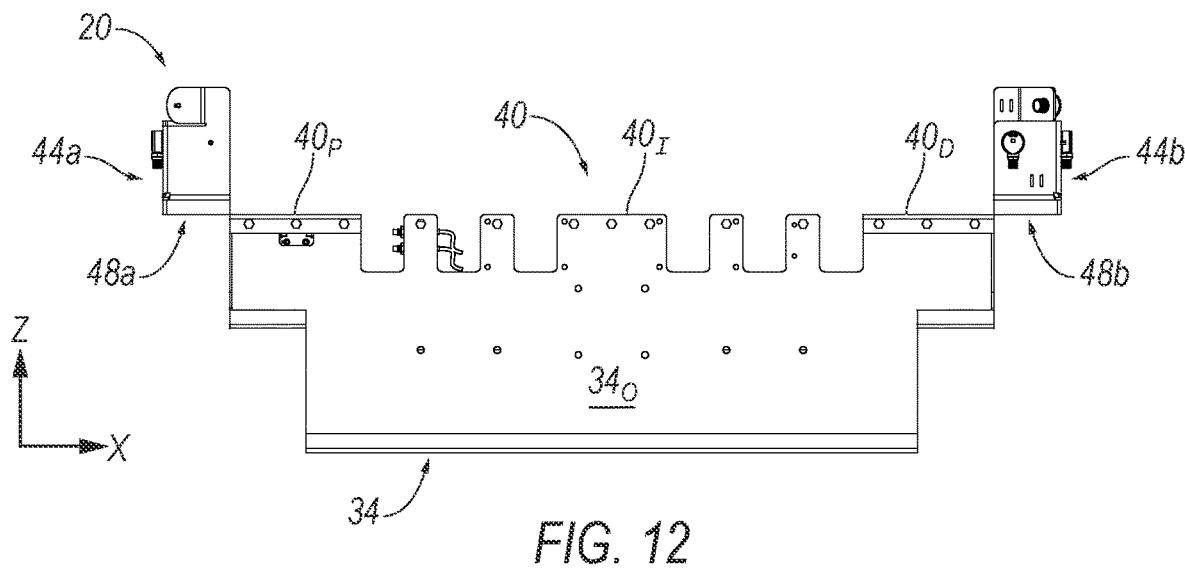
FIG. 12 is a side view of base frame of FIG. 11 according to arrow 12 of FIG. 10.

Referring to FIG. 11, in some configurations, the base frame 20 may include a plurality side panels including a first panel 30, a second panel 32, a third panel 34, and a fourth panel 36. The first panel 30 is arranged opposite the second panel 32. The third panel 34 is arranged opposite the fourth panel 36. Each of the first panel 30, the second panel 32, the third panel 34, and the fourth panel 36 include an inwardly-facing surface $30_I$, $32_I$, $34_I$, $36_I$ and an outwardly-facing surface $30_O$, $32_O$, $34_O$, $36_O$. The inwardly-facing surfaces $30_I$, $32_I$, $34_I$, $36_I$ of the first panel 30, the second panel 32, the third panel 34, and the fourth panel 36 form a cavity 38 of the base frame 20 that contains the plurality of components forming a Z-direction lift assembly 22.

A first end of the first panel 30 is connected to (e.g., fastened, welded, or the like) to the inwardly-facing surface $34_I$ of the third panel 34, and a second end of the first panel 30 is connected to (e.g., fastened, welded, or the like) to the inwardly-facing surface $36_I$ of the fourth panel 36. A first end of the second panel 32 is connected to (e.g., fastened, welded, or the like) to the inwardly-facing surface $34_I$ of the third panel 34, and a second end of the second panel 32 is connected to (e.g., fastened, welded, or the like) to the inwardly-facing surface $36_I$ of the fourth panel 36.

Both of the third panel 34 and the fourth panel 36 may include a plurality of flanges 40 extending in the Z-direction. The plurality of flanges 40 may include, for example, one or more proximal flanges $40_P$, one or more distal flanges $40_D$, one or more intermediate flanges $40_I$ arranged between the one or more proximal flanges $40_P$ and the one or more distal flanges $40_D$. Each flange $40_P$, $40_D$, $40_I$ of the plurality of flanges 40 may include one or more passages 42 that may be configured to receive or connect one or more components of the plurality of components forming, for example, the plurality of components forming the X-direction workpiece transporter subassembly 24 to the base frame 20. It should be noted that the terms "proximal" and "distal" as described above and in the following disclosure are not meant to be limiting and are utilized in reference to a proximal-to-distal direction of movement in the X-direction associated with the first conveying path P1 in the X-direction.

With continued reference to FIG. 11, the base frame 20 may also include: one or more sensor brackets 44 (see, e.g., a first sensor bracket 44a, a second sensor bracket 44b, a third sensor bracket 44c, and a fourth sensor bracket 44d); one or more workpiece sensors 46 (see, e.g., a first workpiece sensor 46a, a second workpiece sensor 46b, a third workpiece sensor 46c, and a fourth workpiece sensor 46d); and one or more mount plates 48 (see, e.g., a first mount plate 48a, a second mount plate 48b, a third mount plate 48c, and a fourth mount plate 48d). Each sensor bracket 44a, 44b, 44c, 44d of the one or more sensor brackets 44 support at least one workpiece sensor 46a, 46b, 46c, 46d of the one or more workpiece sensors 46. Each sensor bracket 44a, 44b, 44c, 44d of the one or more sensor brackets 44 may be supported by a mount plate 48a, 48b, 48c, 48d of the one or more mount plates 48.

The first mount plate 48a may be connected to or supported by the proximal flange $40_P$ of the plurality of flanges 40 extending from a proximal end of the third panel 34 of the base frame 20. The second mount plate 48b may be connected to or supported by the distal flange $40_D$ of the plurality of flanges 40 extending from a distal end of the third panel 34 of the base frame 20. The third mount plate 48c may be connected to or supported by the proximal flange $40_P$ of the plurality of flanges 40 extending from a proximal end of the fourth panel 36 of the base frame 20. The fourth mount plate 48d may be connected to or supported by the distal flange $40_D$ of the plurality of flanges 40 extending from a distal end of the fourth panel 36 of the base frame 20.

Figure 13:
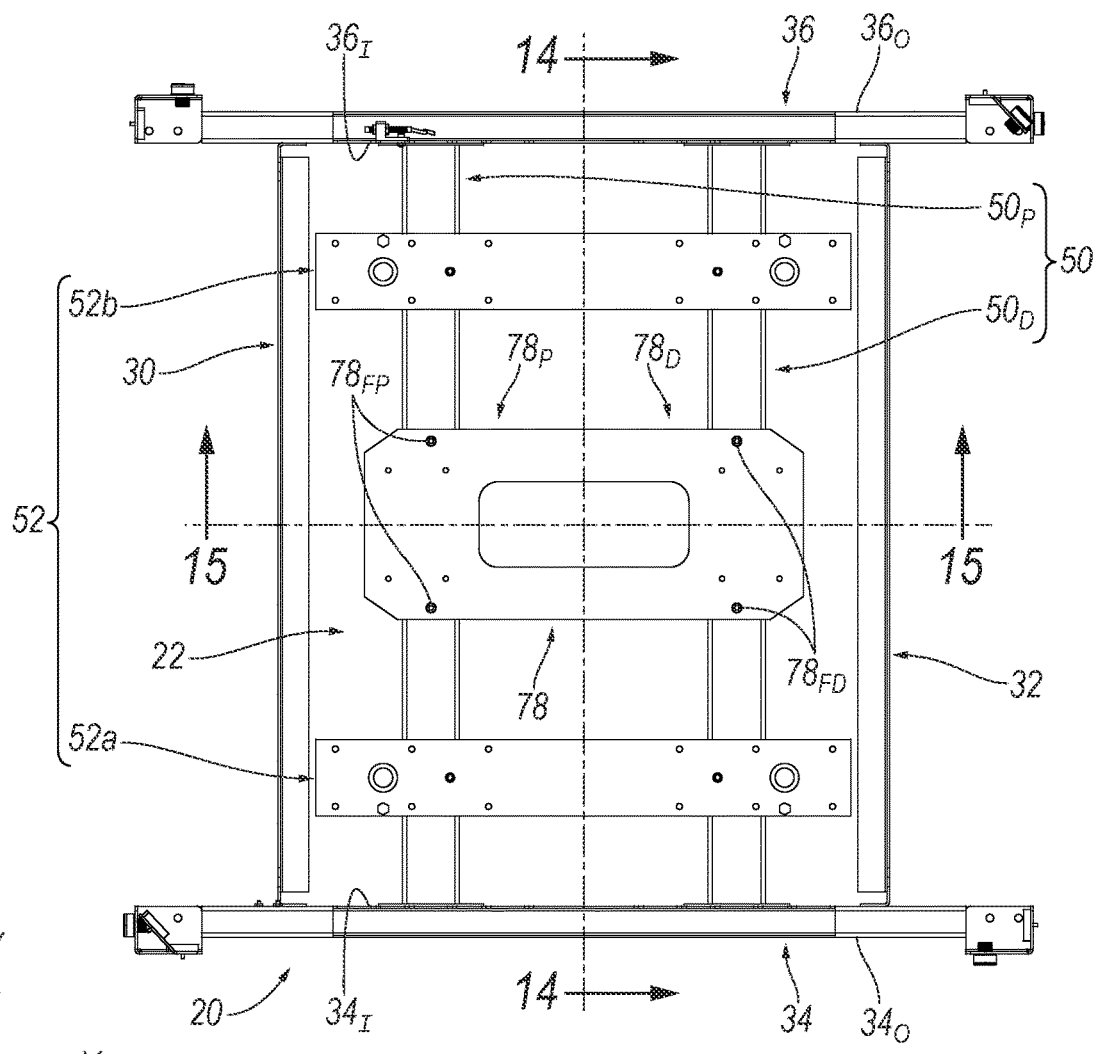
FIG. 13 is a top view of base frame of FIG. 11.

Referring to FIG. 13, in some implementations, the Z-direction lift assembly 22 may include a plurality of support beams 50 including a proximal support beam $50_P$ and a distal support beam $50_D$. A first end of the proximal support beam $50_P$ is connected to the inwardly-facing surface $34_I$ of the third panel 34 of the base frame 20. A second end of the proximal support beam $50_P$ is connected to the inwardly-facing surface $36_I$ of the fourth panel 36 of the base frame 20. A first end of the distal support beam $50_D$ is connected to the inwardly-facing surface $34_I$ of the third panel 34. A second end of the distal support beam $50_D$ is connected to the inwardly-facing surface $36_I$ of the fourth panel 36.

Referring to FIG. 11, the Z-direction lift assembly 22 may further include a plurality of lifters 52 including a first lifter 52a and a second lifter 52b. In some implementations, each of the first lifter 52a and the second lifter 52b may include: a lower plate 54; and an upper plate 56.

As seen at FIG. 15A, a lower surface $54_L$ of the lower plate 54 of the first lifter 52a is supported by and directly connected to an upper surface $50_{PU}$ of the proximal support beam $50_P$ and an upper surface $50_{DU}$ of the distal support beam $50_D$ by one or more fasteners $54_F$. Accordingly, the lower plate 54 of the first lifter 52a is spatially fixed to and supported by the proximal support beam $50_P$ and the distal support beam $50_D$, which are also fixed to and supported by, respectively, the inwardly-facing surface $34_I$ of the third panel 34 of the base frame 20 and the inwardly-facing surface $36_I$ of the fourth panel 36 of the base frame 20. In other words, the lower plate 54 of the first lifter 52a is indirectly and non-movably fixed to the base frame 20 by the proximal support beam $50_P$ and the distal support beam $50_D$.

With reference to FIG. 15A, the second lifter 52b is connected to the proximal support beam $50_P$ and the distal support beam $50_D$ in a similar manner as follows. A lower surface $54_L$ of the lower plate 54 of the second lifter 52b is supported by and directly connected to the upper surface $50_{PU}$ of the proximal support beam $50_P$ and the upper surface $50_{DU}$ of the distal support beam $50_D$ by one or more fasteners $54_F$. Accordingly, the lower plate 54 of the second lifter 52b is spatially fixed to and supported by the proximal support beam $50_P$ and the distal support beam $50_D$, which are also fixed to and supported by, respectively, the inwardly-facing surface $34_I$ of the third panel 34 of the base frame 20 and the inwardly-facing surface $36_I$ of the fourth panel 36 of the base frame 20. In other words, the lower plate 54 of the second lifter 52b is indirectly and non-movably fixed to the base frame 20 by the proximal support beam $50_P$ and the distal support beam $50_D$.

As seen at FIG. 15A, in other implementations, each of the first lifter 52a and the second lifter 52b may further include: a proximal spacer 58; a distal spacer 60; a proximal stop pad 62; a distal stop pad 64; a proximal guide pin 66; a distal guide pin 68; a proximal Z-direction fastener 70; and a distal Z-direction fastener 72.

The proximal spacer 58 and the distal spacer 60 may respectively include a thickness $T_{58}$, $T_{60}$ (see, e.g., FIG. 15A). The proximal spacer 58 and the distal spacer 60 are arranged between the lower plate 54 and the upper plate 56. The proximal spacer 58 and the distal spacer 60 contribute to separating the lower plate 54 from the upper plate 56 approximately about an axial distance $D_{52}$ in the Z-direction. The axial distance $D_{52}$ may be approximately equal or slightly greater than the thickness $T_{58}$, $T_{60}$ of the proximal spacer 58 and the distal spacer 60 (e.g., in some instances, one or more washers or the like may be located between one or both of the proximal spacer 58 and the distal spacer 60 and the lower plate 54 and/or the upper plate 56).

As seen at FIG. 15A, the proximal guide pin 66 axially extends through: the proximal stop pad 62; the upper plate 56; the proximal spacer 58; and the lower plate 54. The proximal Z-direction fastener 70 secures an upper end of the proximal guide pin 66 to the proximal stop pad 62 and the upper plate 56. As seen at FIG. 15A, a proximal portion of a length (see, e.g., $L_{66-P}$) of the proximal guide pin 66 is configured to extend beyond a lower surface $54_L$ of the lower plate 54.

The distal guide pin 68 axially extends through: the distal stop pad 64; the upper plate 56; the distal spacer 60; and the lower plate 54. The distal Z-direction fastener 72 secures an upper end of the distal guide pin 68 to the distal stop pad 64 and the upper plate 56. As seen at FIG. 15A, a proximal portion of a length (see, e.g., $L_{68-P}$) of the distal guide pin 68 is configured to extend beyond the lower surface $54_L$ of the lower plate 54.

In yet other implementations, each of the first lifter 52a and the second lifter 52b may further include: a proximal Z-direction lifting actuator 74; and a distal Z-direction lifting actuator 76. In some configurations, each of the proximal Z-direction lifting actuator 74 and the distal Z-direction lifting actuator 76 may be an inflatable device such as, for example, a bladder, airbag, or the like. If the proximal Z-direction lifting actuator 74 and the distal Z-direction lifting actuator 76 are inflatable devices, the proximal Z-direction lifting actuator 74 and the distal Z-direction lifting actuator 76 may be connected to the pressurized fluid source 17 (see, e.g., FIGS. 1A, 1B), which may include one or more of, for example, an air source, a pump, or the like that will provide or expel fluid to/from the proximal Z-direction lifting actuator 74 and the distal Z-direction lifting actuator 76.

Figure 14:
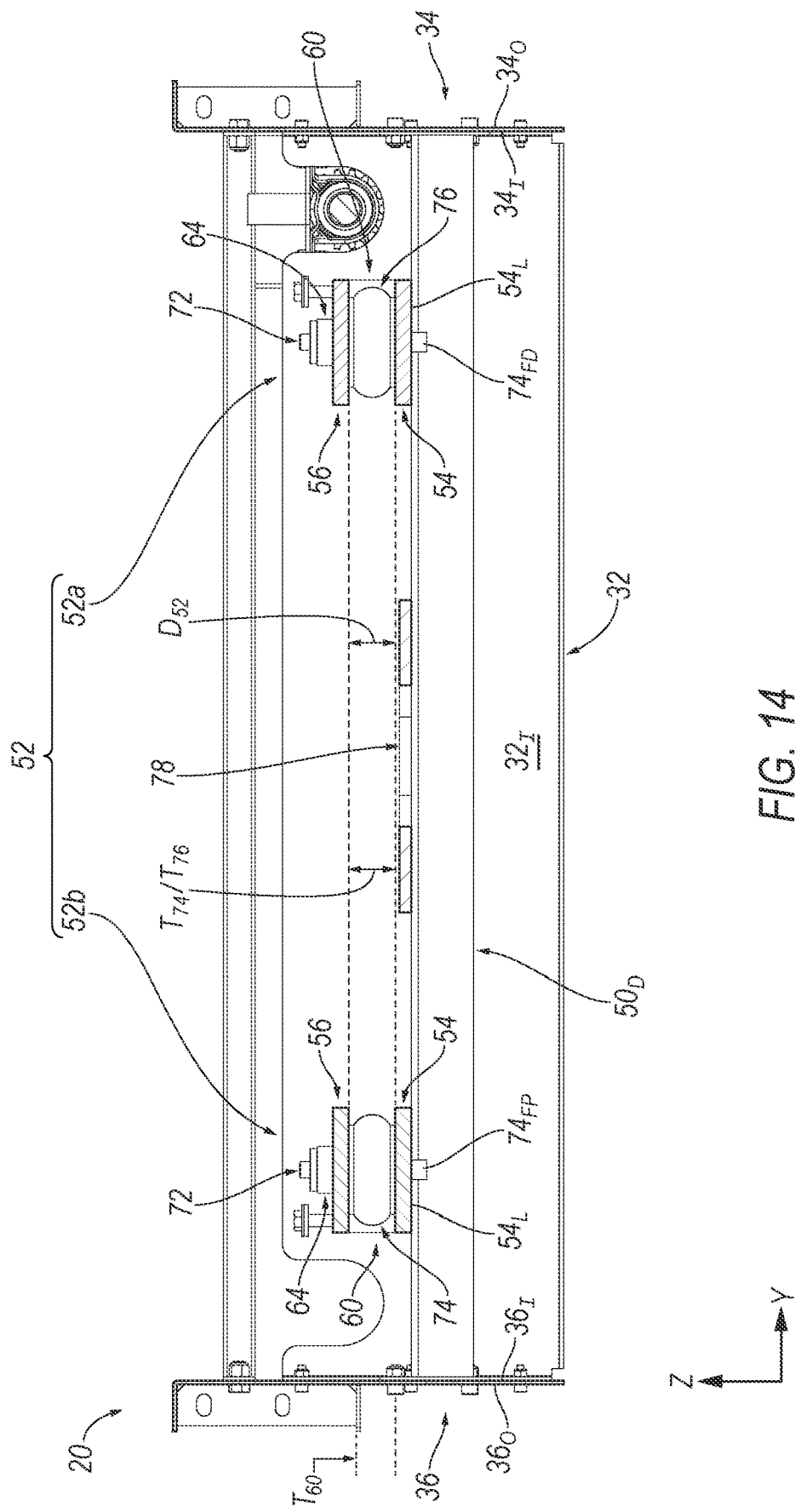
FIG. 14 is a cross-sectional view of the base frame according to line 14-14 of FIG. 13.

In some configurations, the proximal Z-direction lifting actuator 74 may be connected to the proximal portion $54_P$ of the lower plate 54 by a proximal fastener $74_{FP}$ (see, e.g., FIGS. 14-15B). In other configurations, the distal Z-direction lifting actuator 76 may be connected to the distal portion $54_D$ of the lower plate 54 by a distal fastener $76_{FD}$ (see, e.g., FIGS. 14-15B).

As seen at FIG. 15A, when the proximal Z-direction lifting actuator 74 and the distal Z-direction lifting actuator 76 are arranged in a first orientation or "down" orientation (e.g., a non-inflated orientation), the proximal portion of the length $L_{68-P}$ of the distal guide pin 68 extends beyond the lower surface $54_L$ of the lower plate 54. Furthermore, in some instances, when the proximal Z-direction lifting actuator 74 and the distal Z-direction lifting actuator 76 are arranged in the first orientation or "down" orientation, both of the proximal Z-direction lifting actuator 74 and the distal Z-direction lifting actuator 76 may include a reconfigurable thickness $T_{74}$, $T_{76}$ that may be approximately equal to at least the thickness $T_{58}$, $T_{60}$ of the proximal spacer 58 and the distal spacer 60. Accordingly, when the proximal Z-direction lifting actuator 74 and the distal Z-direction lifting actuator 76 are arranged in the first orientation or "down" orientation, the axial distance $D_{52}$ extending between the lower plate 54 and the upper plate 56 may be approximately equal to the reconfigurable thickness $T_{74}$, $T_{76}$ of the proximal Z-direction lifting actuator 74 and the distal Z-direction lifting actuator 76 and/or at least the thickness $T_{58}$, $T_{60}$ of the proximal spacer 58 and the distal spacer 60.

With reference to FIG. 15B, when the proximal Z-direction lifting actuator 74 and the distal Z-direction lifting actuator 76 are arranged in a second orientation or "up" orientation (e.g., an inflated orientation), the reconfigurable thickness $T_{74}$, $T_{76}$ of the proximal Z-direction lifting actuator 74 and the distal Z-direction lifting actuator 76 becomes greater than the thickness $T_{58}$, $T_{60}$ of the proximal spacer 58 and the distal spacer 60. Accordingly, when the proximal Z-direction lifting actuator 74 and the distal Z-direction lifting actuator 76 are arranged in a second orientation or "up" orientation, the proximal Z-direction lifting actuator 74 and the distal Z-direction lifting actuator 76 push or lift the upper plate 56 away from the lower plate 54. By pushing or lifting the upper plate 56 away from the lower plate 54, the axial distance $D_{52}$ extending between the lower plate 54 and the upper plate 56 correspondingly increases such that the axial distance $D_{52}$ may be approximately equal to the reconfigurable (e.g., inflated) thickness $T_{74}$, $T_{76}$ of the proximal Z-direction lifting actuator 74 and the distal Z-direction lifting actuator 76 when the proximal Z-direction lifting actuator 74 and the distal Z-direction lifting actuator 76 are arranged in the second orientation or "up" orientation.

With reference to FIGS. 11, 13-14, an intermediate plate is shown generally at 78. Although the intermediate plate 78 is arranged near components of the Z-direction lift assembly 22 (e.g., the intermediate plate 78 is arranged between the first lifter 52a and the second lifter 52b), the intermediate plate 78 does not contribute to any Z-direction movement associated with the Z-direction lift assembly 22. As seen at, for example, FIG. 13, a proximal portion $78_P$ of the intermediate plate 78 is connected to the proximal support beam $50_P$ by one or more proximal fasteners $78_{FP}$, and a distal portion $78_D$ of the intermediate plate 78 is connected to the distal support beam $50_D$ by one or more distal fasteners $78_{FD}$; accordingly, the intermediate plate 78 is spatially fixed to and supported by the proximal support beam $50_P$ and the distal support beam $50_D$, which are also fixed to and supported by, respectively, the inwardly-facing surface $34_I$ of the third panel 34 of the base frame 20 and the inwardly-facing surface $36_I$ of the fourth panel 36 of the base frame 20. In other words, the intermediate plate 78 is indirectly and non-movably fixed to the base frame 20 by the proximal support beam $50_P$ and the distal support beam $50_D$.

Figure 16A:
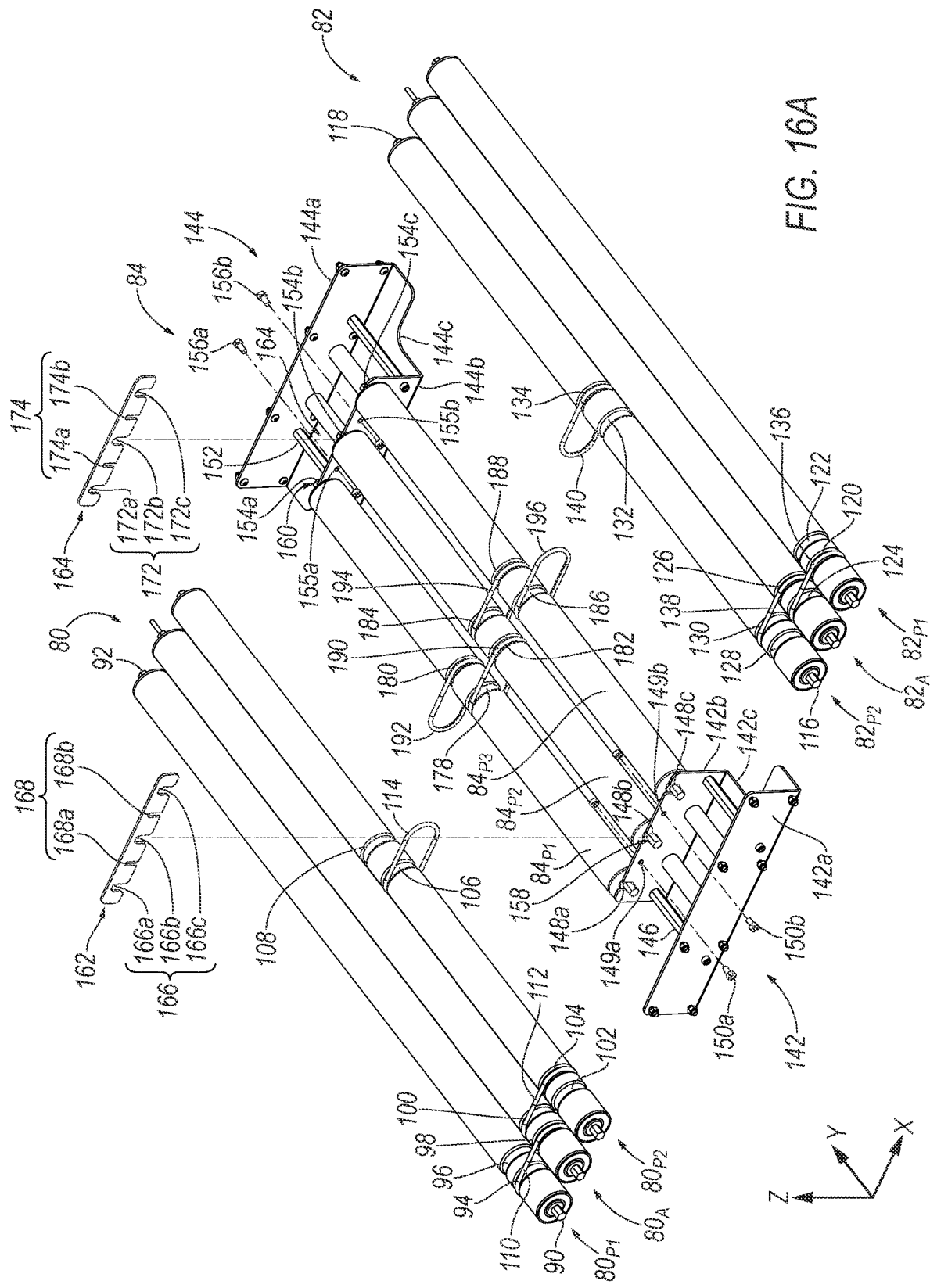
FIG. 16A is a partially exploded perspective view of an exemplary portion of an X-direction workpiece transporter subassembly of the workpiece diverter station of FIG. 10.
Figure 17:
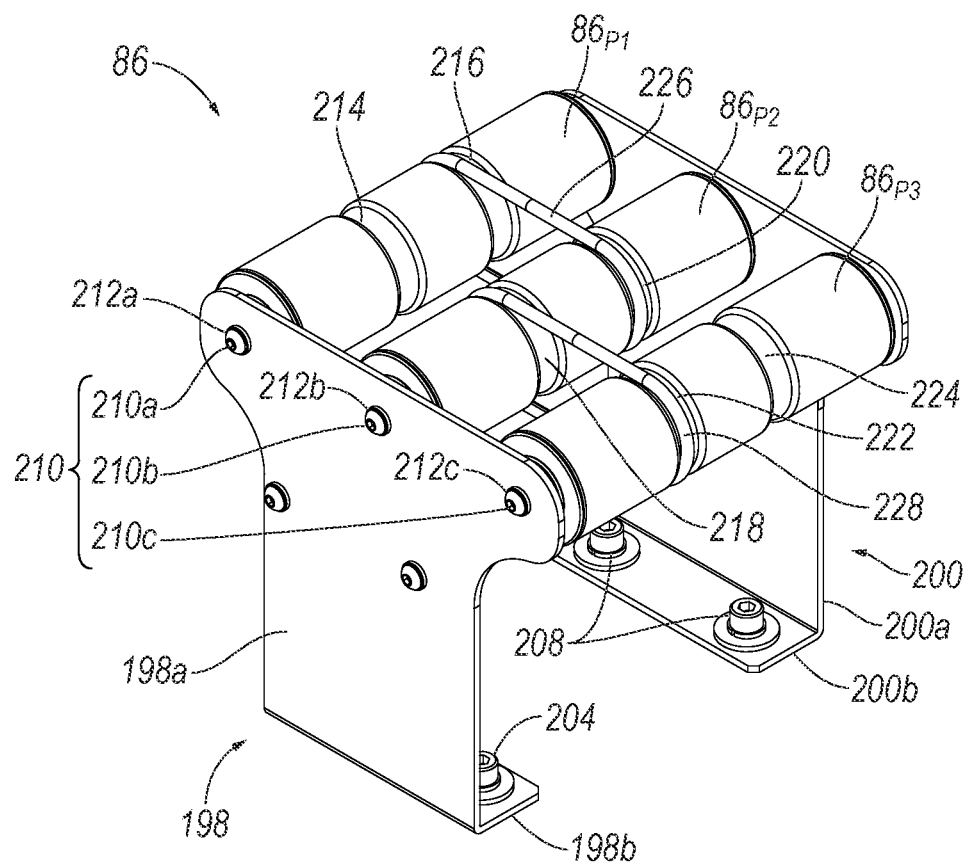
FIG. 17 is an assembled perspective view of another exemplary portion of the X-direction workpiece transporter subassembly of the workpiece diverter station of FIG. 10.
Figure 18:
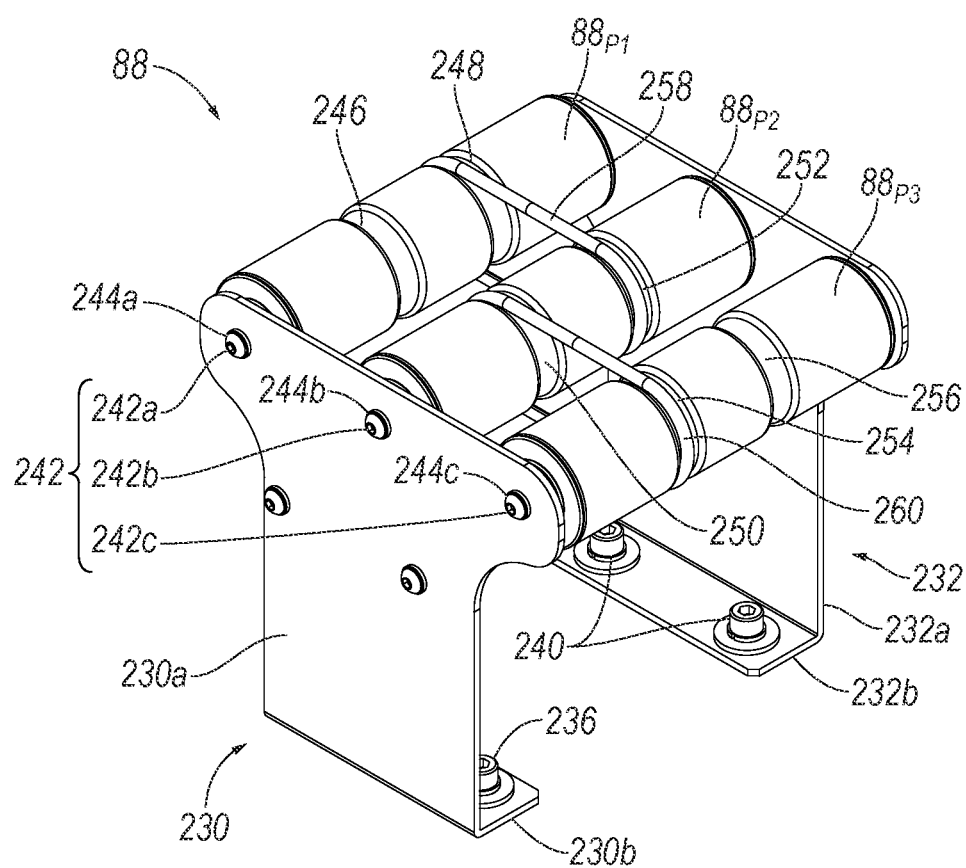
FIG. 18 is an assembled perspective view of yet another exemplary portion of the X-direction workpiece transporter subassembly of the workpiece diverter station of FIG. 10.

Referring to FIGS. 10 and 16A, in some configurations, a portion of the X-direction workpiece transporter subassembly 24 may include: a first plurality of proximal rollers 80; a first plurality of distal rollers 82; and a plurality of intermediate rollers 84. Referring to FIGS. 10 and 17, in other configurations, another portion of the X-direction workpiece transporter subassembly 24 may further include: a second plurality of proximal rollers 86. Referring to FIGS. 10 and 18, in further configurations, another portion of the X-direction workpiece transporter subassembly 24 may further include: a second plurality of distal rollers 88. As will be described in the following disclosure, all of the rollers associated with the X-direction workpiece transporter subassembly 24 are parallel to one another and are connected directly or indirectly to the plurality of flanges 40 extending in the Z-direction from both of the third panel 34 and the fourth panel 36.

As seen at FIG. 16A, the first plurality of proximal rollers 80 may include, for example, three rollers. The three rollers of the first plurality of proximal rollers 80 may include, for example: a proximal passive (i.e., "non-powered" or "slave") roller $80_{P1}$, an intermediate active (i.e., "powered" or "master") roller $80_A$, and a distal passive (i.e., "non-powered" or "slave") roller $80_{P2}$.

With reference to FIG. 16A, a first end of each of the proximal passive roller $80_{P1}$, the intermediate powered roller $80_A$, and the distal passive roller $80_{P2}$ includes a male portion or pin 90 that is configured for arrangement in a corresponding passage 42 (see, e.g., FIGS. 9 and 11) formed by the flanges $40_P$, $40_D$, $40_I$ of the plurality of flanges 40 of the third panel 34. A second end of each of the proximal passive roller $80_{P1}$, the intermediate powered roller $80_A$, and the distal passive roller $80_{P2}$ includes a male portion or pin 92 that is configured for arrangement in a corresponding passage 42 (see, e.g., FIG. 11) formed by the flanges $40_P$, $40_D$, $40_I$ of the plurality of flanges 40 of the fourth panel 36.

As also seen at FIG. 16A, the proximal passive roller $80_{P1}$ also includes a first circumferential channel 94 and a second circumferential channel 96. Both of the first circumferential channel 94 and the second circumferential channel 96 are arranged near or closer to the first end of the proximal passive roller $80_{P1}$ that includes the pin 90.

The intermediate powered roller $80_A$ also includes a first circumferential channel 98 and a second circumferential channel 100. Both of the first circumferential channel 98 and the second circumferential channel 100 are arranged near or closer to the first end of the intermediate powered roller $80_A$ that includes the pin 90.

The distal passive roller $80_{P2}$ also includes a first circumferential channel 102 and a second circumferential channel 104. Both of the first circumferential channel 102 and the second circumferential channel 104 are arranged near or closer to the first end of the distal passive roller $80_{P2}$ that includes the pin 90.

The distal passive roller $80_{P2}$ further includes a third circumferential channel 106 and a fourth circumferential channel 108. Both of the third circumferential channel 106 and the fourth circumferential channel 108 are arranged in a middle region or central region of the distal passive roller $80_{P2}$ between the first end of the distal passive roller $80_{P2}$ that includes the pin 90 and the second end of the distal passive roller $80_{P2}$ that includes the pin 92.

Each circumferential channel 94-108 associated with the first plurality of proximal rollers 80 are configured to receive a first plurality of loop members (see, e.g., loop members 110, 112, 114). In some configurations, the first circumferential channel 94 of the proximal passive roller $80_{P1}$ and the first circumferential channel 98 of the intermediate powered roller $80_A$ are sized for receiving a first loop member 110 that rotatably-connects the proximal passive roller $80_{P1}$ to the intermediate powered roller $80_A$. In other configurations, the second circumferential channel 100 of the intermediate powered roller $80_A$ and the second circumferential channel 104 of the distal passive roller $80_{P2}$ are sized for receiving a second loop member 112 that rotatably-connects the intermediate powered roller $80_A$ to the distal passive roller $80_{P2}$. In yet other configurations, the third circumferential channel 106 of the distal passive roller $80_{P2}$ is sized for receiving a third loop member 114. With reference to FIG. 17, the third loop member 114 is configured to rotatably-connect the distal passive roller $80_{P2}$ to a roller (see, e.g., at a first circumferential channel 214 of a proximal passive roller $86_{P1}$) of the second plurality of proximal rollers 86.

With further reference to FIG. 16A, the first plurality of distal rollers 82 may include, for example, three rollers. The three rollers of the first plurality of distal rollers 82 may include, for example: a distal passive (i.e., "non-powered" or "slave") roller $82_{P1}$, an intermediate active (i.e., "powered"

or "master") roller $82_A$, and a proximal passive (i.e., "non-powered" or "slave") roller $82_{P2}$.

A first end of each of the distal passive roller $82_{P1}$, the intermediate powered roller $82_A$, and the proximal passive roller $82_{P2}$ includes a male portion or pin 116 that is configured for arrangement in a corresponding passage 42 (see, e.g., FIGS. 9 and 11) formed by the flanges $40_P$, $40_D$, $40_I$ of the plurality of flanges 40 of the third panel 34. A second end of each of the distal passive roller $82_{P1}$, the intermediate powered roller $82_A$, and the proximal passive roller $82_{P2}$ includes a male portion or pin 118 that is configured for arrangement in a corresponding passage 42 (see, e.g., FIG. 11) formed by the flanges $40_P$, $40_D$, $40_I$ of the plurality of flanges 40 of the fourth panel 36.

The distal passive roller $82_{P1}$ also includes a first circumferential channel 120 and a second circumferential channel 122. Both of the first circumferential channel 120 and the second circumferential channel 122 are arranged near or closer to the first end of the distal passive roller $82_{P1}$ that includes the pin 116.

The intermediate powered roller $82_A$ also includes a first circumferential channel 124 and a second circumferential channel 126. Both of the first circumferential channel 124 and the second circumferential channel 126 are arranged near or closer to the first end of the intermediate powered roller $82_A$ that includes the pin 116.

The proximal passive roller $82_{P2}$ also includes a first circumferential channel 128 and a second circumferential channel 130. Both of the first circumferential channel 128 and the second circumferential channel 130 are arranged near or closer to the first end of the proximal passive roller $82_{P2}$ that includes the pin 116.

The proximal passive roller $82_{P2}$ further includes a third circumferential channel 132 and a fourth circumferential channel 134. Both of the third circumferential channel 132 and the fourth circumferential channel 134 are arranged in a middle region or central region of the proximal passive roller $82_{P2}$ between the first end of the proximal passive roller $82_{P2}$ that includes the pin 116 and the second end of the proximal passive roller $82_{P2}$ that includes the pin 118.

Each circumferential channel 120-134 associated with the first plurality of distal rollers 82 are configured to receive a second plurality of loop members (see, e.g., loop members 136, 138, 140). In some configurations, the first circumferential channel 120 of the distal passive roller $82_{P1}$ and the first circumferential channel 124 of the intermediate powered roller $82_A$ are sized for receiving a first loop member 136 that rotatably-connects the distal passive roller $82_{P1}$ to the intermediate powered roller $82_A$. In other configurations, the second circumferential channel 126 of the intermediate powered roller $82_A$ and the second circumferential channel 130 of the proximal passive roller $82_{P2}$ are sized for receiving a second loop member 138 that rotatably-connects the intermediate powered roller $82_A$ to the proximal passive roller $82_{P2}$. In yet other configurations, the fourth circumferential channel 134 of the proximal passive roller $82_{P2}$ is sized for receiving a third loop member 140. With reference to FIG. 18, the third loop member 140 is configured to rotatably-connect the proximal passive roller $82_{P2}$ to a roller (see, e.g., at a second circumferential channel 256 of a distal passive roller $88_{P3}$) of the second plurality of distal rollers 88.

With even further reference to FIG. 16A, the plurality of intermediate rollers 84 may include, for example, three rollers. The three rollers of the plurality of intermediate rollers 84 may include, for example: a proximal passive (i.e., "non-powered" or "slave") roller $84_{P1}$, an intermediate passive (i.e., "non-powered" or "slave") roller $84_{P2}$, and a distal passive (i.e., "non-powered" or "slave") roller $84_{P3}$.

Unlike the first plurality of proximal rollers 80 and the first plurality of distal rollers 82, the plurality of intermediate rollers 84 are not directly supported by the flanges $40_P$, $40_D$, $40_I$ of the plurality of flanges 40 of the third panel 34 of the base frame 20 and the fourth panel 36 of the base frame 20. Rather, as seen at FIG. 16A, the plurality of intermediate rollers 84 are supported by a first panel extension bracket 142 (that is directly connected to the third panel 34 of the base frame 20 by way of one or more fasteners or weldments as seen at, e.g., FIG. 9) and a second panel extension bracket 144 (that is directly connected to the fourth panel 36 of the base frame 20 by one or more fasteners or weldments). Accordingly, the plurality of intermediate rollers 84 may be said to be indirectly connected to, respectively, the third panel 34 and the fourth panel 36 by way of, respectively, the first panel extension bracket 142 and the second panel extension bracket 144.

The first panel extension bracket 142 includes a first flange 142a, a second flange 142b, and a third flange 142c that connects the first flange 142a to the second flange 142b. The first panel extension bracket 142 also includes one or more standoff bars 146 extending between and connecting the first flange 142a to the second flange 142b. Furthermore, the one or more standoff bars 146 are arranged over the third flange 142c. As seen at FIG. 9, the first flange 142a is directly connected to the third panel 34 of the base frame 20.

With reference to FIG. 16A, the second flange 142b of the first panel extension bracket 142 includes a proximal recess or groove 148a, an intermediate recess or groove 148b, and a distal recess or groove 148c. With further reference to FIG. 16A, the second flange 142b of the first panel extension bracket 142 includes a proximal fastener-receiving passage 149a that is sized for receiving a first fastener 150a and a distal fastener-receiving passage 149b that is sized for receiving a second fastener 150b. The first fastener 150a may be arranged between the proximal recess or groove 148a and the intermediate recess or groove 148b. The second fastener 150b may be arranged between the intermediate recess or groove 148b and the distal recess or groove 148c.

The second panel extension bracket 144 includes a first flange 144a, a second flange 144b, and a third flange 144c that connects the first flange 144a to the second flange 144b. The second panel extension bracket 144 also includes one or more standoff bars 152 extending between and connecting the first flange 144a to the second flange 144b. Furthermore, the one or more standoff bars 152 are arranged over the third flange 144c. In a substantially similar manner as described above with respect to the first panel extension bracket 142, the first flange 144a is directly connected to the fourth panel 36 of the base frame 20.

In a similar manner as described above with respect to the second flange 142b of the first panel extension bracket 142 at FIG. 16A, the second flange 144b of the second panel extension bracket 144 includes a proximal recess or groove 154a, an intermediate recess or groove 154b, and a third recess or groove 154c. With further reference to FIG. 16A, the second flange 144b of the second panel extension bracket 144 includes a proximal fastener-receiving passage 155a that is sized for receiving a first fastener 156a and a distal fastener-receiving passage 155b that is sized for receiving a second fastener 156b. The first fastener 156a may be arranged between the proximal recess or groove 154a and the intermediate recess or groove 154b. The second fastener 156b may be arranged between the intermediate recess or groove 154b and the third recess or groove 154c.

With reference back to FIG. 16A with respect to the plurality of intermediate rollers 84, a first end of each of the proximal passive roller $84_{P1}$, the intermediate passive roller $84_{P2}$, and the distal passive roller $84_{P3}$ includes a male portion or pin 158 that is configured for arrangement in, correspondingly, the proximal recess or groove 148a, the intermediate recess or groove 148b, and the distal recess or groove 148c of the second flange 142b of the first panel extension bracket 142. Similarly, a second end of each of the proximal passive roller $84_{P1}$, the intermediate passive roller $84_{P2}$, and the distal passive roller $84_{P3}$ includes a male portion or pin 160 that is configured for arrangement in, correspondingly, the proximal recess or groove 154a, the intermediate recess or groove 154b, and the third recess or groove 154c of the second flange 142b of the first panel extension bracket 142.

Once the pins 158, 160 of the proximal passive roller $84_{P1}$, the intermediate passive roller $84_{P2}$, and the distal passive roller $84_{P3}$ are respectively arranged within the grooves 148a-148c, 154a-154c of, respectively, the first panel extension bracket 142 and the second panel extension bracket 144, a first servicing access clamp plate 162 and a second servicing clamp plate 164 are respectively removably-secured to the first panel extension bracket 142 and the second panel extension bracket 144.

Figure 16B:
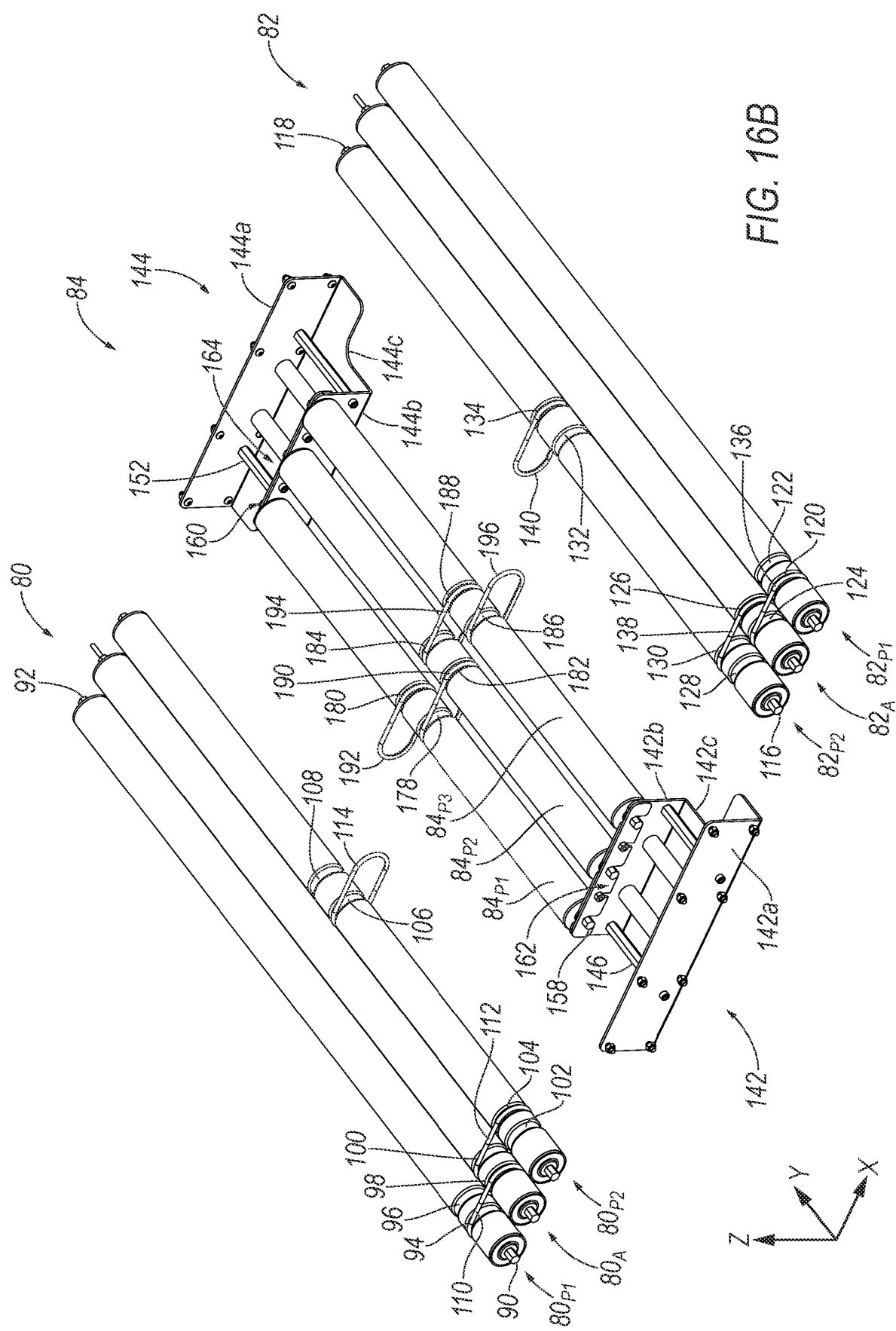
FIG. 16B is an assembled perspective view of the portion of the X-direction workpiece transporter subassembly of FIG. 16A.

As seen at FIG. 16A, the first servicing access clamp plate 162 includes a plurality of roller-pin-receiving grooves 166 including a proximal pin-receiving groove 166a, an intermediate pin-receiving groove 166b, and a distal pin-receiving groove 166c that are configured to receive the pins 158 extending from the first end of each of the proximal passive roller $84_{P1}$, the intermediate passive roller $84_{P2}$, and the distal passive roller $84_{P3}$. With continued reference to FIG. 16A, the first servicing access clamp plate 162 includes a plurality of fastener-receiving grooves 168 including a first fastener-receiving groove 168a and a second fastener-receiving groove 168b. As seen at FIG. 16B, once the first servicing access clamp plate 162 is interfaced with the pins 158, the first fastener 150a, and the second fastener 150b, the first servicing access clamp plate 162 is removably-secured to the second flange 142b of the first panel extension bracket 142.

With continued reference to FIG. 16A, the second servicing access clamp plate 164 similarly includes a plurality of roller-pin-receiving grooves 172 including a proximal pin-receiving groove 172a, an intermediate pin-receiving groove 172b, and a distal pin-receiving groove 172c that are configured to receive the pins 160 extending from the second end of each of the proximal passive roller $84_{P1}$, the intermediate passive roller $84_{P2}$, and the distal passive roller $84_{P3}$. With continued reference to FIG. 16, the second servicing access clamp plate 164 includes a plurality of fastener-receiving grooves 174 including a first fastener-receiving groove 174a and a second fastener-receiving groove 174b. Once the second servicing access clamp plate 164 is interfaced with the pins 160, the first fastener 156a, and the second fastener 156b, the second servicing access clamp plate 164 is removably-secured to the second flange 144b of the second panel extension bracket 144.

With further reference back to FIG. 16A with respect to the plurality of intermediate rollers 84, the proximal passive roller $84_{P1}$ also includes a first circumferential channel 178 and a second circumferential channel 180. Both of the first circumferential channel 178 and the second circumferential channel 180 are arranged in a middle region or central region of the proximal passive roller $84_{P1}$.

The intermediate passive roller $84_{P2}$ also includes a first circumferential channel 182 and a second circumferential channel 184. Both of the first circumferential channel 182 and the second circumferential channel 184 are arranged in a middle region or central region of the intermediate passive roller $84_{P2}$.

The distal passive roller $84_{P3}$ also includes a first circumferential channel 186 and a second circumferential channel 188. Both of the first circumferential channel 186 and the second circumferential channel 188 are arranged in a middle region or central region of the distal passive roller $84_{P3}$.

Each circumferential channel 178-188 associated with the plurality of intermediate rollers 84 are configured to receive a third plurality of loop members (see, e.g., loop members 190, 192, 194, 196). In some configurations, the first circumferential channel 178 of the proximal passive roller $84_{P1}$ and the first circumferential channel 182 of the intermediate passive roller $84_{P2}$ are sized for receiving a first loop member 190 that rotatably-connects the proximal passive roller $84_{P1}$ to the intermediate passive roller $84_{P2}$. In other configurations, the second circumferential channel 180 of the proximal passive roller $84_{P1}$ is sized for receiving a second loop member 192. With reference to FIG. 17, the second loop member 192 is configured to rotatably-connect the proximal passive roller $84_{P1}$ to a roller (see, e.g., at a second circumferential channel 224 of a distal passive roller $86_{P3}$) of the second plurality of proximal rollers 86.

In other configurations, the second circumferential channel 184 of the intermediate passive roller $84_{P2}$ and the second circumferential channel 188 of the distal passive roller $84_{P3}$ are sized for receiving a third loop member 194 that rotatably-connects the intermediate passive roller $84_{P2}$ to the distal passive roller $84_{P3}$. In yet other configurations, the first circumferential channel 186 of the distal passive roller $84_{P3}$ is sized for receiving a fourth loop member 196. With reference to FIG. 18, the fourth loop member 196 is configured to rotatably-connect the distal passive roller $84_{P3}$ to a roller (see, e.g., at a first circumferential channel 246 of a proximal passive roller $88_{P1}$) of the second plurality of distal rollers 88.

Referring to FIGS. 10 and 17, an exemplary configuration of the second plurality of proximal rollers 86 of the X-direction workpiece transporter subassembly 24 is shown. The second plurality of proximal rollers 86 may include, for example, three rollers. The three rollers of the second plurality of proximal rollers 86 may include, for example: a proximal passive (i.e., "non-powered" or "slave") roller $86_{P1}$, an intermediate passive (i.e., "non-powered" or "slave") roller $86_{P2}$, and a distal passive (i.e., "non-powered" or "slave") roller $86_{P3}$.

Unlike the first plurality of proximal rollers 80 and the first plurality of distal rollers 82, the second plurality of proximal rollers 86 are not directly supported by the flanges $40_P$, $40_D$, $40_I$ of the plurality of flanges 40 of the third panel 34 of the base frame 20 and the fourth panel 36 of the base frame 20. Rather, as seen at FIG. 17, the second plurality of proximal rollers 86 are supported by a first bracket 198 and a second bracket 200. The first bracket 198 includes a first flange 198a and a second flange 198b. The second bracket 200 includes a first flange 200a and a second flange 200b.

With reference to FIG. 11, a proximal portion of the intermediate plate 78 that is arranged over the proximal support beam $50_P$ includes a first pair of passages 202 that are sized for receiving fasteners 204 (see, e.g., FIG. 17) extending through the second flange 198b of the first bracket 198 for fixedly-supporting (with reference to, e.g., FIG. 6) the first bracket 198 upon the intermediate plate 78 (i.e., the first bracket 198 is indirectly and non-movably fixed to the base frame 20 by way of the intermediate plate 78 and the proximal support beam $50_P$ that is fixed to the inwardly-facing surface $34_I$ of the third panel 34 and the inwardly-facing surface $36_I$ of the fourth panel 36 of the base frame 20). Similarly, as see at FIG. 11, the proximal portion of the intermediate plate 78 that is arranged over the proximal support beam $50_P$ includes a second pair of passages 206 that are sized for receiving fasteners 208 (see, e.g., FIG. 17) extending through the second flange 200b of the second bracket 200 for fixedly-supporting (with reference to, e.g., FIG. 6) the second bracket 200 upon the intermediate plate 78 (i.e., the second bracket 200 is indirectly and non-movably fixed to the base frame 20 by way of the intermediate plate 78 and the proximal support beam $50_P$ that is fixed to the inwardly-facing surface $34_I$ of the third panel 34 and the inwardly-facing surface $36_I$ of the fourth panel 36 of the base frame 20). Accordingly, the second plurality of proximal rollers 86 of the X-direction workpiece transporter subassembly 24 are indirectly and spatially fixed to the base frame 20 (i.e., the plurality of proximal rollers 86 do not move in the Z-direction) by way of the intermediate plate 78 and the proximal support beam $50_P$ that is fixed to the inwardly-facing surface $34_I$ of the third panel 34 and the inwardly-facing surface $36_I$ of the fourth panel 36 of the base frame 20.

With reference to FIG. 17, each of the first flange 198a of the first bracket 198 and the first flange 200a of the second bracket 200 includes a plurality of passages 210. Each passage 210a, 210b, 210c of the plurality of passages 210 are sized for receiving a corresponding pin 212a, 212b, 212c extending from each end of, respectively, the proximal passive roller $86_{P1}$, the intermediate passive roller $86_{P2}$, and the distal passive roller $86_{P3}$.

With further reference to FIG. 17, the proximal passive roller $86_{P1}$ also includes a first circumferential channel 214 and a second circumferential channel 216. Both of the first circumferential channel 214 and the second circumferential channel 216 are arranged in a middle region or central region of the proximal passive roller $86_{P1}$.

The intermediate passive roller $86_{P2}$ also includes a first circumferential channel 218 and a second circumferential channel 220. Both of the first circumferential channel 218 and the second circumferential channel 220 are arranged in a middle region or central region of the intermediate passive roller $86_{P2}$.

The distal passive roller $86_{P3}$ also includes a first circumferential channel 222 and a second circumferential channel 224. Both of the first circumferential channel 222 and the second circumferential channel 224 are arranged in a middle region or central region of the distal passive roller $86_{P3}$.

Each circumferential channel 214-224 associated with the second plurality of proximal rollers 86 are configured to receive a fourth plurality of loop members (see, e.g., loop members 226, 228). In some configurations, the first circumferential channel 214 of the proximal passive roller $86_{P1}$ and the third circumferential channel 106 of the distal passive roller $80_{P2}$ (of the first plurality of proximal rollers 80) are sized for receiving the third loop member 114 that rotatably-connects the proximal passive roller $86_{P1}$ (of the second plurality of proximal rollers 86) to the distal passive roller $80_{P2}$ (of the first plurality of proximal rollers 80); accordingly, the third loop member 114 of the first plurality of loop members (see, e.g., loop members 110, 112, 114) rotatably-connects the first plurality of proximal rollers 80 to the second plurality of proximal rollers 86.

In other configurations, the second circumferential channel 216 of the proximal passive roller $86_{P1}$ and the second channel 220 of the intermediate passive roller $86_{P2}$ are sized for receiving a first loop member 226. As seen at FIG. 17, the first loop member 226 is configured to rotatably-connect the proximal passive roller $86_{P1}$ to the intermediate passive roller $86_{P2}$.

In other configurations, the first circumferential channel 218 of the intermediate passive roller $86_{P2}$ and the first circumferential channel 222 of the distal passive roller $86_{P3}$ are sized for receiving a second loop member 228 that rotatably-connects the intermediate passive roller $86_{P2}$ to the distal passive roller $86_{P3}$. In yet other configurations, the second circumferential channel 224 of the distal passive roller $86_{P3}$ and the second circumferential channel 180 of the proximal passive roller $84_{P1}$ (of the plurality of intermediate rollers 84) are sized for receiving the second loop member 192 that rotatably-connects the distal passive roller $86_{P3}$ (of the second plurality of proximal rollers 86) to the proximal passive roller $84_{P1}$ (of the plurality of intermediate rollers 84); accordingly, the second loop member 192 of the third plurality of loop members (see, e.g., loop members 190, 192, 194, 196) rotatably connects the second plurality of proximal rollers 86 to the plurality of intermediate rollers 84.

Referring to FIGS. 10 and 18, an exemplary configuration of the second plurality of distal rollers 88 of the X-direction workpiece transporter subassembly 24 is shown. The second plurality of distal rollers 88 may include, for example, three rollers. The three rollers of the second plurality of distal rollers 88 may include, for example: a proximal passive (i.e., "non-powered" or "slave") roller $88_{P1}$, an intermediate passive (i.e., "non-powered" or "slave") roller $88_{P2}$, and a distal passive (i.e., "non-powered" or "slave") roller $88_{P3}$.

Unlike the first plurality of proximal rollers 80 and the first plurality of distal rollers 82, the second plurality of distal rollers 88 are not directly supported by the flanges $40_P$, $40_D$, $40_I$ of the plurality of flanges 40 of the third panel 34 of the base frame 20 and the fourth panel 36 of the base frame 20. Rather, as seen at FIG. 18, the second plurality of distal rollers 88 are supported by a first bracket 230 and a second bracket 232. The first bracket 230 includes a first flange 230a and a second flange 230b. The second bracket 232 includes a first flange 232a and a second flange 232b.

With reference to FIG. 11, a distal portion of the intermediate plate 78 that is arranged over the distal support beam $50_D$ includes a first pair of passages 234 that are sized for receiving fasteners 236 (see, e.g., FIG. 18) extending through the second flange 230b of the first bracket 230 for fixedly-supporting (with reference to, e.g., FIG. 6) the first bracket 230 upon the intermediate plate 78 (i.e., the first bracket 230 is indirectly and non-movably fixed to the base frame 20 by way of the intermediate plate 78 and the distal support beam $50_D$ that is fixed to the inwardly-facing surface $34_I$ of the third panel 34 and the inwardly-facing surface $36_I$ of the fourth panel 36 of the base frame 20). Similarly, as seen at FIG. 11, the distal portion of the intermediate plate 78 that is arranged over the distal support beam $50_D$ includes a second pair of passages 238 that are sized for receiving fasteners 240 (see, e.g., FIG. 18) extending through the second flange 232b of the second bracket 232 for fixedly-supporting (with reference to, e.g., FIG. 6) the second bracket 232 upon the intermediate plate 78 (i.e., the second bracket 232 is indirectly and non-movably fixed to the base frame 20 by way of the intermediate plate 78 and the distal support beam $50_D$ that is fixed to the inwardly-facing surface $34_I$ of the third panel 34 and the inwardly-facing surface $36_I$ of the fourth panel 36 of the base frame 20). Accordingly, the second plurality of distal rollers 88 of the X-direction workpiece transporter subassembly 24 are indirectly and spatially fixed to the base frame 20 (i.e., the plurality of distal rollers 88 do not move in the Z-direction) by way of the intermediate plate 78 and the distal support beam $50_D$ that is fixed to the inwardly-facing surface $34_I$ of the third panel 34 and the inwardly-facing surface $36_I$ of the fourth panel 36 of the base frame 20.

With reference to FIG. 18, each of the first flange 230a of the first bracket 230 and the first flange 232a of the second bracket 232 includes a plurality of passages 242. Each passage 242a, 242b, 242c of the plurality of passages 242 are sized for receiving a corresponding pin 244a, 244b, 244c extending from each end of, respectively, the proximal passive roller $88_{P1}$, the intermediate passive roller $88_{P2}$, and the distal passive roller $88_{P3}$.

With further reference to FIG. 18, the proximal passive roller $88_{P1}$ also includes a first circumferential channel 246 and a second circumferential channel 248. Both of the first circumferential channel 246 and the second circumferential channel 248 are arranged in a middle region or central region of the proximal passive roller $88_{P1}$.

The intermediate passive roller $88_{P2}$ also includes a first circumferential channel 250 and a second circumferential channel 252. Both of the first circumferential channel 250 and the second circumferential channel 252 are arranged in a middle region or central region of the intermediate passive roller $88_{P2}$.

The distal passive roller $88_{P3}$ also includes a first circumferential channel 254 and a second circumferential channel 256. Both of the first circumferential channel 254 and the second circumferential channel 256 are arranged in a middle region or central region of the distal passive roller $88_{P3}$.

Each circumferential channel 246-256 associated with the second plurality of distal rollers 88 are configured to receive a fifth plurality of loop members (see, e.g., loop members 258, 260). In some configurations, the first circumferential channel 246 of the proximal passive roller $88_{P1}$ and the first circumferential channel 186 of the distal passive roller $84_{P3}$ (of the plurality of intermediate rollers 84) are sized for receiving the fourth loop member 196 that rotatably-connects the proximal passive roller $88_{P1}$ (of the second plurality of distal rollers 88) to the distal passive roller $84_{P3}$ (of the plurality of intermediate rollers 84); accordingly, the fourth loop member 196 of the third plurality of loop members (see, e.g., loop members 190, 192, 194, 196) rotatably-connects the plurality of intermediate rollers 84 to the second plurality of distal rollers 88.

In other configurations, the second circumferential channel 248 of the proximal passive roller $88_{P1}$ and the second channel 252 of the intermediate passive roller $88_{P2}$ are sized for receiving a first loop member 258. As seen at FIG. 18, the first loop member 258 is configured to rotatably-connect the proximal passive roller $88_{P1}$ to the intermediate passive roller $88_{P2}$.

In other configurations, the first circumferential channel 250 of the intermediate passive roller $88_{P2}$ and the first circumferential channel 254 of the distal passive roller $88_{P3}$ are sized for receiving a second loop member 260 that rotatably-connects the intermediate passive roller $88_{P2}$ to the distal passive roller $88_{P3}$. In yet other configurations, the second circumferential channel 256 of the distal passive roller $88_{P3}$ and the fourth circumferential channel 134 of the proximal passive roller $82_{P2}$ (of the first plurality of distal rollers 82) are sized for receiving the third loop member 140 that rotatably-connects the distal passive roller $88_{P3}$ (of the second plurality of distal rollers 88) to the proximal passive roller $82_{P2}$ (of the first plurality of distal rollers 82); accordingly, the third loop member 140 of the second plurality of loop members (see, e.g., loop members 136, 138, 140) rotatably connects the second plurality of distal rollers 88 to the first plurality of distal rollers 82.

Because the structure of the second plurality of proximal rollers 86 and the second plurality of distal rollers 88 are substantially similar, with reference to FIGS. 19, 20, and 21, a plurality of views that may be associated with either of the second plurality of proximal rollers 86 and the second plurality of distal rollers 88 are shown. FIG. 19 shows a top view of either of the second plurality of proximal rollers 86 and the second plurality of distal rollers 88. FIG. 20 shows a side view of either of the second plurality of proximal rollers 86 and the second plurality of distal rollers 88. FIG. 21 shows a front view of either of second plurality of proximal rollers 86 and the second plurality of distal rollers 88.

With respect to FIG. 21, an exemplary configuration of the second plurality of proximal rollers 86 of the X-direction workpiece transporter subassembly 24 may further include one or more standoff bars 262. The one or more standoff bars 262 may extend between and connect the first flange 198a of the first bracket 198 and the first flange 200a of the second bracket 200. Inclusion of the one or more standoff bars may structurally rigidify the exemplary configuration of the second plurality of proximal rollers 86 of the X-direction workpiece transporter subassembly 24.

With respect to FIG. 21, an exemplary configuration of the second plurality of distal rollers 88 of the X-direction workpiece transporter subassembly 24 may further include one or more standoff bars 264. The one or more standoff bars 264 may extend between and connect the first flange 230a of the first bracket 230 and the first flange 232a of the second bracket 232.

Referring to FIGS. 10 and 22A-23, in some configurations, the Y-direction workpiece transporter subassembly 26 may include: a plurality of proximal rollers 266; a plurality of distal rollers 268; and a plurality of intermediate rollers 270. It should be noted that the terms "proximal" and "distal" as described above with respective to the Y-direction workpiece transporter subassembly 26 is not meant to be limiting and are utilized in reference to a proximal-to-distal direction of movement in the Y-direction associated with the second substantially linear segment $P2_2$ of the second conveying path P2 in the Y-direction.

As will be described in the following disclosure, all of the rollers associated with the Y-direction workpiece transporter subassembly 26 are parallel to one another and are supported by and indirectly connected to an upper surface $56_U$ (see, e.g., FIGS. 7 and 11) of the upper plate 56 of each of the first lifter 52a and the second lifter 52b of the Z-direction lift assembly 22. Because the lower surface $54_L$ of the lower plate 54 of each of the first lifter 52a and the second lifter 52b of the Z-direction lift assembly 22 is supported by and directly connected to the upper surface $50_{PU}$ of the proximal support beam $50_P$ of the plurality of support beams 50 and the upper surface $50_{DU}$ of the distal support beam $50_D$ of the plurality of support beams 50 by one or more fasteners $54_F$ as described above, the Y-direction workpiece transporter subassembly 26 may be said to be indirectly connected to the inwardly-facing surface $34_I$ of the third panel 34 of the base frame 20 and the inwardly-facing surface $36_I$ of the fourth panel 36 of the base frame 20 by way of the Z-direction lift assembly 22 and the plurality of support beams 50. Although the Y-direction workpiece transporter subassembly 26 may be said to be indirectly connected to the base frame 20 as described above, however, the Y-direction workpiece transporter subassembly 26 may be movably-supported (in the Z-direction) by the upper plate 56 of both of the first lifter 52a and the second lifter 52b of the Z-direction lift assembly 22 in response to actuation of, for example, both of the proximal Z-direction lifting actuator 74 and the distal Z-direction lifting actuator 76 of the Z-direction lift assembly 22.

Figure 22A:
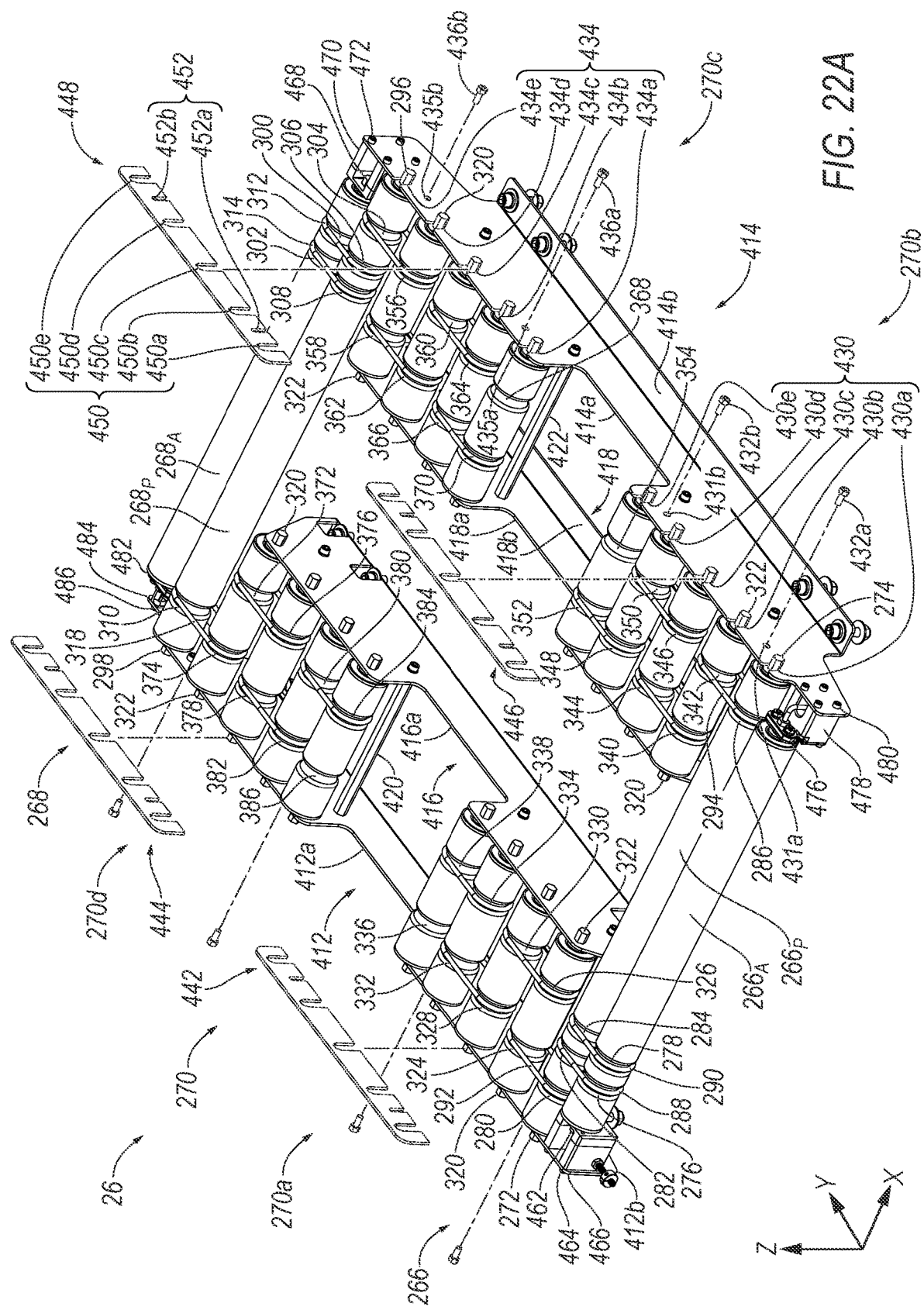
FIG. 22A is a partially exploded perspective view of an exemplary portion of a Y-direction workpiece transporter subassembly of the workpiece diverter station of FIG. 10.
Figure 22B:
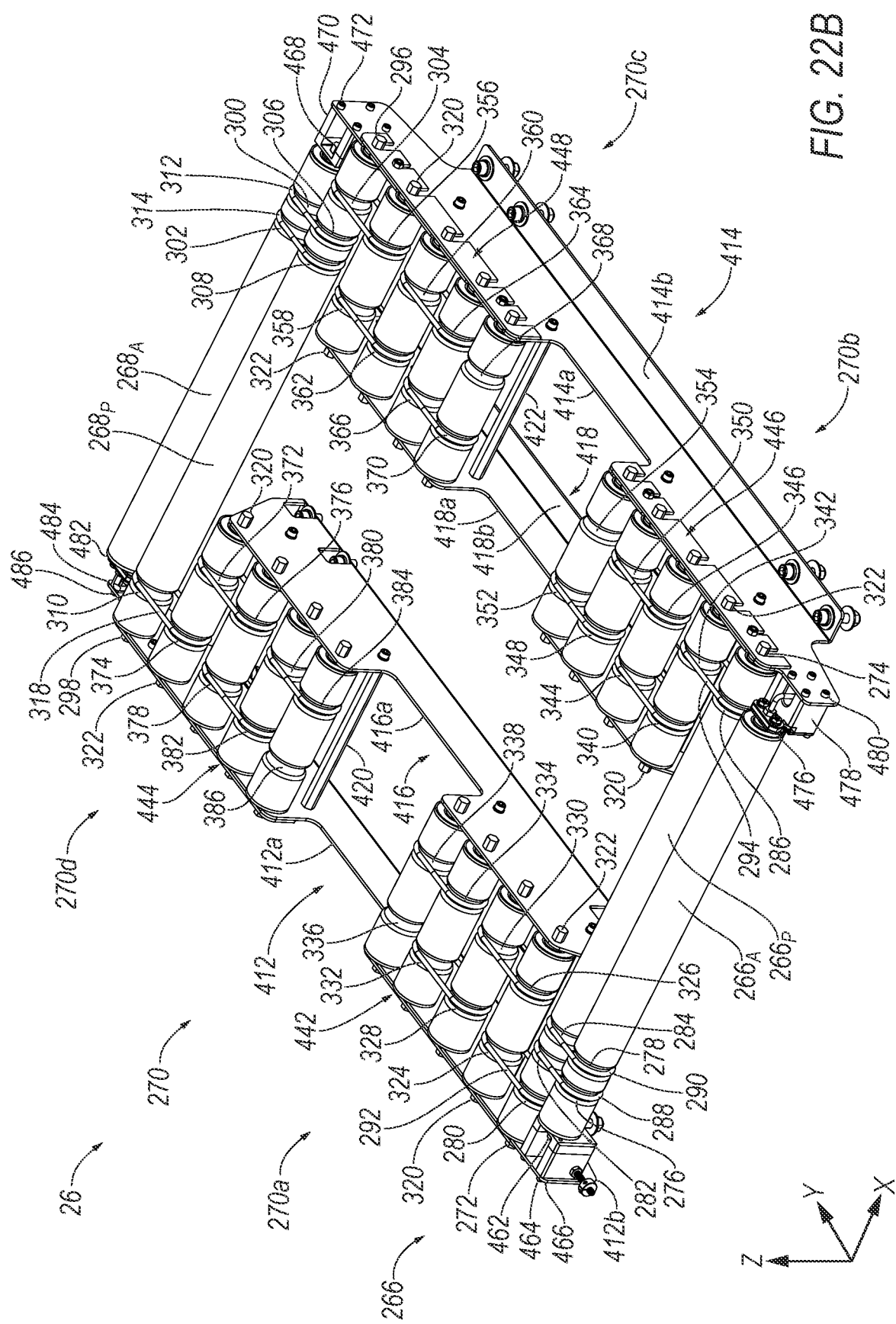
FIG. 22B is an assembled perspective view of the portion of the Y-direction workpiece transporter subassembly of FIG. 22A.

As seen at FIG. 22A, the plurality of proximal rollers 266 may include, for example, two rollers. The two rollers of the plurality of proximal rollers 266 may include, for example: a proximal active (i.e., "powered" or "master") roller $266_A$ and a distal passive (i.e., "non-powered" or "slave") roller $266_P$.

A first end of each of the proximal active roller $266_A$ and the distal passive roller $266_P$ includes a male portion or pin 272. A second end of each of the proximal active roller $266_A$ and the distal passive roller $266_P$ includes a male portion or pin 274.

The proximal active roller $266_A$ also includes a first circumferential channel 276 and a second circumferential channel 278. Both of the first circumferential channel 276 and the second circumferential channel 278 are arranged near or closer to the first end of the proximal active roller $266_A$ that includes the pin 272.

The distal passive roller $266_P$ includes a first circumferential channel 280, a second circumferential channel 282, a third circumferential channel 284, and a fourth circumferential channel 286. The first circumferential channel 280, the second circumferential channel 282, and the third circumferential channel 284 are arranged near or closer to the first end of the distal passive roller $266_P$ that includes the pin 272. The fourth circumferential channel 286 is arranged near or closer to the second end of the distal passive roller $266_P$ that includes the pin 274.

Each circumferential channel 276-286 associated with the plurality of proximal rollers 266 are configured to receive a first plurality of loop members (see, e.g., loop members 288, 290, 292, 294). In some configurations, the first circumferential channel 276 of the proximal active roller $266_A$ and the second circumferential channel 282 of the distal passive roller $266_P$ are sized for receiving a first loop member 288 that rotatably-connects the proximal active roller $266_A$ to the distal passive roller $266_P$. In other configurations, the second circumferential channel 278 of the proximal active roller $266_A$ and the third circumferential channel 284 of the distal passive roller $266_P$ are sized for receiving a second loop member 290 that rotatably-connects the proximal active roller $266_A$ to the distal passive roller $266_P$.

In yet other configurations, the first circumferential channel 280 of the distal passive roller $266_P$ is sized for receiving a third loop member 292. As seen at FIG. 22A, the third loop member 292 is configured to rotatably-connect the distal passive roller $266_P$ to a roller (see, e.g., a first circumferential channel 324 of a proximal passive roller $270a_{P1}$ of a first proximal group of intermediate rollers 270a of the plurality of intermediate rollers 270) of the plurality of intermediate rollers 270. Furthermore, in other configurations, the fourth circumferential channel 286 of the distal passive roller $266_P$ is sized for receiving a fourth loop member 294. As seen at FIG. 22A, the fourth loop member 294 is configured to rotatably-connect the distal passive roller $266_P$ to a roller (see, e.g., a second circumferential channel 342 of a proximal passive roller $270b_{P1}$ of a second proximal group of intermediate rollers 270b of the plurality of intermediate rollers 27) of the plurality of intermediate rollers 270.

With continued reference to FIG. 22A, the plurality of distal rollers 268 may include, for example, two rollers. The two rollers of the plurality of distal rollers 268 may include, for example: a distal active (i.e., "powered" or "master") roller $268_A$ and a proximal passive (i.e., "non-powered" or "slave") roller $268_P$.

A first end of each of the distal active roller $268_A$ and the proximal passive roller $268_P$ includes a male portion or pin 296. A second end of each of the distal active roller $268_A$ and the proximal passive roller $268_P$ includes a male portion or pin 298.

The distal active roller $268_A$ also includes a first circumferential channel 300 and a second circumferential channel 302. Both of the first circumferential channel 300 and the second circumferential channel 302 are arranged near or closer to the first end of the distal active roller $268_A$ that includes the pin 296.

The proximal passive roller $268_P$ includes a first circumferential channel 304, a second circumferential channel 306, a third circumferential channel 308, and a fourth circumferential channel 310. The first circumferential channel 304, the second circumferential channel 306, and the third circumferential channel 308 are arranged near or closer to the first end of the proximal passive roller $268_P$ that includes the pin 296. The fourth circumferential channel 310 is arranged near or closer to the second end of the proximal passive roller $268_P$ that includes the pin 298.

Each circumferential channel 300-310 associated with the plurality of distal rollers 268 are configured to receive a second plurality of loop members (see, e.g., loop members 312, 314, 316, 318). In some configurations, the first circumferential channel 300 of the distal active roller $268_A$ and the second circumferential channel 306 of the proximal passive roller $268_P$ are sized for receiving a first loop member 312 that rotatably-connects the distal active roller $268_A$ to the proximal passive roller $268_P$. In other configurations, the second circumferential channel 302 of the distal active roller $268_A$ and the third circumferential channel 308 of the proximal passive roller $268_P$ are sized for receiving a second loop member 314 that rotatably-connects the distal active roller $268_A$ to the proximal passive roller $268_P$.

In yet other configurations, the first circumferential channel 304 of the proximal passive roller $268_P$ is sized for receiving a third loop member 316. As seen at FIG. 22A, the third loop member 316 is configured to rotatably-connect the proximal passive roller $268_P$ to a roller (see, e.g., a first circumferential channel 356 of a distal passive roller $270c_{P1}$ of a first distal group of intermediate rollers 270c of the plurality of intermediate rollers 270) of the plurality of intermediate rollers 270. Furthermore, in other configurations, the fourth circumferential channel 310 of the proximal passive roller $268_P$ is sized for receiving a fourth loop member 318. As seen at FIG. 22A, the fourth loop member 318 is configured to rotatably-connect the proximal passive roller $268_P$ to a roller (see, e.g., a second circumferential channel 374 of a distal passive roller $270d_{P1}$ of a second distal group of intermediate rollers 270d of the plurality of intermediate rollers 270) of the plurality of intermediate rollers 270.

Figure 23:
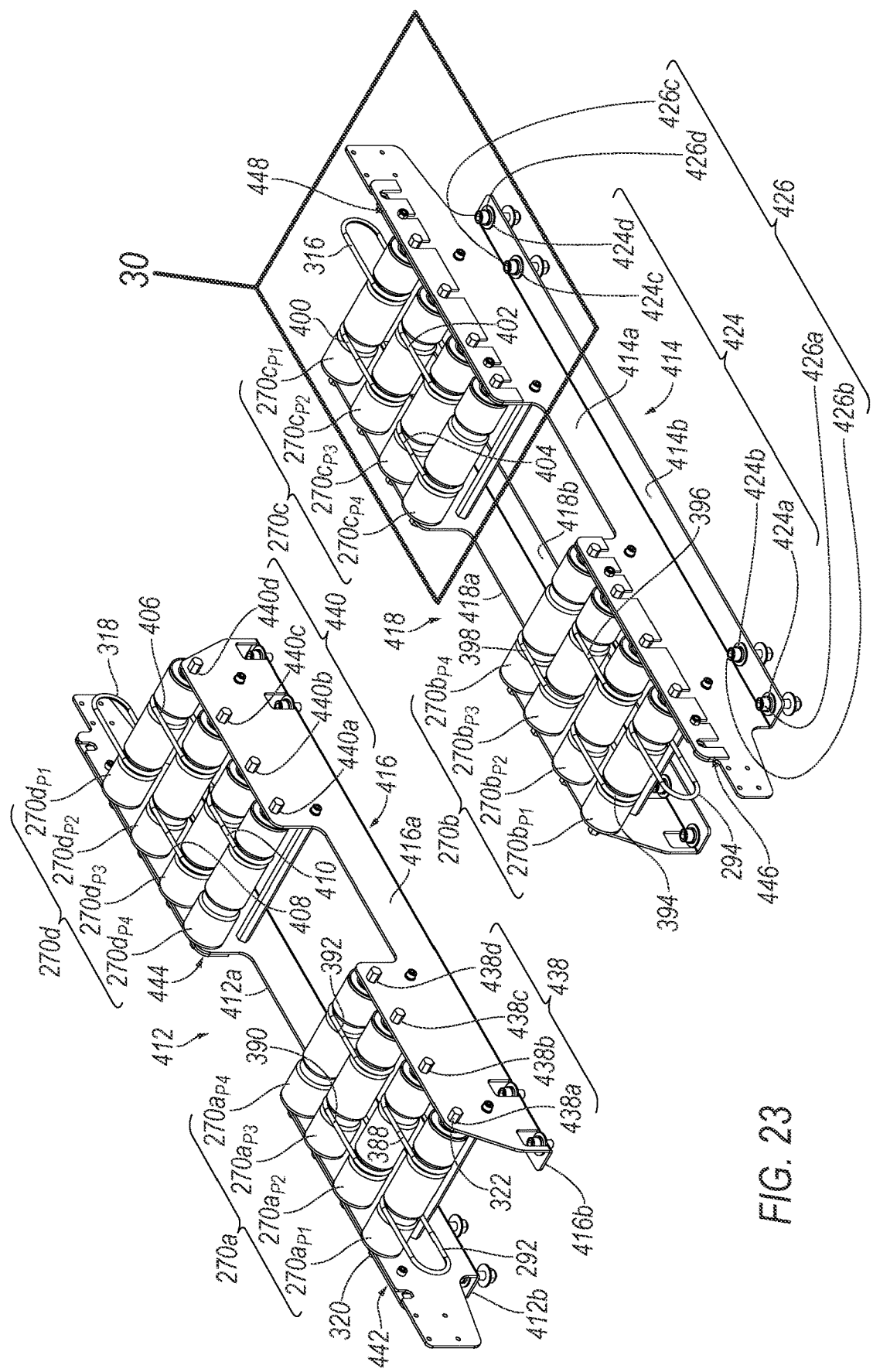
FIG. 23 is a perspective view of an exemplary portion of the Y-direction workpiece transporter subassembly of FIGS. 22A and 22B.

With even further reference to FIGS. 22A and 23, the plurality of intermediate rollers 270 may include, for example, a plurality of groups of intermediate rollers 270a-270d. The plurality of groups of intermediate rollers 270a-270d may include, for example: a first proximal group of intermediate rollers 270a; a second proximal group of intermediate rollers 270b; a first distal group of intermediate rollers 270c; and a second distal group of intermediate rollers 270d.

Referring to FIG. 23, the first proximal group of intermediate rollers 270a of the plurality of groups of intermediate rollers 270a-270d of the plurality of intermediate rollers 270 may include, for example, four rollers. The four rollers of the first proximal group of intermediate rollers 270a may include, for example: a proximal passive (i.e., "non-powered" or "slave") roller $270a_{P1}$; an intermediately-proximal passive (i.e., "non-powered" or "slave") roller $270a_{P2}$; an intermediately-distal passive (i.e., "non-powered" or "slave") roller $270a_{P3}$; and a distal passive (i.e., "non-powered" or "slave") roller $270a_{P4}$.

A first end of each of the proximal passive roller $270a_{P1}$, the intermediately-proximal passive roller $270a_{P2}$, the intermediately-distal passive roller $270a_{P3}$, and the distal passive roller $270a_{P4}$ includes a male portion or pin 320. A second end of each of the proximal passive roller $270a_{P1}$, the intermediately-proximal passive roller $270a_{P2}$, the intermediately-distal passive roller $270a_{P3}$, and the distal passive roller $270a_{P4}$ includes a male portion or pin 322.

With further reference to FIG. 22A, the proximal passive roller $270a_{P1}$ also includes a first circumferential channel 324 and a second circumferential channel 326. Both of the first circumferential channel 324 and the second circumferential channel 326 are arranged in a middle region or central region of the proximal passive roller $270a_{P1}$.

With continued reference to FIG. 22A, the intermediately-proximal passive roller $270a_{P2}$ also includes a first circumferential channel 328 and a second circumferential channel 330. Both of the first circumferential channel 328 and the second circumferential channel 330 are arranged in a middle region or central region of the intermediately-proximal passive roller $270a_{P2}$.

With even further reference to FIG. 22A, the intermediately-distal passive roller $270a_{P3}$ also includes a first circumferential channel 332 and a second circumferential channel 334. Both of the first circumferential channel 332 and the second circumferential channel 334 are arranged in a middle region or central region of the intermediately-distal passive roller $270a_{P3}$.

With yet even further reference to FIG. 22A, the distal passive roller $270a_{P4}$ also includes a first circumferential channel 336 and a second circumferential channel 338. Both of the first circumferential channel 336 and the second circumferential channel 338 are arranged in a middle region or central region of the distal passive roller $270a_{P4}$.

Referring to FIG. 23, the second proximal group of intermediate rollers 270b of the plurality of groups of intermediate rollers 270a-270d of the plurality of intermediate rollers 270 may include, for example, four rollers. The four rollers of the second proximal group of intermediate rollers 270b may include, for example: a proximal passive (i.e., "non-powered" or "slave") roller $270b_{P1}$; an intermediately-proximal passive (i.e., "non-powered" or "slave") roller $270b_{P2}$; an intermediately-distal passive (i.e., "non-powered" or "slave") roller $270b_{P3}$; and a distal passive (i.e., "non-powered" or "slave") roller $270b_{P4}$.

In a substantially similar manner as described above with respect to the first proximal group of intermediate rollers 270a, a first end of each of the proximal passive roller $270b_{P1}$, the intermediately-proximal passive roller $270b_{P2}$, the intermediately-distal passive roller $270b_{P3}$, and the distal passive roller $270b_{P4}$ also includes a male portion or pin 320. A second end of each of the proximal passive roller $270b_{P1}$, the intermediately-proximal passive roller $270b_{P2}$, the intermediately-distal passive roller $270b_{P3}$, and the distal passive roller $270b_{P4}$ also includes a male portion or pin 322.

With further reference to FIG. 22A, the proximal passive roller $270b_{P1}$ also includes a first circumferential channel 340 and a second circumferential channel 342. Both of the first circumferential channel 340 and the second circumferential channel 342 are arranged in a middle region or central region of the proximal passive roller $270b_{P1}$.

With continued reference to FIG. 22A, the intermediately-proximal passive roller $270b_{P2}$ also includes a first circumferential channel 344 and a second circumferential channel 346. Both of the first circumferential channel 344 and the second circumferential channel 346 are arranged in a middle region or central region of the intermediately-proximal passive roller $270b_{P2}$.

With even further reference to FIG. 22A, the intermediately-distal passive roller $270b_{P3}$ also includes a first circumferential channel 348 and a second circumferential channel 350. Both of the first circumferential channel 348 and the second circumferential channel 350 are arranged in a middle region or central region of the intermediately-distal passive roller $270b_{P3}$.

With yet even further reference to FIG. 22A, the distal passive roller $270b_{P4}$ also includes a first circumferential channel 352 and a second circumferential channel 354. Both of the first circumferential channel 352 and the second circumferential channel 354 are arranged in a middle region or central region of the distal passive roller $270b_{P4}$.

Referring to FIG. 23, the first distal group of intermediate rollers 270c of the plurality of groups of intermediate rollers 270a-270d of the plurality of intermediate rollers 270 may include, for example, four rollers. The four rollers of the first distal group of intermediate rollers 270c may include, for example: a proximal distal (i.e., "non-powered" or "slave") roller $270c_{P1}$; an intermediately-distal passive (i.e., "non-powered" or "slave") roller $270c_{P2}$; an intermediately-proximal passive (i.e., "non-powered" or "slave") roller $270c_{P3}$; and a proximal passive (i.e., "non-powered" or "slave") roller $270c_{P4}$.

In a substantially similar manner as described above with respect to the first proximal group of intermediate rollers 270a and the second proximal group of intermediate rollers 270b, a first end of each of the distal passive roller $270c_{P1}$, the intermediately-distal passive roller $270c_{P2}$, the intermediately-proximal passive roller $270c_{P3}$, and the proximal passive roller $270c_{P4}$ also includes a male portion or pin 320. A second end of each of the distal passive roller $270c_{P1}$, the intermediately-distal passive roller $270c_{P2}$, the intermediately-proximal passive roller $270c_{P3}$, and the proximal passive roller $270c_{P4}$ also includes a male portion or pin 322.

With further reference to FIG. 22A, the proximal distal roller $270c_{P1}$ also includes a first circumferential channel 356 and a second circumferential channel 358. Both of the first circumferential channel 356 and the second circumferential channel 358 are arranged in a middle region or central region of the distal passive roller $270c_{P1}$.

With continued reference to FIG. 22A, the intermediately-distal passive roller $270c_{P2}$ also includes a first circumferential channel 360 and a second circumferential channel 362. Both of the first circumferential channel 360 and the second circumferential channel 362 are arranged in a middle region or central region of the intermediately-distal passive roller $270c_{P2}$.

With even further reference to FIG. 22A, the intermediately-proximal passive roller $270c_{P3}$ also includes a first circumferential channel 364 and a second circumferential channel 366. Both of the first circumferential channel 364 and the second circumferential channel 366 are arranged in a middle region or central region of the intermediately-proximal passive roller $270c_{P3}$.

With yet even further reference to FIG. 22A, the proximal passive roller $270c_{P4}$ also includes a first circumferential channel 368 and a second circumferential channel 370. Both of the first circumferential channel 368 and the second circumferential channel 370 are arranged in a middle region or central region of the proximal passive roller $270c_{P4}$.

Referring to FIG. 23, the second distal group of intermediate rollers $270d$ of the plurality of groups of intermediate rollers $270a$-$270d$ of the plurality of intermediate rollers 270 may include, for example, four rollers. The four rollers of the second distal group of intermediate rollers $270d$ may include, for example: a distal passive (i.e., "non-powered" or "slave") roller $270d_{P1}$; an intermediately-distal passive (i.e., "non-powered" or "slave") roller $270d_{P2}$; an intermediately-proximal passive (i.e., "non-powered" or "slave") roller $270d_{P3}$; and a proximal passive (i.e., "non-powered" or "slave") roller $270d_{P4}$.

In a substantially similar manner as described above with respect to the first proximal group of intermediate rollers $270a$, the second proximal group of intermediate rollers $270b$, and the first distal group of intermediate rollers $270c$, a first end of each of the distal passive roller $270d_{P1}$, the intermediately-distal passive roller $270d_{P2}$, the intermediately-proximal passive roller $270d_{P3}$, and the proximal passive roller $270d_{P4}$ also includes a male portion or pin 320. A second end of each of the distal passive roller $270d_{P1}$, the intermediately-distal passive roller $270d_{P2}$, the intermediately-proximal passive roller $270d_{P3}$, and the proximal passive roller $270d_{P4}$ also includes a male portion or pin 322.

With further reference to FIG. 22A, the proximal distal roller $270d_{P1}$ also includes a first circumferential channel 372 and a second circumferential channel 374. Both of the first circumferential channel 372 and the second circumferential channel 374 are arranged in a middle region or central region of the distal passive roller $270d_{P1}$.

With continued reference to FIG. 22A, the intermediately-distal passive roller $270d_{P2}$ also includes a first circumferential channel 376 and a second circumferential channel 378. Both of the first circumferential channel 376 and the second circumferential channel 378 are arranged in a middle region or central region of the intermediately-distal passive roller $270d_{P2}$.

With even further reference to FIG. 22A, the intermediately-proximal passive roller $270d_{P3}$ also includes a first circumferential channel 380 and a second circumferential channel 382. Both of the first circumferential channel 380 and the second circumferential channel 382 are arranged in a middle region or central region of the intermediately-proximal passive roller $270d_{P3}$.

With yet even further reference to FIG. 22A, the proximal passive roller $270d_{P4}$ also includes a first circumferential channel 384 and a second circumferential channel 386. Both of the first circumferential channel 384 and the second circumferential channel 386 are arranged in a middle region or central region of the proximal passive roller $270d_{P4}$.

Each circumferential channel 324-338 associated with the first proximal group of intermediate rollers $270a$ of the plurality of intermediate rollers 270 are configured to receive a third plurality of loop members (see, e.g., loop members 388, 390, 392). In some configurations, as seen at FIG. 22A, the first circumferential channel 324 of the proximal passive roller $270a_{P1}$ of the first proximal group of intermediate rollers $270a$ and the first circumferential channel 280 of the distal passive roller $266_P$ of the plurality of proximal rollers 266 are sized for receiving the third loop member 292 (of the first plurality of loop members 288, 290, 292, 294 associated with the plurality of proximal rollers 266) that rotatably-connects the distal passive roller $266_P$ of the plurality of proximal rollers 266 to the proximal passive roller $270a_{P1}$ of the first proximal group of intermediate rollers $270a$. Referring also to FIG. 23, in other configurations, the second circumferential channel 326 of the proximal passive roller $270a_{P1}$ of the first proximal group of intermediate rollers $270a$ and the second circumferential channel 330 of the intermediately-proximal passive roller $270a_{P2}$ of the first proximal group of intermediate rollers $270a$ are sized for receiving a first loop member 388 that rotatably-connects the proximal passive roller $270a_{P1}$ of the first proximal group of intermediate rollers $270a$ to the intermediately-proximal passive roller $270a_{P2}$ of the first proximal group of intermediate rollers $270a$.

In yet other configurations, the first circumferential channel 328 of the intermediately-proximal passive roller $270a_{P2}$ of the first proximal group of intermediate rollers $270a$ and the first circumferential channel 332 of the intermediately-distal passive roller $270a_{P3}$ of the first proximal group of intermediate rollers $270a$ are sized for receiving a second loop member 390 that rotatably-connects the intermediately-proximal passive roller $270a_{P2}$ of the first proximal group of intermediate rollers $270a$ to the intermediately-distal passive roller $270a_{P3}$ of the first proximal group of intermediate rollers $270a$.

In further configurations, the second circumferential channel 334 of the intermediately-distal passive roller $270a_{P3}$ of the first proximal group of intermediate rollers $270a$ and the second circumferential channel 338 of the distal passive roller $270a_{P4}$ of the first proximal group of intermediate rollers $270a$ are sized for receiving a third loop member 392 that rotatably-connects the intermediately-distal passive roller $270a_{P3}$ of the first proximal group of intermediate rollers $270a$ to the distal passive roller $270a_{P4}$ of the first proximal group of intermediate rollers $270a$.

Each circumferential channel 340-354 associated with the second proximal group of intermediate rollers $270b$ of the plurality of intermediate rollers 270 are configured to receive a fourth plurality of loop members (see, e.g., loop members 394, 396, 398). In some configurations, as seen at FIG. 22A, the second circumferential channel 342 of the proximal passive roller $270b_{P1}$ of the second proximal group of intermediate rollers $270b$ and the fourth circumferential channel 286 of the distal passive roller $266_P$ of the plurality of proximal rollers 266 are sized for receiving the fourth loop member 294 (of the first plurality of loop members 288, 290, 292, 294 associated with the plurality of proximal rollers 266) that rotatably-connects the distal passive roller $266_P$ of the plurality of proximal rollers 266 to the proximal passive roller $270b_{P1}$ of the second proximal group of intermediate rollers $270b$. Referring also to FIG. 23, in other configurations, the first circumferential channel 340 of the proximal passive roller $270b_{P1}$ of the second proximal group of intermediate rollers $270b$ and the first circumferential channel 344 of the intermediately-proximal passive roller $270b_{P2}$ of the second proximal group of intermediate rollers $270b$ are sized for receiving a first loop member 394 that rotatably-connects the proximal passive roller $270b_{P1}$ of the second proximal group of intermediate rollers $270b$ to the intermediately-proximal passive roller $270b_{P2}$ of the second proximal group of intermediate rollers $270b$.

In yet other configurations, the second circumferential channel 346 of the intermediately-proximal passive roller $270b_{P2}$ of the second proximal group of intermediate rollers $270b$ and the second circumferential channel 350 of the intermediately-distal passive roller $270b_{P3}$ of the second proximal group of intermediate rollers $270b$ are sized for receiving a second loop member 396 that rotatably-connects the intermediately-proximal passive roller $270b_{P2}$ of the second proximal group of intermediate rollers $270b$ to the intermediately-distal passive roller $270b_{P3}$ of the second proximal group of intermediate rollers $270b$.

In further configurations, the first circumferential channel 348 of the intermediately-distal passive roller $270b_{P3}$ of the second proximal group of intermediate rollers $270b$ and the first circumferential channel 352 of the distal passive roller $270b_{P4}$ of the second proximal group of intermediate rollers $270b$ are sized for receiving a third loop member 398 that rotatably-connects the intermediately-distal passive roller $270b_{P3}$ of the second proximal group of intermediate rollers $270b$ to the distal passive roller $270b_{P4}$ of the second proximal group of intermediate rollers $270b$.

Each circumferential channel 356-370 associated with the first distal group of intermediate rollers $270c$ of the plurality of intermediate rollers 270 are configured to receive a fifth plurality of loop members (see, e.g., loop members 400, 402, 404). In some configurations, as seen at FIG. 22A, the first circumferential channel 356 of the distal passive roller $270c_{P1}$ of the first distal group of intermediate rollers $270c$ and the first circumferential channel 304 of the proximal passive roller $268_P$ of the plurality of distal rollers 268 are sized for receiving the third loop member 316 (of the second plurality of loop members 312, 314, 316, 318 associated with the plurality of distal rollers 268) that rotatably-connects the proximal passive roller $268_P$ of the plurality of distal rollers 268 to the distal passive roller $270c_{P1}$ of the first distal group of intermediate rollers $270c$. Referring also to FIG. 23, in other configurations, the second circumferential channel 358 of the distal passive roller $270c_{P1}$ of the first distal group of intermediate rollers $270c$ and the second circumferential channel 362 of the intermediately-distal passive roller $270c_{P2}$ of the first distal group of intermediate rollers $270c$ are sized for receiving a first loop member 400 that rotatably-connects the distal passive roller $270c_{P1}$ of the first distal group of intermediate rollers $270c$ to the intermediately-distal passive roller $270b_{P2}$ of the first distal group of intermediate rollers $270c$.

In yet other configurations, the first circumferential channel 360 of the intermediately-distal passive roller $270c_{P2}$ of the first distal group of intermediate rollers $270c$ and the first circumferential channel 364 of the intermediately-proximal passive roller $270c_{P3}$ of the first distal group of intermediate rollers $270c$ are sized for receiving a second loop member 402 that rotatably-connects the intermediately-proximal distal roller $270c_{P2}$ of the first distal group of intermediate rollers $270c$ to the intermediately-proximal passive roller $270c_{P3}$ of the first distal group of intermediate rollers $270c$.

In further configurations, the second circumferential channel 366 of the intermediately-proximal passive roller $270c_{P3}$ of the first distal group of intermediate rollers $270c$ and the second circumferential channel 370 of the proximal passive roller $270c_{P4}$ of the first distal group of intermediate rollers $270c$ are sized for receiving a third loop member 404 that rotatably-connects the intermediately-proximal passive roller $270c_{P3}$ of the first distal group of intermediate rollers $270c$ to the proximal passive roller $270c_{P4}$ of the first distal group of intermediate rollers $270c$.

Each circumferential channel 372-386 associated with the second distal group of intermediate rollers $270d$ of the plurality of intermediate rollers 270 are configured to receive a sixth plurality of loop members (see, e.g., loop members 406, 408, 410). In some configurations, as seen at FIG. 22A, the second circumferential channel 374 of the distal passive roller $270d_{P1}$ of the second distal group of intermediate rollers $270d$ and the fourth circumferential channel 310 of the proximal passive roller $268_P$ of the plurality of distal rollers 268 are sized for receiving the fourth loop member 318 (of the second plurality of loop members 312, 314, 316, 318 associated with the plurality of distal rollers 268) that rotatably-connects the proximal passive roller $268_P$ of the plurality of distal rollers 268 to the distal passive roller $270d_{P1}$ of the second distal group of intermediate rollers $270d$. Referring also to FIG. 23, in other configurations, the first circumferential channel 372 of the distal passive roller $270d_{P1}$ of the second distal group of intermediate rollers $270d$ and the first circumferential channel 376 of the intermediately-distal passive roller $270d_{P2}$ of the second distal group of intermediate rollers $270d$ are sized for receiving a first loop member 406 that rotatably-connects the distal passive roller $270d_{P1}$ of the second distal group of intermediate rollers $270d$ to the intermediately-distal passive roller $270d_{P2}$ of the second distal group of intermediate rollers $270d$.

In yet other configurations, the second circumferential channel 378 of the intermediately-distal passive roller $270d_{P2}$ of the second distal group of intermediate rollers $270d$ and the second circumferential channel 382 of the intermediately-proximal passive roller $270d_{P3}$ of the second distal group of intermediate rollers $270d$ are sized for receiving a second loop member 408 that rotatably-connects the intermediately-distal passive roller $270d_{P2}$ of the second distal group of intermediate rollers $270d$ to the intermediately-proximal passive roller $270d_{P3}$ of the second distal group of intermediate rollers $270d$.

In further configurations, the first circumferential channel 380 of the intermediately-proximal passive roller $270d_{P3}$ of the second distal group of intermediate rollers $270d$ and the first circumferential channel 384 of the proximal passive roller $270d_{P4}$ of the second distal group of intermediate rollers $270d$ are sized for receiving a third loop member 410 that rotatably-connects the intermediately-proximal passive roller $270d_{P3}$ of the second distal group of intermediate rollers $270d$ to the proximal passive roller $270d_{P4}$ of the second distal group of intermediate rollers $270d$.

In a substantially similar manner with respect to: (1) the plurality of intermediate rollers 84 of the X-direction workpiece transporter subassembly 24; (2) the second plurality of proximal rollers 86 of the X-direction workpiece transporter subassembly 24; and (3) the second plurality of distal rollers 88 of the X-direction workpiece transporter subassembly 24, the plurality of proximal rollers 266 of the Y-direction workpiece transporter subassembly 26, the plurality of distal rollers 268 of the Y-direction workpiece transporter subassembly 26, and the plurality of intermediate rollers 270 of the Y-direction workpiece transporter subassembly 26 are not directly supported by the flanges $40_P$, $40_D$, $40_I$ of the plurality of flanges 40 of the third panel 34 of the base frame 20 and the fourth panel 36 of the base frame 20. Rather, as seen at FIGS. 22A and 23, the plurality of proximal rollers 266, the plurality of distal rollers 268, and the plurality of intermediate rollers 270 are supported by a plurality of brackets 412-418 that are connected to the upper surface $56_U$ of the upper plate 56 of each of the first lifter 52$a$ and the second lifter 52$b$ of the Z-direction lift assembly 22. Because the lower surface $54_L$ of the lower plate 54 of each of the first lifter 52$a$ and the second lifter 52$b$ of the Z-direction lift assembly 22 is supported by and directly connected to the upper surface $50_{PU}$ of the proximal support beam $50_P$ of the plurality of support beams 50 and the upper surface $50_{DU}$ of the distal support beam $50_D$ of the plurality of support beams 50 by one or more fasteners $54_F$ as described above, the plurality of brackets 412-418 of the Y-direction workpiece transporter subassembly 26 are indirectly connected to the inwardly-facing surface $34_I$ of the third panel 34 of the base frame 20 and the inwardly-facing surface $36_I$ of the fourth panel 36 of the base frame 20 by way of the Z-direction lift assembly 22 and the plurality of support beams 50. Although the plurality of brackets 412-418 of the Y-direction workpiece transporter subassembly 26 are indirectly connected to the base frame 20 as described above, however, the plurality of brackets 412-418 of the Y-direction workpiece transporter subassembly 26 may be movably-supported (in the Z-direction) by the upper plate 56 of both of the first lifter 52a and the second lifter 52b of the Z-direction lift assembly 22 in response to actuation of, for example, both of the proximal Z-direction lifting actuator 74 and the distal Z-direction lifting actuator 76 of the Z-direction lift assembly 22.

The plurality of brackets 412-418 include: a first outer bracket 412; a second outer bracket 414; a first inner bracket 416; and a second inner bracket 418. The first outer bracket 412 includes a first flange 412a and a second flange 412b. The second outer bracket 414 includes a first flange 414a and a second flange 414b. The first inner bracket 416 includes a first flange 416a and a second flange 416b. The second inner bracket 418 includes a first flange 418a and a second flange 418b.

One or more first standoff bars 420 may extend between and connect the first flange 412a of the first outer bracket 412 to the first flange 416a of the first inner bracket 416. One or more second standoff bars 422 may extend between and connect the first flange 414a of the second outer bracket 414 to the first flange 418a of the second inner bracket 418.

Referring to FIG. 23, the second flange 412b, 414b, 416b, 418b of each of, respectively, the first outer bracket 412, the second outer bracket 414, the first inner bracket 416, and the second inner bracket 418 may include a plurality of fastener-receiving passages 424. The plurality of fastener-receiving passages 424 may include, for example, a first fastener-receiving passage 424a, a second fastener-receiving passage 424b, a third fastener-receiving passage 424c, and a fourth fastener-receiving passage 424d, that are sized, for receiving, respectively, a first fastener 426a, a second fastener 426b, a third fastener 426c, and a fourth fastener 426d of a plurality of fasteners 426. With reference to FIG. 11, the upper surface $56_U$ of the upper plate 56 of each of the first lifter 52a and the second lifter 52b of the Z-direction lift assembly 22 includes a plurality of fastener-receiving passages 428 that are sized for receiving the plurality of fasteners 426 for connecting the plurality of brackets 412-418 to the upper surface $56_U$ of the upper plate 56 of each of the first lifter 52a and the second lifter 52b of the Z-direction lift assembly 22.

With reference to FIG. 22A, a view of the second outer bracket 414 is shown; although a corresponding view of the first outer bracket 412 is not shown, the following description of the second outer bracket 414 may also apply to the first outer bracket 412. The first flange 414a of the second outer bracket 414 includes a first plurality of recesses or grooves 430, a proximal fastener-receiving passage 431a and a distal fastener-receiving passage 431b. The first plurality of recesses or grooves 430 include a proximal recess or groove 430a, a first intermediate recess or groove 430b, a second intermediate recess or groove 430c, a third intermediate recess or groove 430d, and a distal recess or groove 430e. The proximal fastener-receiving passage 431a is sized for receiving a first fastener 432a, and the distal fastener-receiving passage 431b is sized for receiving a second fastener 432b. The first fastener 432a may be arranged between the proximal recess or groove 430a and the first intermediate recess or groove 430b. The second fastener 432b may be arranged between the third intermediate recess or groove 430d and the distal recess or groove 430e.

With continued reference to FIG. 22A, the first flange 414a of the second outer bracket 414 also includes a second plurality of recesses or grooves 434, a proximal fastener-receiving passage 435a and a distal fastener-receiving passage 435b. The second plurality of recesses or grooves 434 include a proximal recess or groove 434a, a first intermediate recess or groove 434b, a second intermediate recess or groove 434c, a third intermediate recess or groove 434d, and a distal recess or groove 434e. The proximal fastener-receiving passage 435a is sized for receiving a first fastener 436a, and the distal fastener-receiving passage 435b is sized for receiving a second fastener 436b. The first fastener 436a may be arranged between the proximal recess or groove 434a and the first intermediate recess or groove 434b. The second fastener 436b may be arranged between the third intermediate recess or groove 434d and the distal recess or groove 434e.

With reference to FIGS. 22A and 23, a view of the first inner bracket 416 is shown; although a corresponding view of the second inner bracket 418 is not shown, the following description of the first inner bracket 416 may also apply to the second inner bracket 418. As seen at FIG. 23, the first flange 416a of the first inner bracket 416 includes a first plurality of pin-receiving passages 438. The first plurality of pin-receiving passages 438 include a proximal pin-receiving passage 438a, a first intermediate pin-receiving passage 438b, a second intermediate pin-receiving passage 438c, and a distal pin-receiving passage 438d.

With continued reference to FIG. 23, the first flange 416a of the first inner bracket 416 also includes a second plurality of pin-receiving passages 440. The second plurality of pin-receiving passages 440 include a proximal pin-receiving passage 440a, a first intermediate pin-receiving passage 440b, a second intermediate pin-receiving passage 440c, and a distal pin-receiving passage 440d.

With reference back to FIG. 22A with respect to the distal passive roller $266_P$ of the plurality of proximal rollers 266, the pin 272 extending from the first end of the distal passive roller $266_P$ is configured for arrangement in, correspondingly, the proximal recess or groove 430a of the first flange 412a of the first outer bracket 412. Similarly, the pin 274 extending from the second end of the distal passive roller $266_P$ is configured for arrangement in, correspondingly, the proximal recess or groove 430a of the first flange 414a of the second outer bracket 414.

With respect to the first proximal group of intermediate rollers 270a, the pin 320 extending from the first end of, respectively, the proximal passive roller $270a_{P1}$, the intermediately-proximal passive roller $270a_{P2}$, the intermediately-distal passive roller $270a_{P3}$, and the distal passive roller $270a_{P4}$ is arranged within, respectively, the first intermediate recess or groove 430b, the second intermediate recess or groove 430c, the third intermediate recess or groove 430d, and the distal recess or groove 430e of the first plurality of recesses or grooves 430 of the first outer bracket 412. Furthermore, the pin 322 extending from the second end of, respectively, the proximal passive roller $270a_{P1}$, the intermediately-proximal passive roller $270a_{P2}$, the intermediately-distal passive roller $270a_{P3}$, and the distal passive roller $270a_{P4}$ is arranged within, respectively, the proximal pin-receiving passage 438a, the first intermediate pin-receiving passage 438b, the second intermediate pin-receiving passage 438c, and the distal pin-receiving passage 438d of the first plurality of pin-receiving passages 438 of the first inner bracket 416.

With respect to the second proximal group of intermediate rollers 270b, the pin 320 extending from the first end of, respectively, the proximal passive roller $270b_{P1}$, the intermediately-proximal passive roller $270b_{P2}$, the intermediately-distal passive roller $270b_{P3}$, and the distal passive roller $270b_{P4}$ is arranged within, respectively, the first intermediate recess or groove 430b, the second intermediate recess or groove 430c, the third intermediate recess or groove 430d, and the distal recess or groove 430e of the first plurality of recesses or grooves 430 of the second outer bracket 414. Furthermore, the pin 322 extending from the second end of, respectively, the proximal passive roller $270b_{P1}$, the intermediately-proximal passive roller $270b_{P2}$, the intermediately-distal passive roller $270b_{P3}$, and the distal passive roller $270b_{P4}$ is arranged within, respectively, the proximal pin-receiving passage 438a, the first intermediate pin-receiving passage 438b, the second intermediate pin-receiving passage 438c, and the distal pin-receiving passage 438d of the first plurality of pin-receiving passages 438 of the second inner bracket 418.

With reference back to FIG. 22A with respect to the proximal passive roller $268_P$ of the plurality of distal rollers 268, the pin 296 extending from the first end of the proximal passive roller $268_P$ is configured for arrangement in, correspondingly, the distal recess or groove 434e of the first flange 414a of the second outer bracket 414. Similarly, the pin 298 extending from the second end of the proximal passive roller $268_P$ is configured for arrangement in, correspondingly, the distal recess or groove 434e of the first flange 412a of the first outer bracket 412.

With respect to the first distal group of intermediate rollers 270c, the pin 320 extending from the first end of, respectively, the distal passive roller $270c_{P1}$, the intermediately-distal passive roller $270c_{P2}$, the intermediately-proximal passive roller $270c_{P3}$, and the proximal passive roller $270c_{P4}$ is arranged within, respectively, the third intermediate recess or groove 434d, the second intermediate recess or groove 434c, the first intermediate recess or groove 434b, and the proximal recess or groove 434a of the second plurality of recesses or grooves 434 of the second outer bracket 414. Furthermore, the pin 322 extending from the second end of, respectively, the distal passive roller $270c_{P1}$, the intermediately-distal passive roller $270c_{P2}$, the intermediately-proximal passive roller $270c_{P3}$, and the proximal passive roller $270c_{P4}$ is arranged within, respectively, the distal pin-receiving passage 440d, the second intermediate pin-receiving passage 440c, the first intermediate pin-receiving passage 440b, and the proximal pin-receiving passage 440a of the second plurality of pin-receiving passages 440 of the second inner bracket 418.

With respect to the second distal group of intermediate rollers 270d, the pin 320 extending from the first end of, respectively, the distal passive roller $270d_{P1}$, the intermediately-distal passive roller $270d_{P2}$, the intermediately-proximal passive roller $270d_{P3}$, and the proximal passive roller $270d_{P4}$ is arranged within, respectively, the third intermediate recess or groove 434d, the second intermediate recess or groove 434c, the first intermediate recess or groove 434b, and the proximal recess or groove 434a of the second plurality of recesses or grooves 434 of the first outer bracket 412. Furthermore, the pin 322 extending from the second end of, respectively, the distal passive roller $270d_{P1}$, the intermediately-distal passive roller $270d_{P2}$, the intermediately-proximal passive roller $270d_{P3}$, and the proximal passive roller $270d_{P4}$ is arranged within, respectively, the distal pin-receiving passage 440d, the second intermediate pin-receiving passage 440c, the first intermediate pin-receiving passage 440b, and the proximal pin-receiving passage 440a of the second plurality of pin-receiving passages 440 of the first inner bracket 416.

Once the pins 272, 274, 296, 298, 320, 322 of the distal passive roller $266_P$, the proximal passive roller $268_P$, and the plurality of intermediate rollers 270 are arranged relative the first plurality of recesses or grooves 430 and the second plurality of recesses or grooves 434 of the first outer bracket 412, the second outer bracket 414, the first inner bracket 416, and the second inner bracket 418 as described above, a first servicing access clamp plate 442, a second servicing clamp plate 444, a third servicing clamp plate 446, and a fourth servicing clamp plate 448 are respectively removably-secured to the first outer bracket 412, the second outer bracket 414, the first inner bracket 416, and the second inner bracket 418.

With reference to FIG. 22A, a view of the second outer bracket 414 and the third servicing clamp plate 446 and the fourth servicing clamp plate 448 is shown; although a corresponding view of the first outer bracket 412 and the first servicing access clamp plate 442 and the second servicing clamp plate 444 is not shown, the following description of the second outer bracket 414 and the third servicing clamp plate 446 and the fourth servicing clamp plate 448 may also apply to the first outer bracket 412 and the first servicing access clamp plate 442 and the second servicing clamp plate 444 (with respect to the first servicing access clamp plate 442 and the second servicing clamp plate 444 being disposed about the pins 272, 298, 332 of the distal passive roller $266_P$, the proximal passive roller $268_P$, the first proximal group of intermediate rollers 270a, and the second distal group of intermediate rollers 270d and the clamp-receiving pins 430a, 430b, 436a, 436b of the first outer bracket 412). As seen at FIG. 22A, each of the third servicing access clamp plate 446 and the fourth servicing clamp plate 448 includes a plurality of roller-pin-receiving grooves 450 including a proximal pin-receiving groove 450a, a first intermediate pin-receiving groove 450b, a second intermediate pin-receiving groove 450c, a third intermediate pin-receiving groove 450d, and a distal pin-receiving groove 450e that are configured to receive the pins 274, 320 extending from the distal passive roller $266_P$ and the second proximal group of intermediate rollers 270b. With continued reference to FIG. 22A, each of the third servicing access clamp plate 446 and the fourth servicing clamp plate 448 includes a plurality of fastener-receiving grooves 452 including a first fastener-receiving groove 452a and a second fastener-receiving groove 452b. Once each of the third servicing access clamp plate 446 and the fourth servicing clamp plate 448 includes is interfaced with the first fastener 432a/436a and the second fastener 432b/436b, each of the third servicing access clamp plate 446 and the fourth servicing clamp plate 448 are removably-secured to the first flange 414a of the second outer bracket 414.

As seen at FIG. 22A, the pins 272, 274 of the proximal active roller $266_A$ and the pins 296, 298 of the distal active roller $268_A$ are not removably-secured to the first outer bracket 412 and the second outer bracket 414 by way of any of the first servicing access clamp plate 442, the second servicing clamp plate 444, the third servicing clamp plate 446, and the fourth servicing clamp plate 448. Rather, the proximal active roller $266_A$ and the distal active roller $268_A$ may be indirectly secured to the first outer bracket 412 and the second outer bracket 414.

In a first exemplary configuration, the pin 272 extending from the first end of the proximal active roller $266_A$ of the plurality of proximal rollers 266 is secured within a mount plate 462 that may be secured to an inwardly-facing surface near a proximal end of the first outer bracket 412 by one or more standoff members 464. The one or more standoff members 464 may be secured to the first outer bracket 412 by one or more fasteners 466 that extend through the first outer bracket 412.

Similarly, the pin 296 extending from the first end of the distal active roller $268_A$ of the plurality of distal rollers 268 may be secured within a mount plate 468 that is secured to an inwardly-facing surface near a distal end of the second outer bracket 414 by one or more standoff members 470. The one or more standoff members 470 may be secured to the second outer bracket 414 by one or more fasteners 472 that extend through the second outer bracket 414.

In another exemplary configuration, the pin 274 extending from the second end of the proximal active roller $266_A$ of the plurality of proximal rollers 266 is secured within a mount plate 476 that may be secured to an inwardly-facing surface near a proximal end of the second outer bracket 414 by a mounting block 478. The mounting block 478 may be secured to the second outer bracket 414 by one or more fasteners 480 that extend through the second outer bracket 414.

Similarly, the pin 298 extending from the second end of the distal active roller $268_A$ of the plurality of distal rollers 268 is secured within a mount plate 482 that may be secured to an inwardly-facing surface near a distal end of the first outer bracket 412 by a mounting block 484. The mounting block 484 may be secured to the first outer bracket 412 by one or more fasteners 486 that extend through the first outer bracket 412.

Referring to FIGS. 10 and 24-28, in some configurations, the optional Y-direction workpiece guiding subassembly 28 may include, for example: a first Y-direction workpiece guide 488 that is secured to the first outer bracket 412 and a second Y-direction workpiece guide 490 that is secured to the second outer bracket 414. Although the optional Y-direction workpiece guiding subassembly 28 is shown directly secured to and supported by the Y-direction workpiece transporter subassembly 26, other configurations of the optional Y-direction workpiece guiding subassembly 28 may not be directly secured to the Y-direction workpiece transporter subassembly 26. With reference to FIG. 3B, when the Y-direction workpiece transporter subassembly 26 is elevated by the Z-direction lift assembly 22, the first Y-direction workpiece guide 488 and the second Y-direction workpiece guide 490 may be spaced apart by a distance that is greater than, for example, a maximum geometry (e.g., a tire diameter $T_D$) of the workpiece TW in order to assist in aligning the workpiece TW upon the Y-direction workpiece transporter subassembly 26; alignment of the workpiece TW upon the Y-direction workpiece transporter subassembly 26 may assist in guiding the movement of the workpiece TW upon the workpiece diverter station 10 when the workpiece TW is conveyed along the second conveying path P2 (i.e., when the conveying path of the workpiece TW transitions from the first substantially linear segment $P2_1$ in the X-direction to the second substantially linear segment $P2_2$ in the Y-direction).

Because the optional Y-direction workpiece guiding subassembly 28 may be directly secured to and supported by the Y-direction workpiece transporter subassembly 26, and, because the Y-direction workpiece transporter subassembly 26 is directly connected to and supported by upper surface $56_U$ of the upper plate 56 of each of the first lifter 52a and the second lifter 52b of the Z-direction lift assembly 22, and, furthermore, because the lower surface $54_L$ of the lower plate 54 of each of the first lifter 52a and the second lifter 52b of the Z-direction lift assembly 22 is supported by and directly connected to the upper surface $50_{PU}$ of the proximal support beam $50_P$ of the plurality of support beams 50 and the upper surface $50_{DU}$ of the distal support beam $50_D$ of the plurality of support beams 50 by one or more fasteners $54_F$ as described above, the optional Y-direction workpiece guiding subassembly 28 may be said to be indirectly connected to the inwardly-facing surface $34_I$ of the third panel 34 of the base frame 20 and the inwardly-facing surface $36_I$ of the fourth panel 36 of the base frame 20 by way of the Y-direction workpiece transporter subassembly 26, the Z-direction lift assembly 22, and the plurality of support beams 50. Although the optional Y-direction workpiece guiding subassembly 28 may be said to be indirectly connected to the base frame 20 as described above, however, the optional Y-direction workpiece guiding subassembly 28 may be movably-supported (in the Z-direction along with the Y-direction workpiece transporter subassembly 26) by the upper plate 56 of both of the first lifter 52a and the second lifter 52b of the Z-direction lift assembly 22 in response to actuation of, for example, both of the proximal Z-direction lifting actuator 74 and the distal Z-direction lifting actuator 76 of the Z-direction lift assembly 22.

With reference to FIGS. 24-28, because the structure of the first Y-direction workpiece guide 488 and the second Y-direction workpiece guide 490 are substantially similar, a plurality of views that may be associated with either of the first Y-direction workpiece guide 488 and the second Y-direction workpiece guide 490 are shown. FIG. 24 shows a first/inwardly facing view of either of the first Y-direction workpiece guide 488 and the second Y-direction workpiece guide 490. FIG. 25 shows a second/outwardly facing view of either of the first Y-direction workpiece guide 488 and the second Y-direction workpiece guide 490. FIG. 26 shows a top view of either of the first Y-direction workpiece guide 488 and the second Y-direction workpiece guide 490. FIG. 27 shows a side view of either of the first Y-direction workpiece guide 488 and the second Y-direction workpiece guide 490. FIG. 28 shows a cross-sectional view of either of the first Y-direction workpiece guide 488 and the second Y-direction workpiece guide 490.

Referring to FIGS. 24 and 25, the first Y-direction workpiece guide 488 includes a first flange 488a and a second flange 488b. Similarly, the second Y-direction workpiece guide 490 includes a first flange 490a and a second flange 490b.

The first flange 488a, 490a of each of the first Y-direction workpiece guide 488 and the second Y-direction workpiece guide 490 includes at least one fastener-receiving passage 492. The at least one fastener-receiving passage 492 receives at least one fastener 494 that rotatably-couples one or more skate wheels 496 to the first flange 488a, 490a of each of the first Y-direction workpiece guide 488 and the second Y-direction workpiece guide 490.

With reference also to FIG. 26, the second flange 488b, 490b of each of the first Y-direction workpiece guide 488 and the second Y-direction workpiece guide 490 includes a plurality of fastener-receiving passages 498. The plurality of fastener-receiving passages 498 may include, for example, a first fastener-receiving passage 498a, a second fastener-receiving passage 498b, a third fastener-receiving passage 498c, and a fourth fastener-receiving passage 498d. The first fastener-receiving passage 498a, the second fastener-receiving passage 498b, the third fastener-receiving passage 498c, and the fourth fastener-receiving passage 498d are sized, for receiving, respectively, the first fastener 426a, the second fastener 426b, the third fastener 426c, and the fourth fastener 426d of the plurality of fasteners 426. Accordingly, in a first configuration, the first fastener 426a, the second fastener 426b, the third fastener 426c, and the fourth fastener 426d of the plurality of fasteners 426 respectively extend through: (1) the first fastener-receiving passage 424a, the second fastener-receiving passage 424b, the third fastener-receiving passage 424c, and the fourth fastener-receiving passage 424d of the plurality of fastener-receiving passages 424 of the first outer bracket 412 and the second outer bracket 414; and (2) the first fastener-receiving passage 498a, the second fastener-receiving passage 498b, the third fastener-receiving passage 498c, and the fourth fastener-receiving passage 498d of the second flange 488b, 490b of each of the first Y-direction workpiece guide 488 and the second Y-direction workpiece guide 490. As such, the plurality of fasteners 426 connect together: (1A) the first Y-direction workpiece guide 488; and (2A) the first outer bracket 412. Furthermore, the plurality of fasteners 426 also connect together: (1B) the second Y-direction workpiece guide 490; and (2B) the second outer bracket 414.

In another configuration, the first fastener 426a, the second fastener 426b, the third fastener 426c, and the fourth fastener 426d of the plurality of fasteners 426 respectively extend through: (1) the first fastener-receiving passage 424a, the second fastener-receiving passage 424b, the third fastener-receiving passage 424c, and the fourth fastener-receiving passage 424d of the plurality of fastener-receiving passages 424 of the first outer bracket 412 and the second outer bracket 414; (2) the first fastener-receiving passage 498a, the second fastener-receiving passage 498b, the third fastener-receiving passage 498c, and the fourth fastener-receiving passage 498d of the second flange 488b, 490b of each of the first Y-direction workpiece guide 488 and the second Y-direction workpiece guide 490; and (3) the plurality of fastener-receiving passages 428 of the upper surface $56_U$ of the upper plate 56 of each of the first lifter 52a and the second lifter 52b of the Z-direction lift assembly 22. As such, the plurality of fasteners 426 connect together: (1A) the first Y-direction workpiece guide 488; (2A) the first outer bracket 412; and (3A) the upper surface $56_U$ of the upper plate 56 of each of the first lifter 52a and the second lifter 52b of the Z-direction lift assembly 22. Furthermore, the plurality of fasteners 426 also connect together: (1B) the second Y-direction workpiece guide 490; (2B) the second outer bracket 414; and (3B) the upper surface $56_U$ of the upper plate 56 of each of the first lifter 52a and the second lifter 52b of the Z-direction lift assembly 22.

Figure 29A:
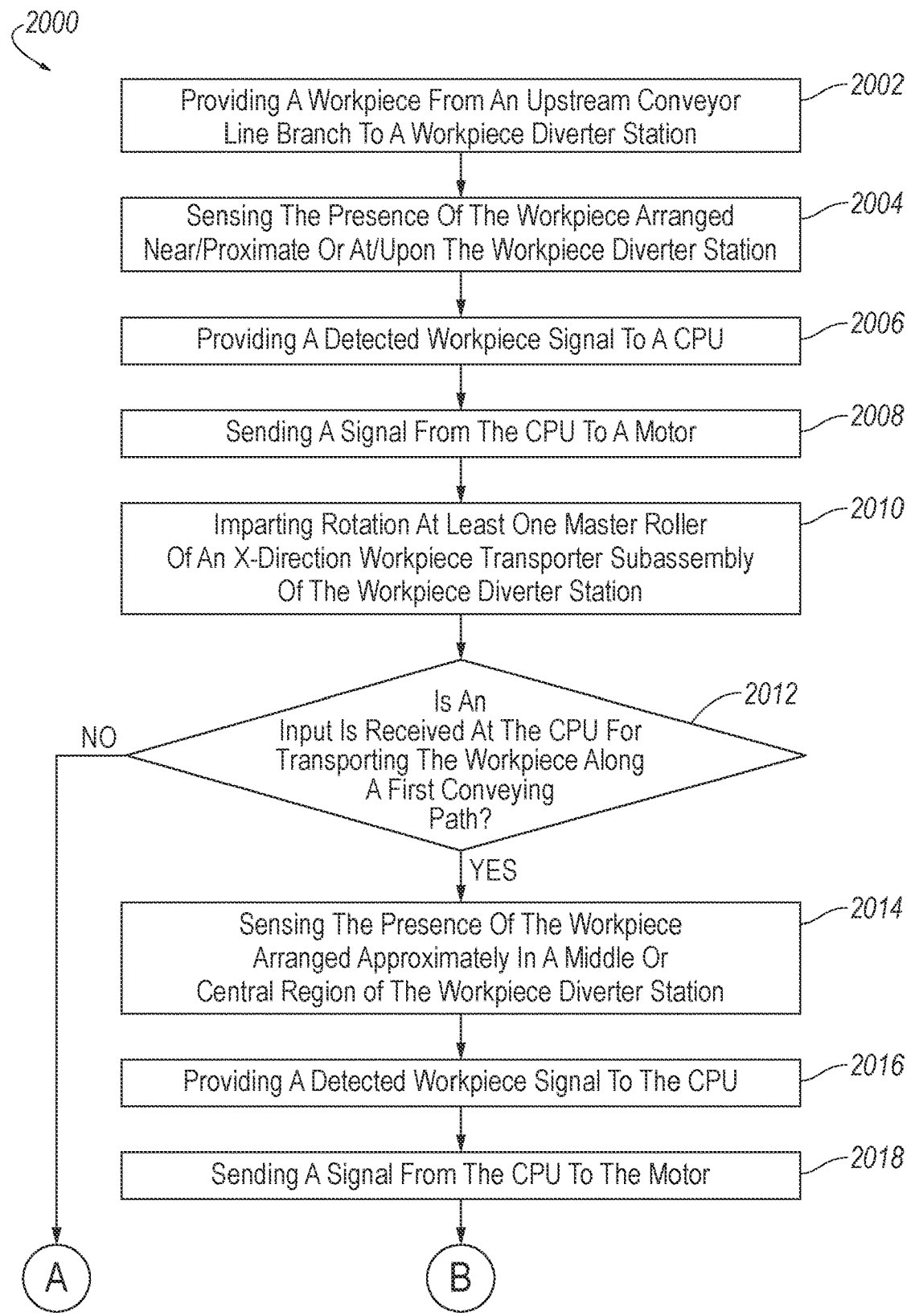
FIGS. 29A-29C is a flow chart of an exemplary method for operating the exemplary workpiece diverter station of FIG. 4.
Figure 29B:
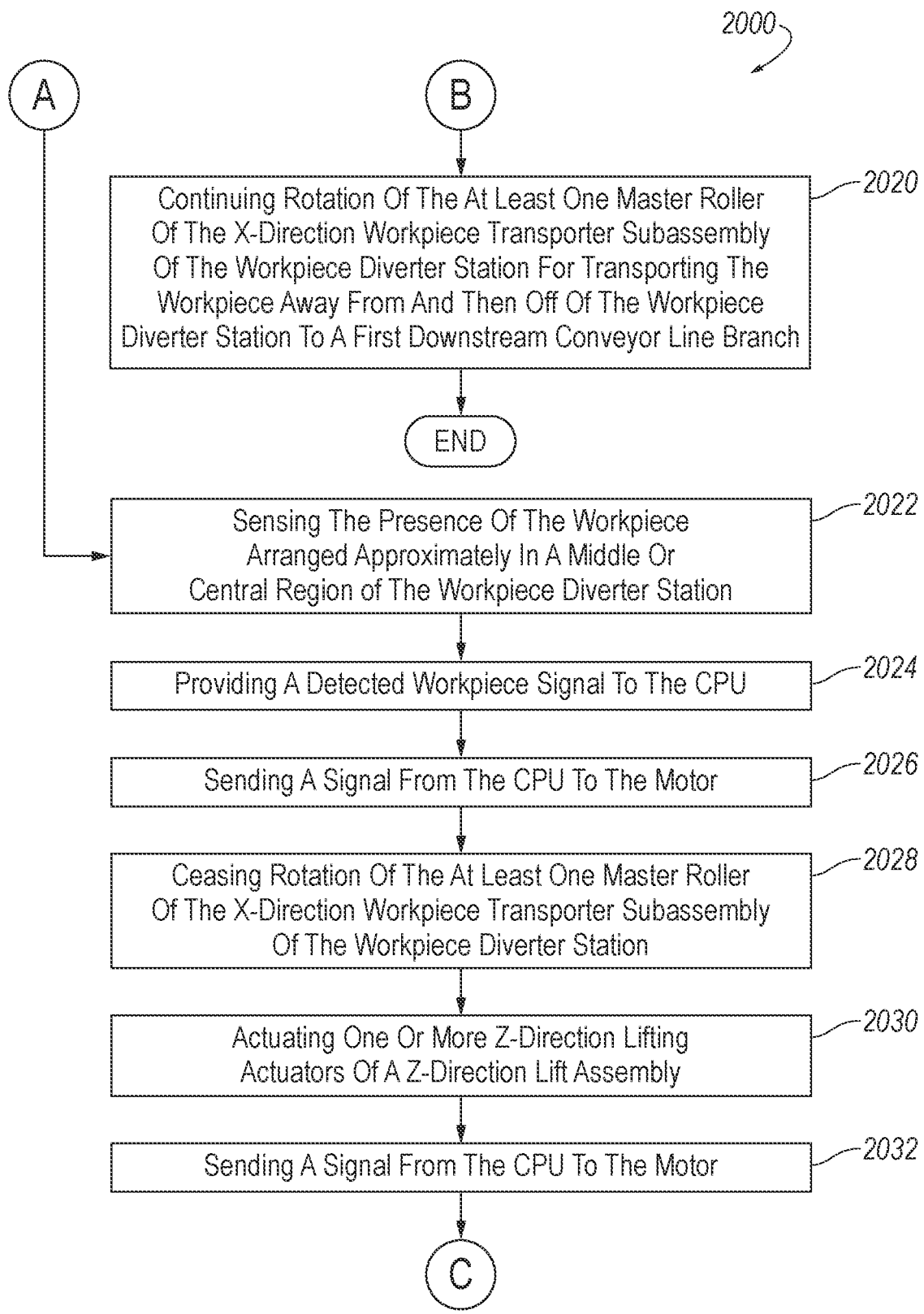
Figure 29C:
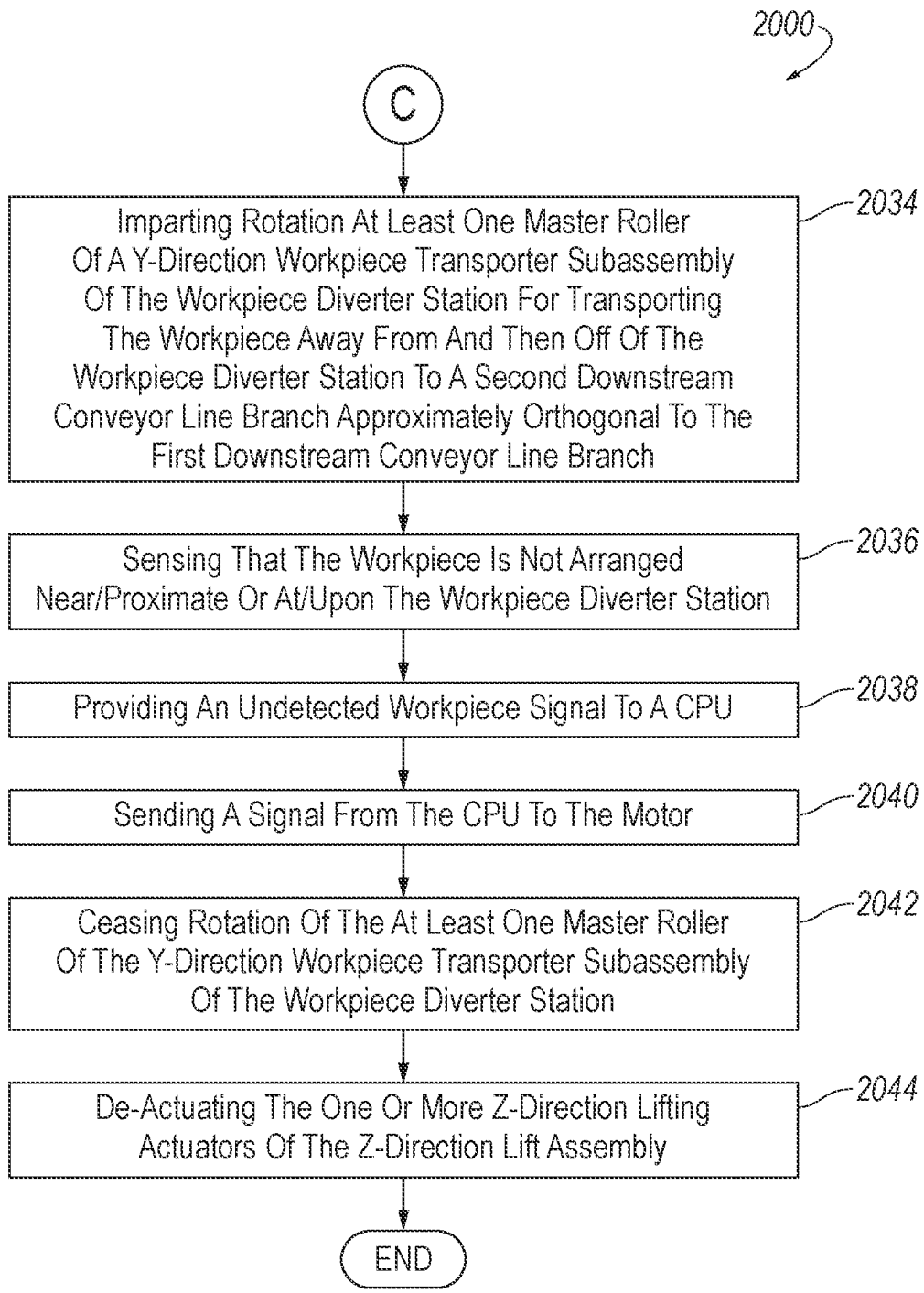
Figure 30A:
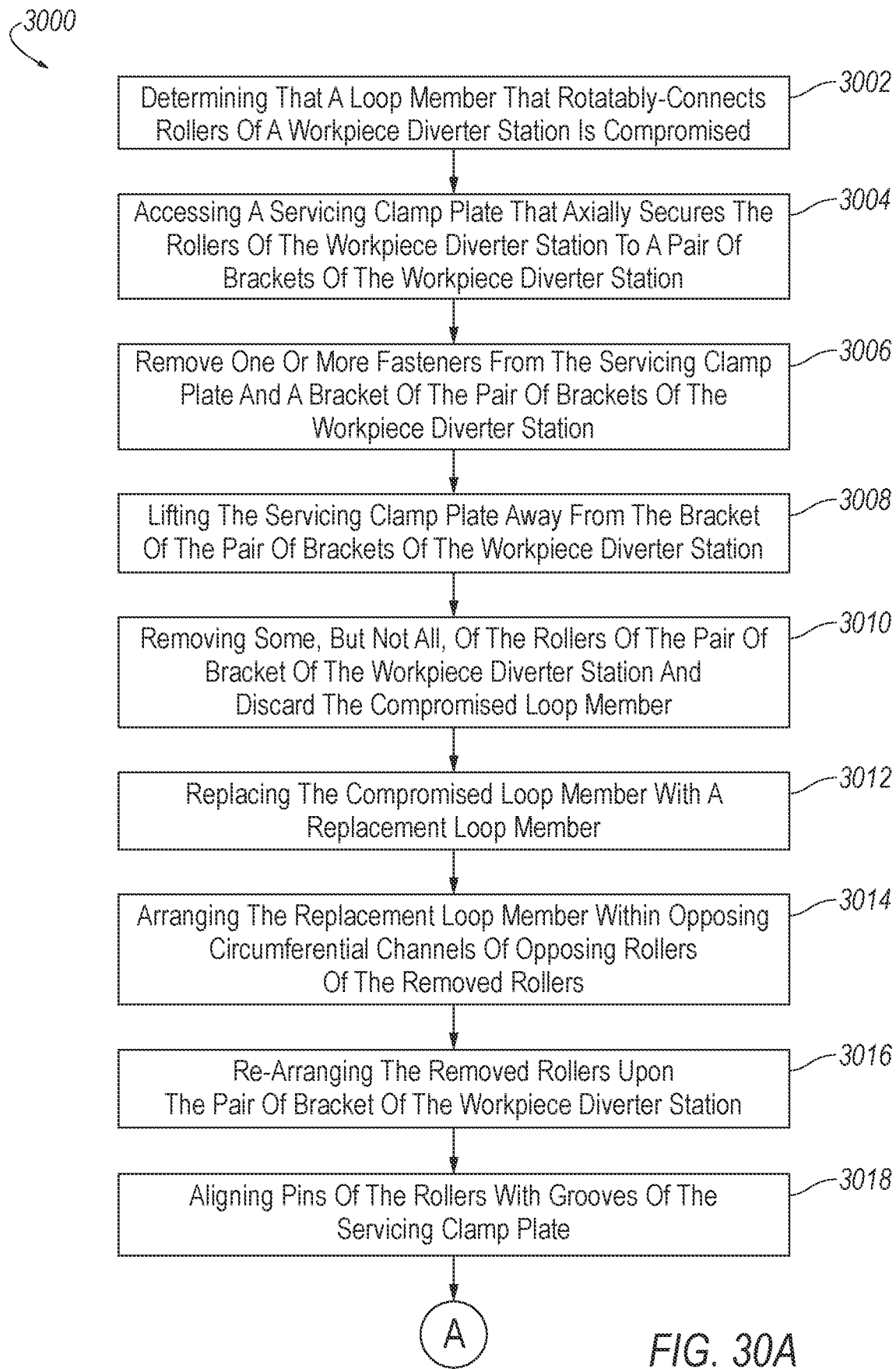
FIGS. 30A-30B is a flow chart of an exemplary method for servicing the exemplary workpiece diverter station of FIG. 4.
Figure 30B:
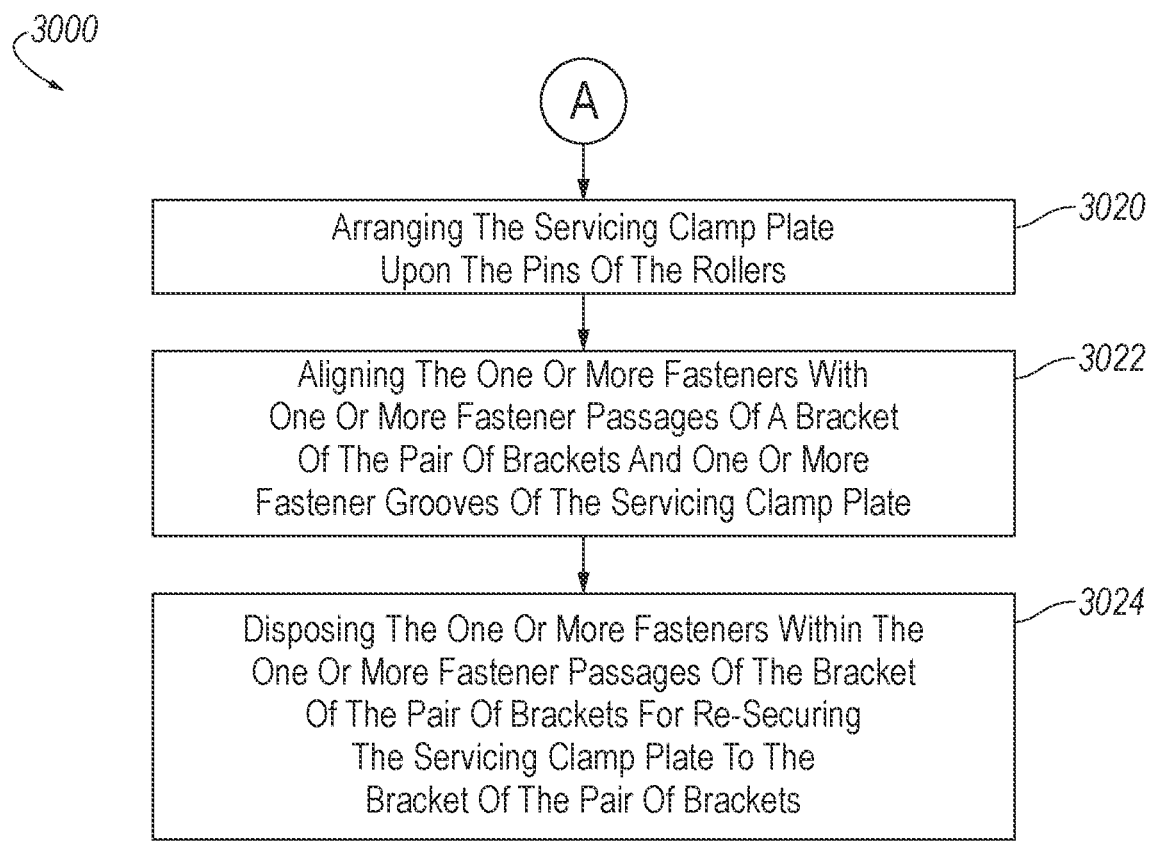

With exemplary configurations of the plurality of components and subassemblies (e.g., the base frame 20, the Z-direction lift assembly 22, the X-direction workpiece transporter subassembly 24, the Y-direction workpiece transporter subassembly 26, and the Y-direction workpiece guiding subassembly 28) of the workpiece diverter station 10 now described, exemplary methods for operating or servicing one or both of the workpiece diverter station 10 and the conveyor system 1000 is seen generally at 2000 (see, e.g., FIGS. 29A-29C) and 3000 (see, e.g., FIGS. 30A-30B). Furthermore, as seen at FIGS. 31A-31G, an exemplary series of views of the workpiece diverter station 10 being serviced (that is associated with the method 3000) is also shown.

Referring to FIGS. 1A and 2A-2C, in a first exemplary configuration, the workpiece TW that traverses the workpiece diverter station 10 travels along the first conveying path P1 in the X-direction from a first location (e.g., upstream of or at the upstream conveyor line branch 12) to a first destination (e.g., downstream of or at the first downstream conveyor line branch 14) is shown. The first conveying path P1 in the X-direction traverses the workpiece diverter station 10.

In order for the workpiece TW to traverse the workpiece diverter station 10 along the first conveying path P1, the method 2000 may include the following steps. Firstly, at step 2002, the workpiece TW is provided from the upstream conveyor line branch 12 to workpiece diverter station 10. Before, at, or slightly after the workpiece TW arriving at the workpiece diverter station 10, the method 2000 includes a step 2004 of the one or more workpiece sensors 46 sensing the presence of the workpiece TW being arranged near/proximate or at/upon the workpiece diverter station 10. Responsive to step 2004, the method 2000 includes a step 2006 of the one or more workpiece sensors 46 providing a signal to the CPU 18. Responsive to the provided signal 2006, the method 2000 includes a step 2008 of the CPU 18 sending a signal to the one or more motors 16 for imparting rotation 2010 of, for example: (1) the intermediate active (i.e., "powered" or "master") roller $80_A$ of the first plurality of proximal rollers 80 of the X-direction workpiece transporter subassembly 24; and (2) the intermediate active (i.e., "powered" or "master") roller $82_A$ of the first plurality of distal rollers 82 of the X-direction workpiece transporter subassembly 24. Rotation 2010 of the intermediate active roller $80_A$ and the intermediate active roller $82_A$ results in corresponding rotation of all of the passive (i.e., "non-powered" or "slave") rollers (i.e., (1) the proximal passive roller $80_{P1}$ and the distal passive roller $80_{P2}$ (of the first plurality of proximal rollers 80); (2) the distal passive roller $82_{P1}$ and the proximal passive roller $82_{P2}$ (of the first plurality of distal rollers 82); (3) the proximal passive roller $84_{P1}$, the intermediate passive roller $84_{P2}$, and the distal passive roller $84_{P3}$ (of the plurality of intermediate rollers 84); and (4) the proximal passive roller $86_{P1}$, the intermediate passive roller $86_{P2}$, and the distal passive roller $86_{P3}$ (of the second plurality of proximal rollers 86)) of the X-direction workpiece transporter subassembly 24.

If a user, operator, or, for example, artificial intelligence desires the workpiece TW to be transported along the first conveying path P1 from the first location to the first destination, the method 2000 may include the step of the determining 2012 if an input is received at the CPU 18 that will result in the workpiece TW being transported along the first conveying path P1. If the determining step 2012 is positive, the method 2000 includes a step 2014 of the one or more workpiece sensors 46 sensing the presence of the workpiece TW being arranged approximately in the middle of or a central region of the workpiece diverter station 10. Responsive to step 2014, the method 2000 includes a step 2016 of the one or more workpiece sensors 46 providing a signal to the CPU 18. Responsive to the provided signal 2016, the method 2000 includes a step 2018 of the CPU 18 sending a signal to the one or more motors 16 for continuing rotation 2020 of the intermediate active roller $80_A$ and the intermediate active roller $82_A$ that results in corresponding continued rotation of all of the passive rollers of the X-direction workpiece transporter subassembly 24. As a result of the continued rotation 2020, the workpiece TW is transported away from and subsequently off of the workpiece diverter station 10 for arrangement at, upon, or downstream of the first destination (e.g., downstream of or at the first downstream conveyor line branch 14).

During steps 2002 through 2020 as described above, the one or more motors 16 do not send a signal to the proximal active (i.e., "powered" or "master") roller 266$_A$ of the plurality of proximal rollers 266 and the distal active (i.e., "powered" or "master") roller 268$_A$ of the plurality of distal rollers 268. Accordingly, all of the plurality of proximal rollers 266, the plurality of distal rollers 268, and the plurality of intermediate rollers 270 associated with the Y-direction workpiece transporter subassembly 26 remain offline and do not rotate when the workpiece TW is transported along the first conveying path P1.

If, however, at step 2012, a user, operator, or, for example, artificial intelligence desires the workpiece TW is to be transported along the second conveying path P2 from the first location (e.g., upstream of or at the upstream conveyor line branch 12) to a second destination (e.g., downstream of or at the second downstream conveyor line branch 14'), the method 2000 may be advanced from step 2012 to step 2022. Accordingly, if the determining step 2012 is negative, the method 2000 includes a step 2022 of the one or more workpiece sensors 46 sensing the presence of the workpiece TW being arranged approximately in the middle of or a central region of the workpiece diverter station 10. Responsive to step 2022, the method 2000 includes a step 2024 of the one or more workpiece sensors 46 providing a signal to the CPU 18. Responsive to the provided signal 2024, the method 2000 includes a step 2026 of the CPU 18 sending a signal to the one or more motors 16 for ceasing rotation 2028 of the intermediate active roller 80$_A$ and the intermediate active roller 82$_A$ that results in corresponding ceased rotation of all of the passive rollers of the X-direction workpiece transporter subassembly 24. After ceasing rotation 2028, the CPU 18 may send a signal to the pressurized fluid source 17 (e.g., an air source), pump, or the like for actuating 2030 the Z-direction lift assembly 22 by, for example, providing fluid to the proximal Z-direction lifting actuator 74 and the distal Z-direction lifting actuator 76 for causing the proximal Z-direction lifting actuator 74 and the distal Z-direction lifting actuator 76 to transition from the first orientation or "down" orientation (e.g., a non-inflated orientation) to the second orientation or "up" orientation (e.g., an inflated orientation). After actuating 2030 the Z-direction lift assembly 22, the method 2000 includes a step 2032 of the CPU 18 sending a signal to the one or more motors 16 for imparting rotation 2034 of: (1) the proximal active roller 266$_A$ of the plurality of proximal rollers 266 of the Y-direction workpiece transporter subassembly 26; and (2) the distal active roller 268$_A$ of the plurality of distal rollers 268 of the Y-direction workpiece transporter subassembly 26. Rotation 2010 of the proximal active roller 266$_A$ and the distal active roller 268$_A$ results in corresponding rotation of all of the passive (i.e., "non-powered" or "slave") rollers (i.e., (1) the distal passive roller 266$_P$ (of the plurality of proximal rollers 266); (2) the proximal passive roller 268$_P$ (of the plurality of distal rollers 268); and (3) the first proximal group of intermediate rollers 270$a$, the second proximal group of intermediate rollers 270$b$, the first distal group of intermediate rollers 270$c$, and the second distal group of intermediate rollers 270$d$ (of the plurality of intermediate rollers 270)) of the Y-direction workpiece transporter subassembly 26.

As a result of the rotation 2034, the workpiece TW is transported away from and subsequently off of the workpiece diverter station 10 for arrangement at, upon, or downstream of the first destination (e.g., downstream of or at the first downstream conveyor line branch 14) the workpiece TW is transported away from and subsequently off of the workpiece diverter station 10 for arrangement at, upon, or downstream of the second destination (e.g., downstream of or at the second downstream conveyor line branch 14'). After the workpiece TW is transported away from and subsequently off of the workpiece diverter station 10, the method 2000 may include a step 2036 of the one or more workpiece sensors 46 sensing that the workpiece TW is no longer arranged upon the workpiece diverter station 10. Responsive to step 2036, the method 2000 includes a step 2038 of the one or more workpiece sensors 46 providing a signal to the CPU 18. Responsive to the provided signal 2038, the method 2000 includes a step 2040 of the CPU 18 sending a signal to the one or more motors 16 for ceasing rotation 2042 of the proximal active roller 266$_A$ and the distal active roller 268$_A$ that results in corresponding ceased rotation of all of the passive rollers of the Y-direction workpiece transporter subassembly 26. Thereafter the method 2000 may also include the CPU 18 sending a signal to the pressurized fluid source 17 (e.g., an air source), pump, or the like for de-actuating 2044 the Z-direction lift assembly 22 by, for example, expelling or withdrawing fluid from the proximal Z-direction lifting actuator 74 and the distal Z-direction lifting actuator 76 for causing the proximal Z-direction lifting actuator 74 and the distal Z-direction lifting actuator 76 to transition from the second orientation or "up" orientation (e.g., an inflated orientation) back to the first orientation or "down" orientation (e.g., a non-inflated orientation).

Figure 31A:
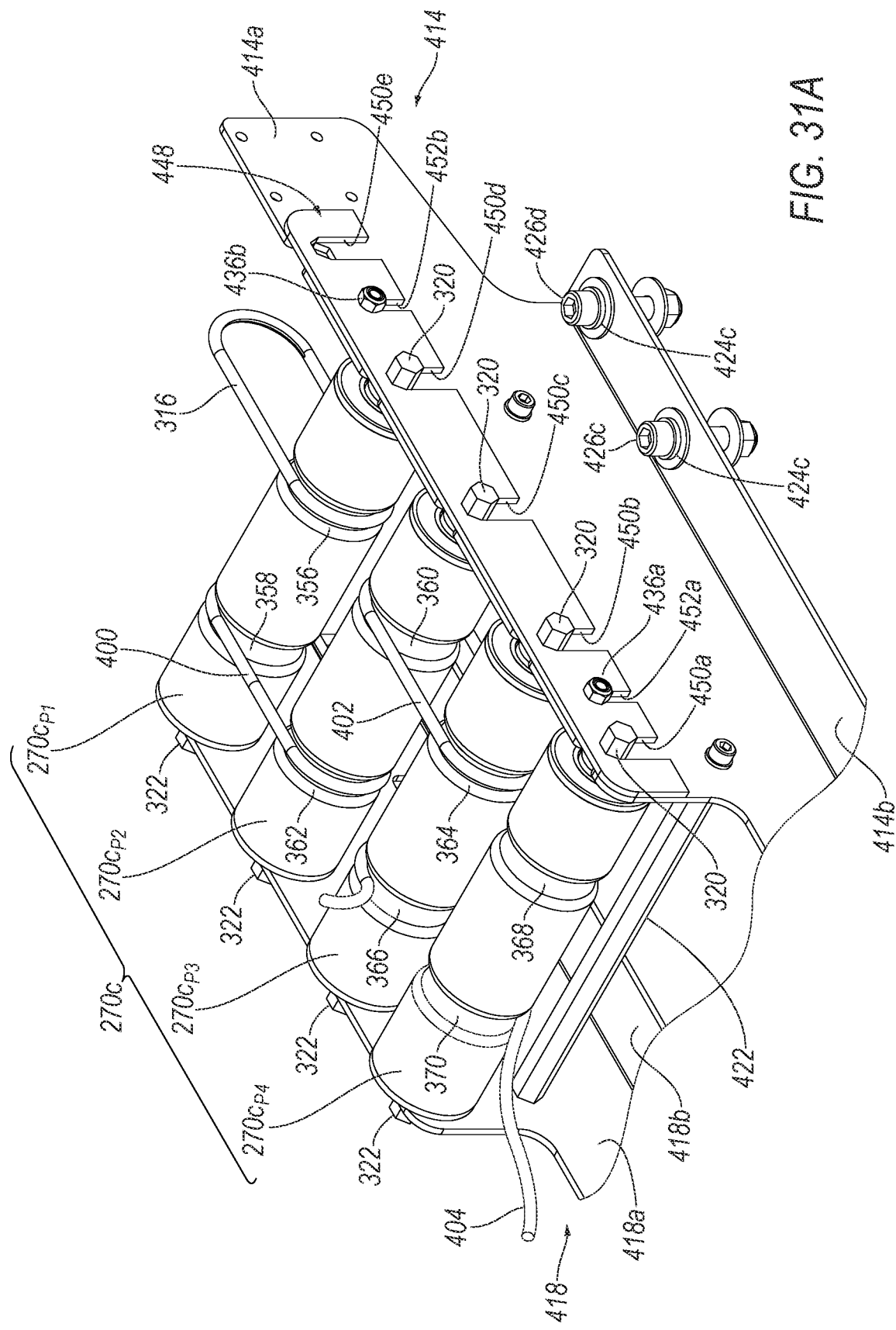

Referring now to FIGS. 30A-30B and 31A-31G, an exemplary method 3000 for servicing the workpiece diverter station 10 is shown. Referring to FIG. 31A, an exemplary region of the workpiece diverter station 10 is shown whereby, for example, the third loop member 404 is compromised (e.g., broken, ripped, torn, severed, or the like). The third loop member 404 is associated with the fifth plurality of loop members (see, e.g., loop members 400, 402, 404) that are associated with the circumferential channels 356-370 of the first distal group of intermediate rollers 270$c$ of the plurality of intermediate rollers 270 of the Y-direction workpiece transporter subassembly 26. Although an exemplary loop member (i.e., the third loop member 404) of the Y-direction workpiece transporter subassembly 26 is shown and described at FIGS. 31A-31G, the steps associated with the method 3000 of servicing the workpiece diverter station 10 may also be applied to any loop member of either of the X-direction workpiece transporter subassembly 24 or the Y-direction workpiece transporter subassembly 26.

Accordingly, at step 3002 when a user (e.g., a maintenance worker) notices that the third loop member 404 is broken, the user may easily access 3004 the fourth servicing clamp plate 448 in order to partially dissemble a portion of the region of the Y-direction workpiece transporter subassembly 26. The convenient access provided to the fourth servicing clamp plate 448 from above or over the workpiece diverter station 10 permits less downtime of the conveyor system 1000 as a result of, for example, the user not having to access any portion of the workpiece diverter station 10 from a region under either of the X-direction workpiece transporter subassembly 24 and the Y-direction workpiece transporter subassembly 26 at, for example, the cavity 38 of the base frame 20. Accordingly, the workpiece diverter station 10 may be easily serviced from a region above either of the X-direction workpiece transporter subassembly 24 and the Y-direction workpiece transporter subassembly 26 without having to, for example, remove any of the plurality side panels including the first panel 30, the second panel 32, the third panel 34, and the fourth panel 36.

Figure 31B:
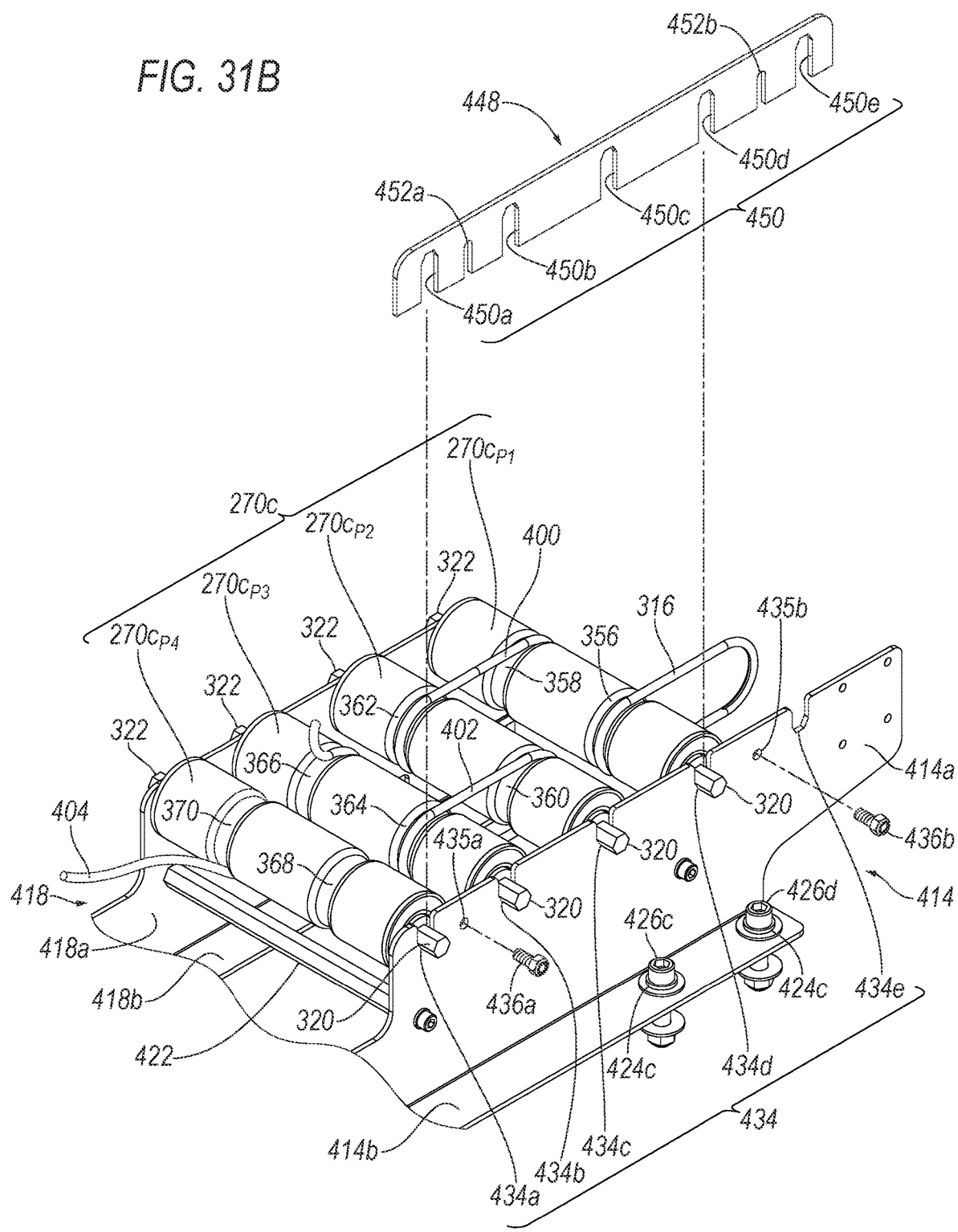

Referring to FIGS. 31A-31B, firstly, the user may remove 3006: (1) the first fastener 436*a* from the proximal fastener-receiving passage 435*a* of the first flange 414*a* of the second outer bracket 414; and (2) the second fastener 436*b* from the distal fastener-receiving passage 435*b* of the first flange 414*a* of the second outer bracket 414. As a result, the first fastener 436*a* and the second fastener 436*b* no longer secure the fourth servicing clamp plate 448 to the first flange 414*a* of the second outer bracket 414. Thereafter, the user may lift 3008 the fourth servicing clamp plate 448 away from the first flange 414*a* of the second outer bracket 414. When the fourth servicing clamp plate 448 is removed from the first flange 414*a* of the second outer bracket 414, the pin-receiving grooves 450*a*, 450*b*, 450*c*, 450*d* of the fourth servicing clamp plate 448 no longer axially secures the pins 320 of each roller $270c_{P1}$, $270c_{P2}$, $270c_{P3}$, $270c_{P4}$ of the first distal group of intermediate rollers 270*c* within, respectively, each of the grooves 434*a*, 434*b*, 434*c*, 434*d* of the first flange 414*a* of the second outer bracket 414.

Figure 31C:
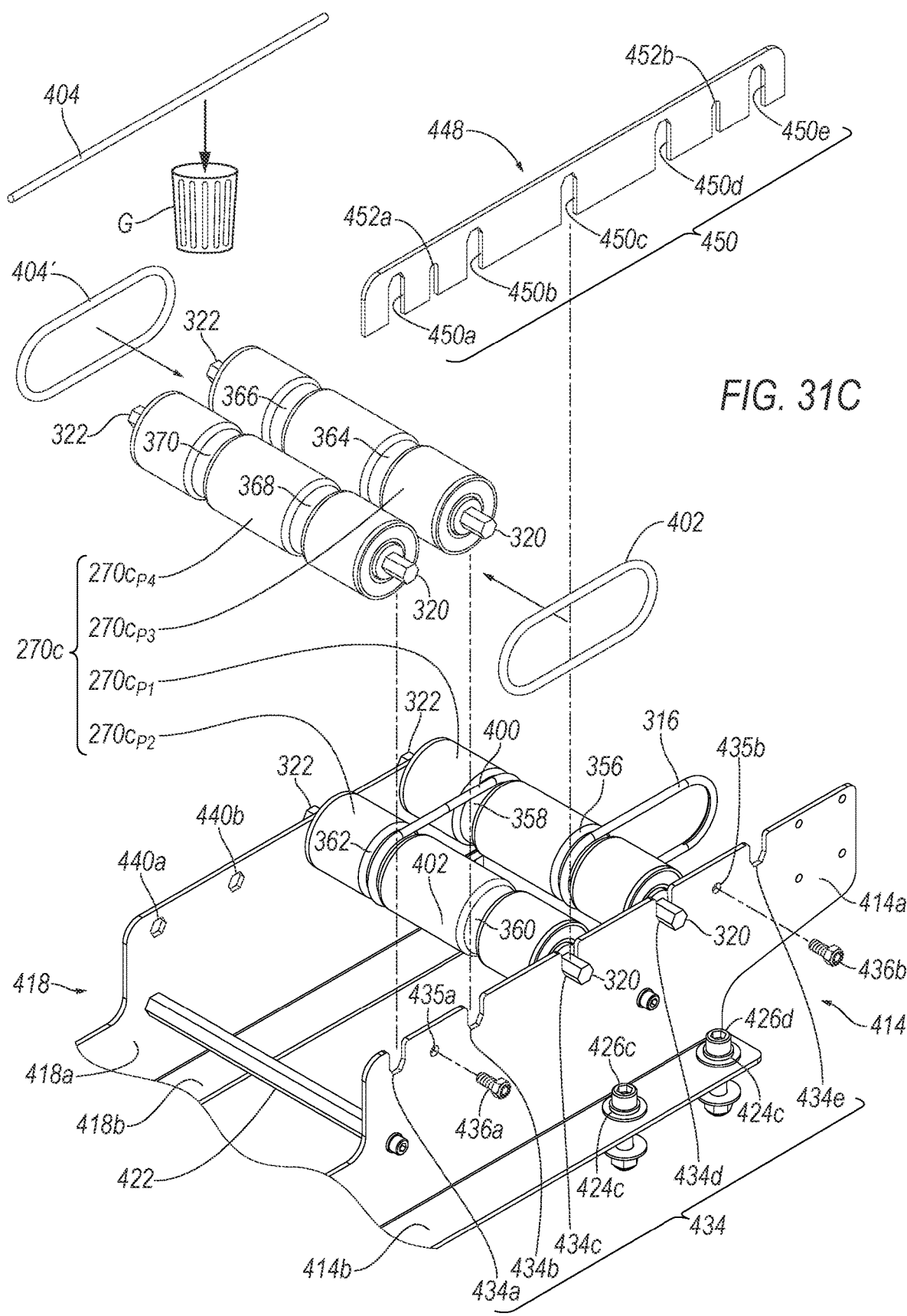

Referring to FIG. 31C, with the fourth servicing clamp plate 448 no longer axially securing the first distal group of intermediate rollers 270*c* to the first flange 414*a* of the second outer bracket 414, the user may remove 3010, for example, the proximal passive roller $270c_{P4}$ and the intermediately-proximal passive roller $270c_{P3}$ from the second outer bracket 414 and the second inner bracket 418. As seen at FIG. 31C, the user may firstly remove the pins 320 of the proximal passive roller $270c_{P4}$ and the intermediately-proximal passive roller $270c_{P3}$ from the grooves 434*a*, 434*b* of the first flange 414*a* of the second outer bracket 414. Secondly, the user may remove the pins 322 of the proximal passive roller $270c_{P4}$ and the intermediately-proximal passive roller $270c_{P3}$ from the pin-receiving passages 440*a*, 440*b* of the second inner bracket 418. Thirdly, the user may remove the second loop member 402 from the first circumferential channel 360 of the intermediately-distal passive roller $270c_{P2}$ and the first circumferential channel 364 of the intermediately-proximal passive roller $270c_{P3}$. The user may discard the compromised third loop member 404 into a refuse can G.

Figure 31D:
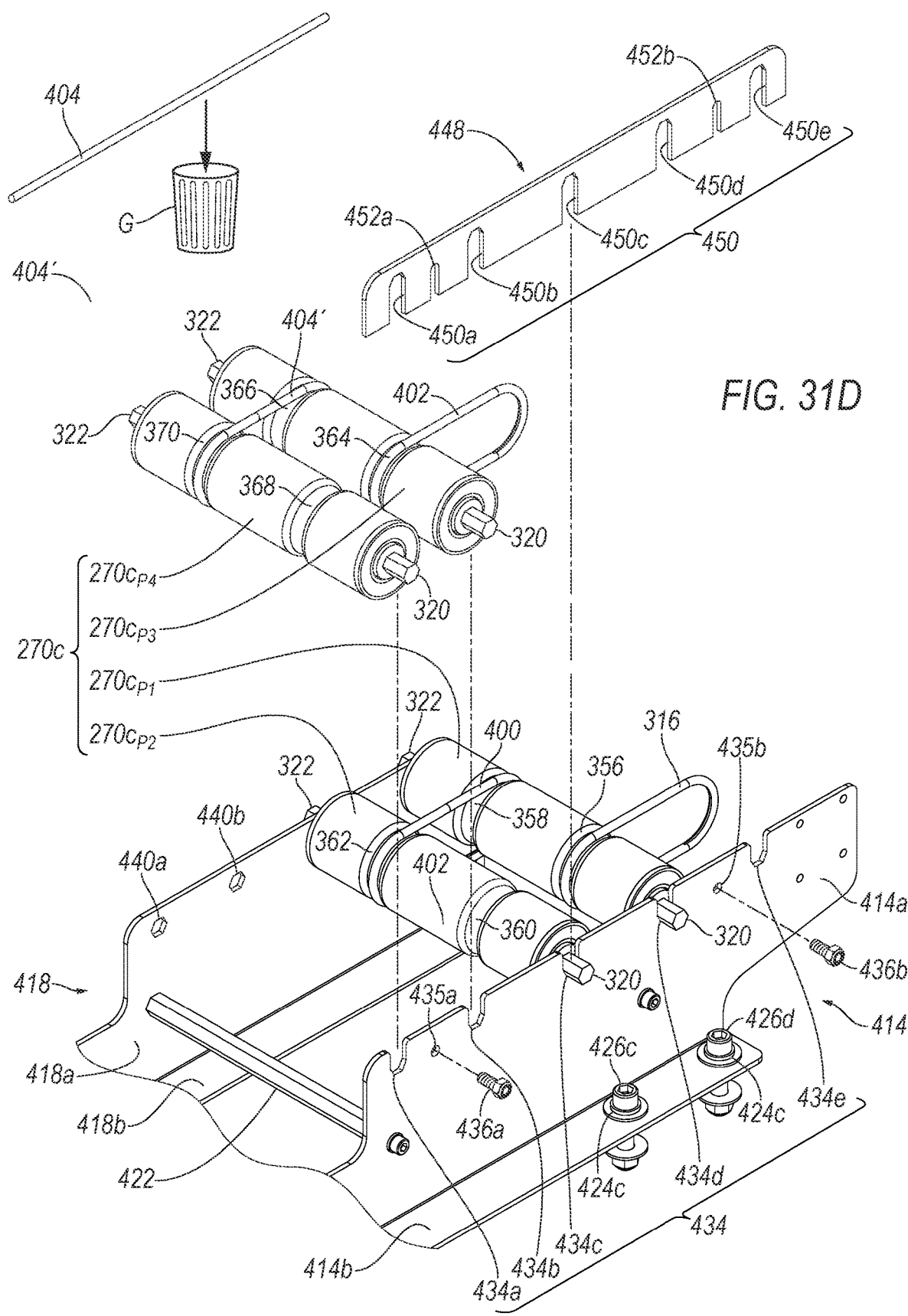

Thereafter, with reference to FIGS. 31C-31D, the user may replace 3012 the compromised third loop member 404 with a new or replacement third loop member 404'. Accordingly, the user may arrange 3014 the new or replacement third loop member 404' within the second circumferential channel 366 of the intermediately-proximal passive roller $270c_{P3}$ of the first distal group of intermediate rollers 270*c* and the second circumferential channel 370 of the proximal passive roller $270c_{P4}$ of the first distal group of intermediate rollers 270*c* for rotatably-reconnecting the intermediately-proximal passive roller $270c_{P3}$ of the first distal group of intermediate rollers 270*c* to the proximal passive roller $270c_{P4}$ of the first distal group of intermediate rollers 270*c*.

Figure 31E:
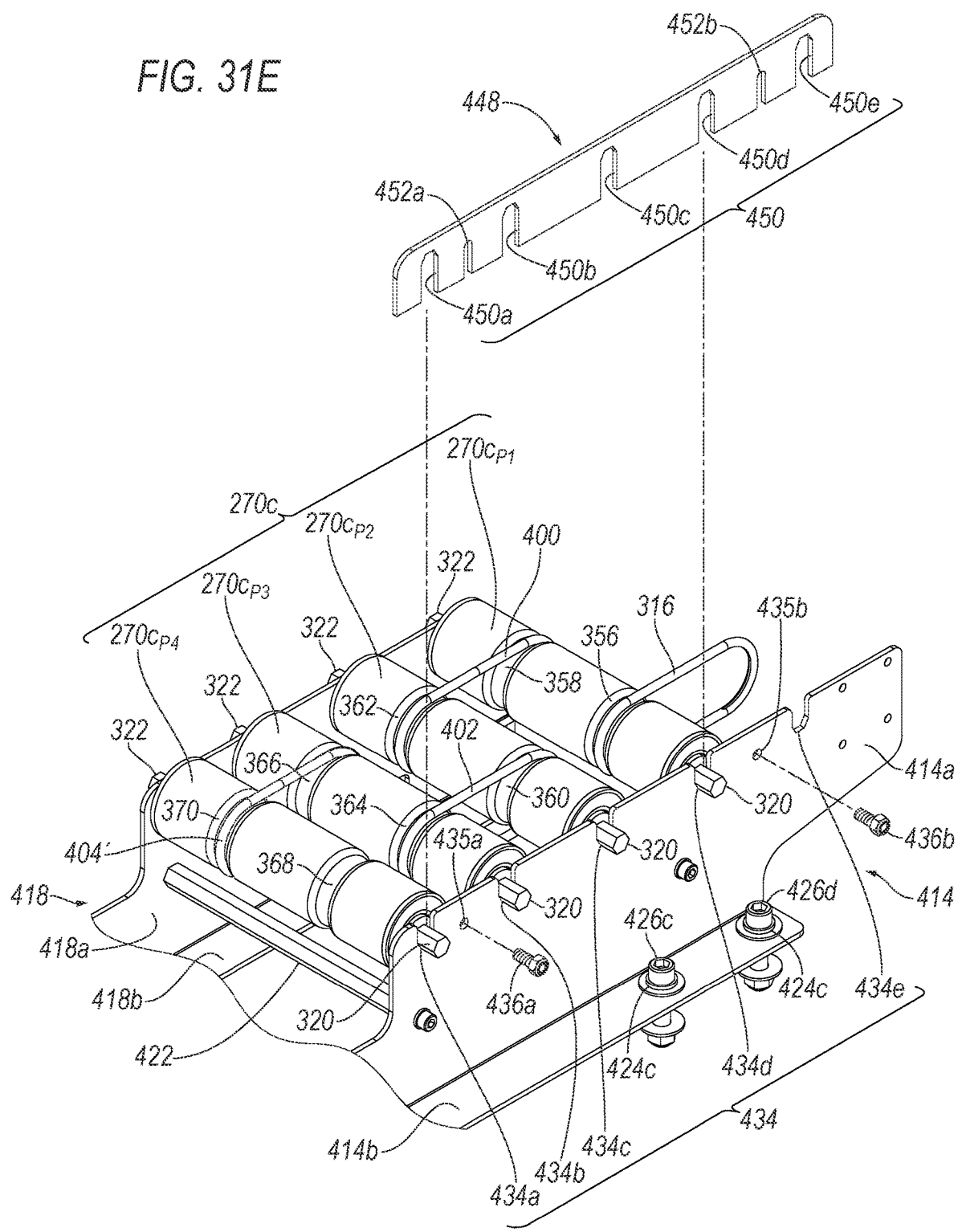
Figure 31F:
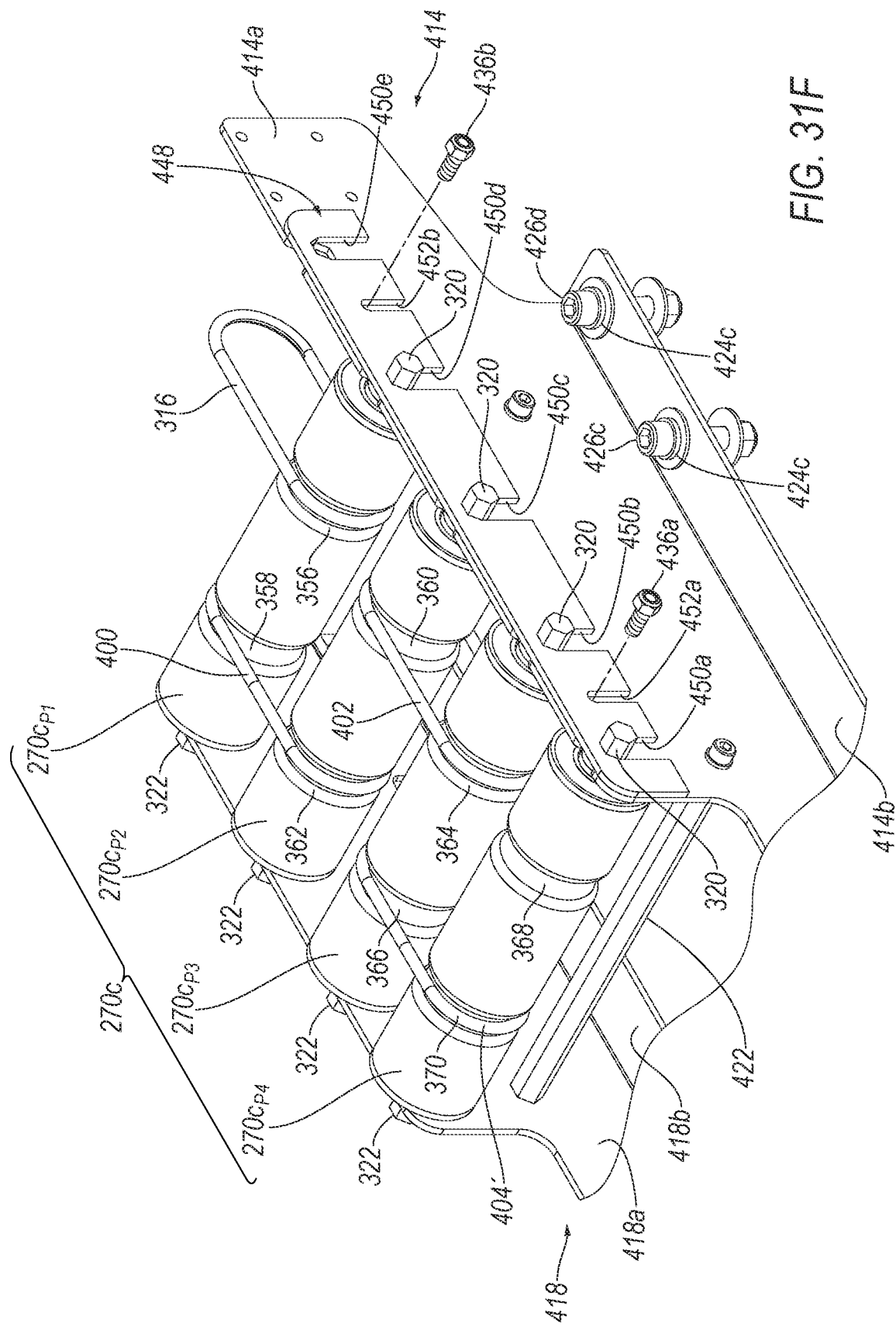

Thereafter, as seen at FIG. 31E, the user may arrange 3016 pins 320, 322 of the proximal passive roller $270c_{P4}$ and the intermediately-proximal passive roller $270c_{P3}$ are arranged within the pin-receiving passages 440*a*, 440*b* of the second inner bracket 418 and upon the grooves 434*a*, 434*b* of the first flange 414*a* of the second outer bracket 414. Thereafter, as seen at FIG. 31F, the grooves 450*a*, 450*b*, 450*c*, 450*d* of the fourth servicing clamp plate 448 are aligned 3018 with the pins 320 of each roller $270c_{P1}$, $270c_{P2}$, $270c_{P3}$, $270c_{P4}$ of the first distal group of intermediate rollers 270*c*. The user may then arrange 3020 the fourth servicing clamp plate 448 upon the pins 320.

Referring to FIG. 31G the user then aligns 3022: (1) the first fastener 436*a* with the proximal fastener-receiving passage 435*a* of the first flange 414*a* of the second outer bracket 414 and the first fastener-receiving groove 452*a* of the fourth servicing clamp plate 448; and (2) the second fastener 436*b* with the distal fastener-receiving passage 435*b* of the first flange 414*a* of the second outer bracket 414 and the second fastener-receiving groove 452*b* of the fourth servicing clamp plate 448. The user then disposes 3024: (1) the first fastener 436*a* within the proximal fastener-receiving passage 435*a* of the first flange 414*a* of the second outer bracket 414; and (2) the second fastener 436*b* within the distal fastener-receiving passage 435*b* of the first flange 414*a* of the second outer bracket 414; as a result, the fourth servicing clamp plate 448 is re-secured to the first flange 414*a* of the second outer bracket 414 and the workpiece diverter station 10 is serviced such that the conveyor system 1000 may be returned online for subsequent operation.

Figure 32:
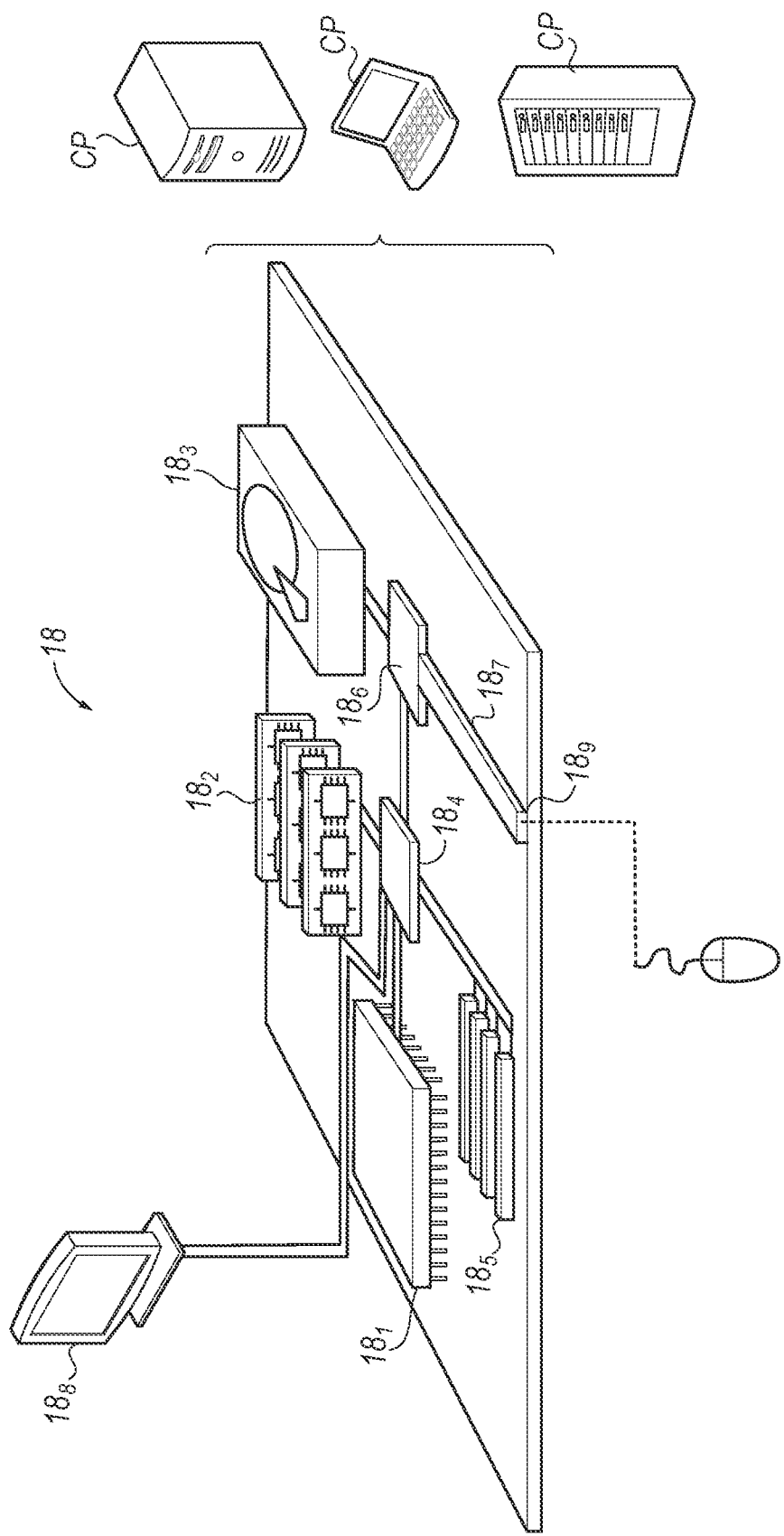
FIG. 32 is a schematic view of an example computing device that may be used to implement the systems and methods described herein.

With reference to FIG. 32, as discussed above, the CPU 18 may be wirelessly connected and/or hardwired connected to one or components of the workpiece diverter station 10 and the one or more motors 16 for controlling one or components of the workpiece diverter station 10 and the one or more motors 16. The CPU 18 may be associated with a laptop computer (see, e.g., CP in FIG. 32) that is communicatively-coupled to one or components of the workpiece diverter station 10 and the one or more motors 16 for controlling one or components of the workpiece diverter station 10 and the one or more motors 16.

FIG. 32 is schematic view of an example CPU 18, which may be alternatively referred to as a computing device that may be used to implement the systems and methods described in this document. The components $18_1$, $18_2$, $18_3$, $18_4$, $18_5$, and $18_6$ shown at FIG. 32, their connections and relationships, and their functions, are meant to be exemplary only, and are not meant to limit implementations of the inventions described and/or claimed in this document.

The computing device 18 includes a processor $18_1$, memory $18_2$, a storage device $18_3$, a high-speed interface/controller $18_4$ connecting to the memory $18_2$ and high-speed expansion ports $18_5$, and a low speed interface/controller $18_6$ connecting to a low speed bus $18_7$ and a storage device $18_3$. Each of the components $18_1$, $18_2$, $18_3$, $18_4$, $18_5$, and $18_6$, are interconnected using various busses, and may be mounted on a common motherboard or in other manners as appropriate. The processor $18_1$ can process instructions for execution within the computing device 18, including instructions stored in the memory $18_2$ or on the storage device $18_3$ to display graphical information for a graphical user interface (GUI) on an external input/output device, such as display $18_8$ coupled to high speed interface $18_4$. In other implementations, multiple processors and/or multiple buses may be used, as appropriate, along with multiple memories and types of memory. Also, multiple computing devices 18 may be connected, with each device providing portions of the necessary operations (e.g., as a server bank, a group of blade servers, or a multi-processor system).

The memory $18_2$ stores information non-transitorily within the computing device 18. The memory $18_2$ may be a computer-readable medium, a volatile memory unit(s), or non-volatile memory unit(s). The non-transitory memory $18_2$ may be physical devices used to store programs (e.g., sequences of instructions) or data (e.g., program state information) on a temporary or permanent basis for use by the computing device 18. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device $18_3$ is capable of providing mass storage for the computing device 18. In some implementations, the storage device $18_3$ is a computer-readable medium. In various different implementations, the storage device $18_3$ may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory $18_2$, the storage device $18_3$, or memory on processor $18_1$.

The high speed controller $18_4$ manages bandwidth-intensive operations for the computing device 18, while the low speed controller $18_6$ manages lower bandwidth-intensive operations. Such allocation of duties is exemplary only. In some implementations, the high-speed controller $18_4$ is coupled to the memory $18_2$, the display $18_8$ (e.g., through a graphics processor or accelerator), and to the high-speed expansion ports $18_5$, which may accept various expansion cards (not shown). In some implementations, the low-speed controller $18_6$ is coupled to the storage device $18_3$ and a low-speed expansion port $18_9$. The low-speed expansion port $18_9$, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 18 may be implemented in a number of different forms, as shown in the figure. For example, it may be implemented in one or a combination of the workpiece diverter station 10 and a laptop computer CP.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Reference is also made to FIGS. 33A-33D, which illustrates an exemplary tire T. In the present disclosure, reference may be made to the "upper," "lower," "left," "right" and "side" of the tire T; although such nomenclature may be utilized to describe a particular portion or aspect of the tire T, such nomenclature may be adopted due to the orientation of the tire T with respect to structure that supports the tire T. Accordingly, the above nomenclature should not be utilized to limit the scope of the claimed invention and is utilized herein for exemplary purposes in describing an embodiment of the invention.

In an embodiment, the tire T includes an upper sidewall $T_{SU}$ (see, e.g., FIG. 33A), a lower sidewall $T_{SL}$ (see, e.g., FIG. 33D) and a tread surface $T_T$ (see, e.g., FIGS. 33B-33C), that joins the upper sidewall $T_{SU}$ to the lower sidewall $T_{SL}$. Referring to FIG. 33B, the upper sidewall $T_{SU}$ may rise away from the tread surface $T_T$ to a peak and subsequently descend at a slope to terminate at and form a circumferential upper bead, $T_{BU}$; similarly, the lower sidewall $T_{SL}$ may rise away from the tread surface $T_T$ to a peak and subsequently descend at a slope to terminate at and form a circumferential lower bead $T_{BL}$.

As seen in FIG. 33B, when the tire T is in a relaxed, unbiased state, the upper bead $T_{BU}$ forms a circular, upper tire opening $T_{OU}$; similarly, when the tire T is in a relaxed, unbiased state, the lower bead $T_{BL}$ forms a circular, lower tire opening, $T_{OL}$. It will be appreciated that when an external force is applied to the tire T, the tire T may be physically manipulated, and, as a result, one or more of the upper tire opening $T_{OU}$ and the lower tire opening $T_{OL}$ may be temporality upset such that one or more of the upper tire opening $T_{OU}$ and the lower tire opening $T_{OL}$ is/are not entirely circular, but, may, for example, be manipulated to include an oval shape.

Figure 33A:
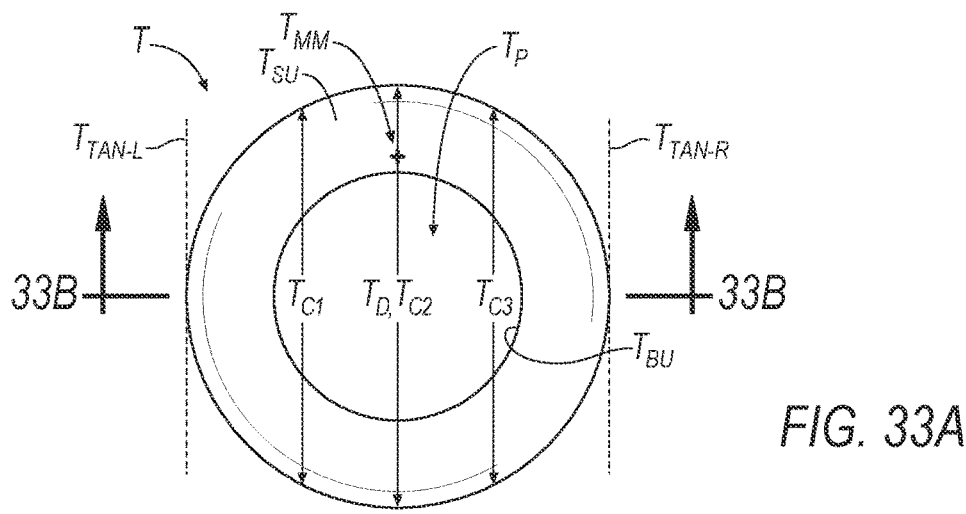
FIG. 33A is a top view of an exemplary tire.
Figure 33B:
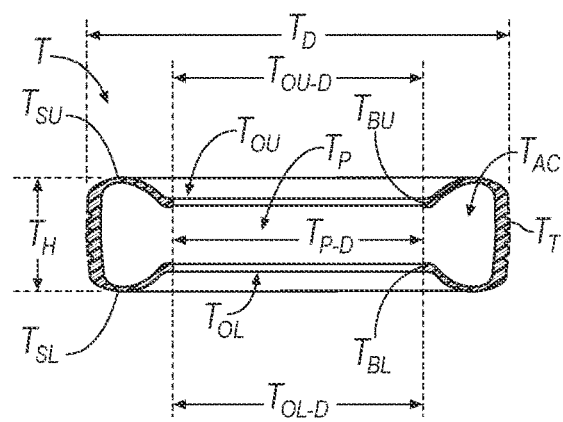
FIG. 33B is a cross-sectional view of the tire according to line 33B-33B of FIG. 33A.
Figure 33C:
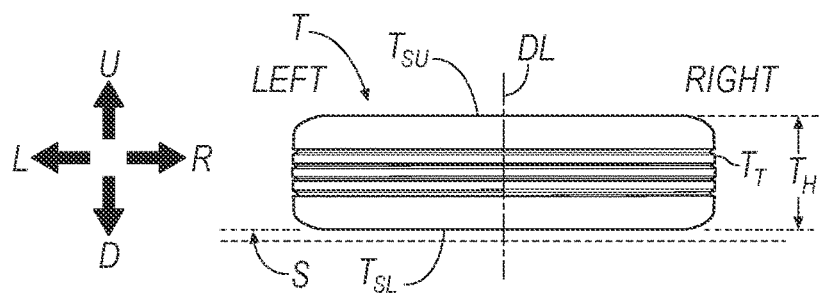
FIG. 33C is a side view of the tire of FIG. 33A.
Figure 33D:
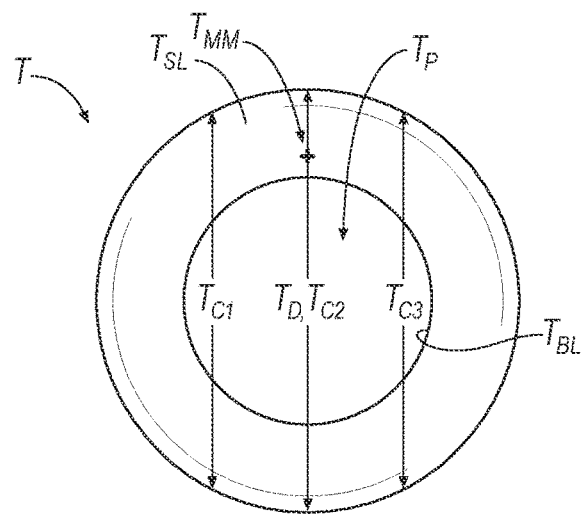
FIG. 33D is a bottom view of the tire of FIG. 33A.

Referring to FIGS. 33A and 33D, when in the relaxed, unbiased state, each of the upper tire opening $T_{OU}$ and the lower tire opening $T_{OL}$ form, respectively, an upper tire opening diameter $T_{OU-D}$ and a lower tire opening diameter $T_{OL-D}$. Further, as seen in FIGS. 33A and 33D, when in the relaxed, unbiased state, the upper sidewall $T_{SU}$ and the lower sidewall $T_{SL}$ define the tire T to include a tire diameter $T_D$.

Referring to FIGS. 33A-33B and 33D, the tire T also includes a passage $T_P$. Access to the passage $T_P$ is permitted by either of the upper tire opening $T_{OU}$ and the lower tire opening $T_{OL}$. Referring to FIG. 33B, when the tire T is in a relaxed, unbiased state, the upper tire opening $T_{OU}$ and the lower tire opening $T_{OL}$ define the passage $T_P$ to include a diameter $T_{P-D}$. Referring also to FIG. 33B, the tire T includes a circumferential air cavity $T_{AC}$ that is in communication with the passage $T_P$. After joining the tire T to a wheel W (see, e.g., FIGS. 34A-34B, pressurized air is deposited into the circumferential air cavity $T_{AC}$ for inflating the tire T, thereby forming a tire-wheel assembly TW (see, e.g., FIG. 35).

When the tire T is arranged adjacent structure or a wheel W, as described in the following disclosure, the written description may reference a "left" portion or a "right" portion of the tire T. Referring to FIG. 33C, the tire T is shown relative to a support member S; the support member S is provided (and shown in phantom) in order to establish a frame of reference for the "left" portion and the "right" portion of the tire T. In FIG. 33C, the tire T is arranged in a "non-rolling" orientation such that the tread surface $T_T$ is not disposed adjacent the phantom support member S but, rather, the lower sidewall $T_{SL}$ is disposed adjacent the phantom support member S. A center dividing line DL equally divides the "non-rolling" orientation of the tire T in half in order to generally indicate a "left" portion of the tire T and a "right" portion of the tire T.

As discussed above, reference is made to several diameters $T_{P-D}$, $T_{OU-D}$, $T_{OL-D}$ of the tire T. According to geometric theory, a diameter passes through the center of a circle, or, in the present disclosure, the axial center of the tire T, which may alternatively be referred to as an axis of rotation of the tire T. Geometric theory also includes the concept of a chord, which is a line segment that whose endpoints both lie on the circumference of a circle; according to geometric theory, a diameter is the longest chord of a circle.

In the following description, the tire T may be moved relative to structure; accordingly, in some instances, a chord of the tire T may be referenced in order to describe an embodiment of the invention. Referring to FIG. 33A, several chords of the tire T are shown generally at $T_{C1}$, $T_{C2}$ (i.e., the tire diameter, $T_D$) and $T_{C3}$.

The chord $T_{C1}$ may be referred to as a "left" tire chord. The chord $T_{C3}$ may be referred to as a "right" tire chord. The chord $T_{C2}$ may be equivalent to the tire diameter $T_D$ and be referred to as a "central" chord. Both of the left and right tire chords $T_{C1}$, $T_{C3}$, include a geometry that is less than central chord $T_{C2}$/tire diameter $T_D$.

In order to reference the location of the left chord $T_{C1}$ and the right chord $T_{C3}$ reference is made to a left tire tangent line $T_{TAN-L}$ and a right tire tangent line $T_{TAN-R}$. The left chord $T_{C1}$ is spaced apart approximately one-fourth (¼) of the tire diameter $T_D$ from the left tire tangent line $T_{TAN-L}$. The right chord $T_{C3}$ is spaced apart approximately one-fourth (¼) of the tire diameter $T_D$ from the right tire tangent line $T_{TAN-R}$. Each of the left and right tire chords $T_{C1}$, $T_{C3}$ may be spaced apart about one-fourth (¼) of the tire diameter $T_D$ from the central chord $T_{C2}$. The above spacings referenced from the tire diameter $T_D$ are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 33C, the movement may be referenced by an arrow U to indicate upwardly movement or an arrow D to indicate downwardly movement. Further, the movement may be referenced by an arrow L to indicate left or rearwardly movement or an arrow R to indicate right or forwardly movement.

Figure 34A:
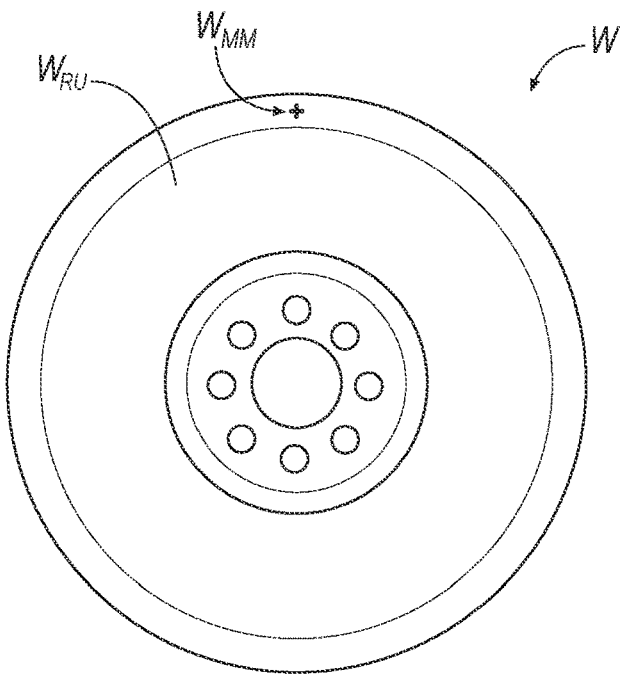
FIG. 34A is a top view of an exemplary wheel.
Figure 34B:
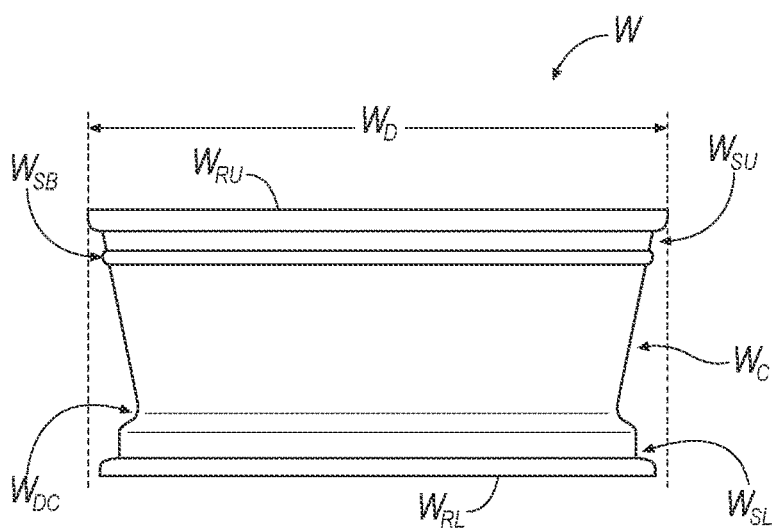
FIG. 34B is a side view of the wheel of FIG. 34A.
Figure 35:
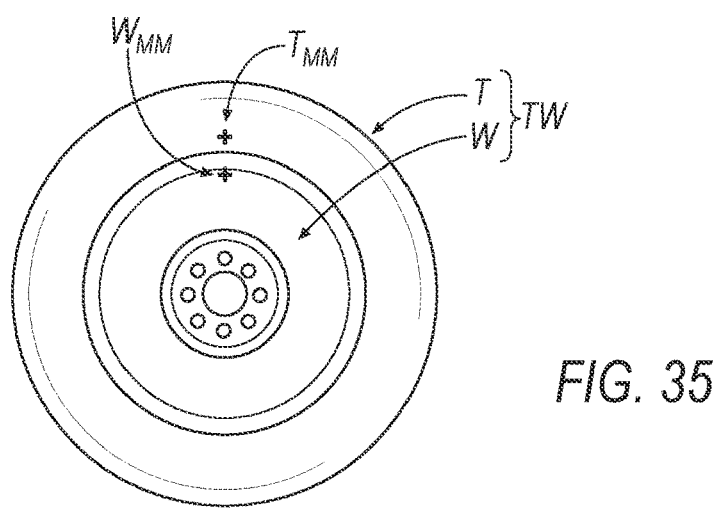
FIG. 35 is a top view of the tire of FIGS. 33A-33D joined to the wheel of FIGS. 34A-34B for forming a tire-wheel assembly.

Prior to describing embodiments of the invention, reference is made to FIGS. 34A-34B, which illustrate an exemplary wheel W. In the present disclosure, reference may be made to the "upper," "lower," "left," "right" and "side" of the wheel W; although such nomenclature may be utilized to describe a particular portion or aspect of the wheel W, such nomenclature may be adopted due to the orientation of the wheel W with respect to structure that supports the wheel W. Accordingly, the above nomenclature should not be utilized to limit the scope of the claimed invention and is utilized herein for exemplary purposes in describing an embodiment of the invention.

In an embodiment, the wheel W includes an upper rim surface $W_{RU}$ a lower rim surface $W_{RL}$ and an outer circumferential surface We that joins the upper rim surface $W_{RU}$ to the lower rim surface $W_{RL}$. Referring to FIG. 34B, the upper rim surface $W_{RU}$ forms a wheel diameter $W_D$. The wheel diameter $W_D$ may be non-constant about the circumference $W_C$ from the upper rim surface $W_{RU}$ to the lower rim surface $W_{RL}$. The wheel diameter $W_D$ formed by the upper rim surface $W_{RU}$ may be largest diameter of the non-constant diameter about the circumference $W_C$ from the upper rim surface $W_{RU}$ to the lower rim surface $W_{RL}$. The wheel diameter $W_D$ is approximately the same as, but slightly greater than the diameter $T_{P-D}$ of the passage $T_P$ of the tire T; accordingly, once the wheel W is disposed within the passage $T_P$, the tire T may flex and be frictionally-secured to the wheel W as a result of the wheel diameter $W_D$ being approximately the same as, but slightly greater than the diameter $T_{P-D}$ of the passage $T_P$ of the tire T.

The outer circumferential surface $W_C$ of the wheel W further includes an upper bead seat $W_{SU}$ and a lower bead seat $W_{SL}$. The upper bead seat $W_{SU}$ forms a circumferential cusp, corner or recess that is located proximate the upper rim surface $W_{RU}$. The lower bead seat $W_{SL}$ forms a circumferential cusp, corner or recess that is located proximate the lower rim surface $W_{RL}$. Upon inflating the tire T the pressurized air causes the upper bead $T_{Bu}$ to be disposed adjacent and "seat" in the upper bead seat $W_{SU}$; similarly, upon inflating the tire T, the pressurized air causes the lower bead $T_{BL}$ to be disposed adjacent and "seat" in the lower bead seat $W_{SL}$.

The non-constant diameter of the outer circumference $W_C$ of the wheel W further forms a wheel "drop center" $W_{DC}$. A wheel drop center $W_{Dc}$ may include the smallest diameter of the non-constant diameter of the outer circumference $W_C$ of the wheel W. Functionally, the wheel drop center $W_{DC}$ may assist in the mounting of the tire T to the wheel W.

The non-constant diameter of the outer circumference $W_C$ of the wheel W further forms an upper "safety bead" $W_{SB}$. In an embodiment, the upper safety bead $W_{SB}$ may be located proximate the upper bead seat $W_{SU}$. In the event that pressurized air in the circumferential air cavity $T_{AC}$ of the tire T escapes to atmosphere the upper bead $T_{BU}$ may "unseat" from the upper bead seat $W_{SU}$; because of the proximity of the safety bead $W_{SB}$, the safety bead $W_{SB}$ may assist in the mitigation of the "unseating" of the upper bead $T_{BU}$ from the upper bead seat $W_{SU}$ by assisting in the retaining of the upper bead $T_{BU}$ in a substantially seated orientation relative to the upper bead seat $W_{SU}$. In some embodiments the wheel W may include a lower safety bead; however, upper and/or lower safety beads may be included with the wheel W, as desired, and are not required in order to practice the invention described in the following disclosure.

The following Clauses provide an exemplary configuration for a workpiece diverter station, a conveyor system, and methodologies for utilizing the same described above.

Clause 1: A workpiece diverter station comprising: a base frame; an X-direction workpiece transporter subassembly that is: axially fixedly supported with respect to the base frame in a Z-direction; a Z-direction lift assembly supported by the base frame; and a Y-direction workpiece transporter subassembly that is: connected to the Z-direction lift assembly; and axially movably supported with respect to the base frame in the Z-direction.

Clause 2: The workpiece diverter station of clause 1, wherein the X-direction workpiece transporter subassembly includes: at least one roller of a first plurality of proximal rollers, the at least one roller including: a proximal powered roller; at least one roller of a first plurality of distal rollers, the at least one roller including: a distal powered roller; and a plurality of intermediate rollers including: at least one passive roller.

Clause 3: The workpiece diverter station of clause 2, wherein the X-direction workpiece transporter subassembly further includes: a second plurality of proximal rollers including: at least one passive roller; and a second plurality of distal rollers including: at least one passive roller.

Clause 4: The workpiece diverter station of any of clauses 2 through 3, wherein all of: the first plurality of proximal rollers; the second plurality of proximal rollers; the first plurality of distal rollers; the second plurality of distal rollers; and the plurality of intermediate rollers are rotatably connected for synched rotation by a plurality of plurality of loop members.

Clause 5: The workpiece diverter station of any of clauses 1 through 4, wherein the Y-direction workpiece transporter subassembly includes: at least one roller of a plurality of proximal rollers, the at least one roller including: a proximal powered roller; at least one roller of a plurality of distal rollers, the at least one roller including: a distal powered roller; and a plurality of intermediate rollers including: at least one passive roller.

Clause 6: The workpiece diverter station of clause 5, wherein all of: the plurality of proximal rollers; the plurality of distal rollers; and the plurality of intermediate rollers are rotatably connected for synched rotation by a plurality of plurality of loop members.

Clause 7: The workpiece diverter station of any of clauses 1 through 6, wherein the base frame includes: at least one support beam arranged within a cavity of the base frame, wherein the Z-direction lift assembly includes: at least one axial lifter supported by the at least one support beam, wherein the Y-direction workpiece transporter subassembly is supported by the at least one axial lifter.

Clause 8: The workpiece diverter station of any of clauses 1 through 7 further comprising: a fluid source connected to at least one Z-direction lifting actuator of the Z-direction lift assembly.

Clause 9: The workpiece diverter station of clause 8, wherein the at least one Z-direction lifting actuator is an inflatable device.

Clause 10: The workpiece diverter station of any of clauses 1 through 9 further comprising: at least one motor connected to: at least one roller of the X-direction workpiece transporter subassembly.

Clause 11: The workpiece diverter station of any of clauses 1 through 10 further comprising: at least one motor connected to: at least one roller of the Y-direction workpiece transporter subassembly.

Clause 12: The workpiece diverter station of any of clauses 1 through 11 further comprising: a Y-direction workpiece guiding subassembly connected to the Y-direction workpiece transporter subassembly.

Clause 13: A portion of a workpiece diverter station comprising: a base frame; and at least one subassembly including: a plurality of rollers arranged in parallel with one another, the plurality of rollers including: a first powered roller supported by the base frame; a second powered roller supported by the base frame; at least one passive roller supported by the base frame; a plurality of loop members that rotatably connect the plurality of rollers for synched rotation; and at least one servicing access clamp plate that removably-connects at least two rollers of the plurality of rollers to the base frame.

Clause 14: The portion of the workpiece diverter station of clause 13, wherein the at least one subassembly includes: an X-direction workpiece transporter subassembly; and a Y-direction workpiece transporter subassembly, wherein the plurality of rollers of the Y-direction workpiece transporter subassembly are orthogonally arranged with respect to the plurality of rollers of the X-direction workpiece transporter subassembly.

Clause 15: The portion of the workpiece diverter station of clause 14, wherein a portion of the X-direction workpiece transporter subassembly includes: a first panel extension bracket connected to the base frame; a second panel extension bracket connected to the base frame; a plurality of intermediate rollers extending between and directly supported by the first panel extension bracket and the second panel extension bracket, wherein the at least one passive roller includes the plurality of intermediate rollers.

Clause 16: The portion of the workpiece diverter station of clause 15, wherein the at least one servicing access clamp plate includes: a first servicing access clamp plate that removably-secures a first end of each roller of the plurality of intermediate rollers to the first panel extension bracket; and a second servicing clamp plate that removably-secures a second end of each roller of the plurality of intermediate rollers to the second panel extension bracket.

Clause 17: The portion of the workpiece diverter station of any of clauses 14 through 16, wherein a portion of the Y-direction workpiece transporter subassembly includes: at least one outer bracket connected to the base frame; at least one inner bracket connected to the base frame; at least one plurality of intermediate rollers extending between and directly supported by the at least one outer bracket and the at least one inner bracket, wherein the at least one passive roller includes the at least one plurality of intermediate rollers.

Clause 18: The portion of the workpiece diverter station of clause 17, wherein the at least one servicing access clamp plate includes: a first servicing access clamp plate that removably-secures a first end of each roller of a first plurality of intermediate rollers of the at least one plurality of intermediate rollers to a first region of the at least one outer bracket; and a second servicing access clamp plate that removably-secures a first end of each roller of a second plurality of intermediate rollers of the at least one plurality of intermediate rollers to a second region of the at least one outer bracket.

Clause 19: A method for operating a workpiece diverter station of conveyor system, the conveyor system including an upstream conveyor line branch, a first downstream conveyor line branch and a second downstream conveyor line branch, the method comprising: providing a workpiece from the upstream conveyor line branch to the workpiece diverter station; receiving an input at input at a central processing unit if the workpiece should be directed from the workpiece diverter station to the first downstream conveyor line branch or the second downstream conveyor line branch; responsive to the received input, transporting the workpiece downstream of the workpiece diverter station by arranging a Y-direction workpiece transporter subassembly of the workpiece diverter station in one of two orientations including: a down orientation that is axially aligned with a X-direction workpiece transporter subassembly of the workpiece diverter station for transporting the workpiece along a first conveyor path; and an up orientation that is axially offset from and is not axially aligned with the X-direction workpiece transporter subassembly of the workpiece diverter station for transporting the workpiece along a second conveyor path that is different from the first conveyor path.

Clause 20: The method of clause 19, wherein the arranging a Y-direction workpiece transporter subassembly of the workpiece diverter station in the up orientation includes: sending a signal from the central processing unit to at least one Z-direction lifting actuator of a Z-direction lift assembly that axially offsets the Y-direction workpiece transporter subassembly from the X-direction workpiece transporter subassembly.

Clause 21: A method for servicing a portion of a workpiece diverter station, the method comprising: providing a plurality of loop members that rotatably connect a plurality of rollers for synched rotation; providing at least one servicing access clamp plate that removably-connects at least two rollers of the plurality of rollers to a base frame; determining that a loop member of the plurality of loop members is compromised; removing the at least one servicing access clamp plate from the base frame; removing some but not all of the plurality of rollers from the base frame; replacing the compromised loop member with a new loop member; and re-attaching the at least one servicing access clamp plate to the base frame.

Clause 22: The method of clause 21, wherein the removing the at least one servicing access clamp plate from the base frame includes: removing one or more fasteners that secures the at least one servicing access clamp plate to the base frame; lifting the at least one servicing access clamp plate axially away from the base frame; and discarding the compromised loop member.

Clause 23: The method of any of clauses 21 through 22, wherein after replacing the compromised loop member with a new loop member, the method further includes: arranging the new loop member upon the removed rollers of the plurality of rollers that were removed from the base frame; and re-arranging the removed rollers back upon the base frame.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A workpiece diverter station comprising:
    a base frame having a width extending in a Y-direction and a length extending in an X-direction;
    an X-direction workpiece transporter subassembly that is axially fixedly supported with respect to the base frame in a Z-direction, wherein the X-direction workpiece transporter subassembly includes a first plurality of rollers extending across the width of the base frame;
    a Z-direction lift assembly supported by the base frame;
    a Y-direction workpiece transporter subassembly that is:
        connected to the Z-direction lift assembly; and
        axially movably supported with respect to the base frame in the Z-direction, wherein the Y-direction workpiece transporter subassembly includes a second plurality of rollers extending across a length of the base frame;
    a first set of loop members that rotatably couples the first plurality of rollers; and
    a second set of loop members that rotatably couples the second plurality of rollers.

2. The workpiece diverter station of claim 1, wherein the first plurality of rollers of the X-direction workpiece transporter subassembly includes:
    at least one roller of a first plurality of proximal rollers, the at least one roller including a proximal powered roller;
    at least one roller of a first plurality of distal rollers, the at least one roller including a distal powered roller; and
    a plurality of intermediate rollers including at least one passive roller.

3. The workpiece diverter station of claim 2, wherein the first plurality of rollers of the X-direction workpiece transporter subassembly further includes:
    a second plurality of proximal rollers including at least one passive roller; and
    a second plurality of distal rollers including at least one passive roller.

4. The workpiece diverter station of claim 3, wherein the first set of loop members rotatably connects for synchronized rotation all of:
    the first plurality of proximal rollers;
    the second plurality of proximal rollers;
    the first plurality of distal rollers;
    the second plurality of distal rollers; and
    the plurality of intermediate rollers.

5. A portion of a workpiece diverter station comprising:
    a base frame; and
    at least one subassembly including:
        a plurality of rollers arranged in parallel with one another, the plurality of rollers including:
            a first powered roller supported by the base frame;
            a second powered roller supported by the base frame;
            at least one passive roller supported by the base frame;
        a plurality of loop members that rotatably connect the plurality of rollers for synchronized rotation;
        at least one servicing access clamp plate that removably-connects at least two rollers of the plurality of rollers to the base frame;
        an X-direction workpiece transporter subassembly comprising:
            a first panel extension bracket connected to the base frame;
            a second panel extension bracket connected to the base frame:
            a plurality of intermediate rollers extending between and directly supported by the first panel extension bracket and the second panel extension bracket, wherein the at least one passive roller includes the plurality of intermediate rollers; and
        a Y-direction workpiece transporter subassembly,
    wherein the plurality of rollers of the Y-direction workpiece transporter subassembly are orthogonally arranged with respect to the plurality of rollers of the X-direction workpiece transporter subassembly.

6. The portion of the workpiece diverter station of claim 5, wherein a portion of the Y-direction workpiece transporter subassembly includes:
    at least one outer bracket connected to the base frame;
    at least one inner bracket connected to the base frame; and
    at least one plurality of intermediate rollers extending between and directly supported by the at least one outer bracket and the at least one inner bracket, wherein the at least one passive roller includes the at least one plurality of intermediate rollers.

7. The portion of the workpiece diverter station of claim 6, wherein the at least one servicing access clamp plate includes:
    a first servicing access clamp plate that removably-secures a first end of each roller of a first plurality of intermediate rollers of the at least one plurality of intermediate rollers to a first region of the at least one outer bracket; and
    a second servicing access clamp plate that removably-secures a first end of each roller of a second plurality of intermediate rollers of the at least one plurality of intermediate rollers to a second region of the at least one outer bracket.

8. The workpiece diverter station of claim 1, wherein the second plurality of rollers of the Y-direction workpiece transporter subassembly includes:
    at least one roller of a plurality of proximal rollers, the at least one roller including a proximal powered roller;

at least one roller of a plurality of distal rollers, the at least one roller including:
a distal powered roller; and
a plurality of intermediate rollers including at least one passive roller.

9. The workpiece diverter station of claim 8, wherein the second set of loop members rotatably connects for synchronized rotation all of:
the plurality of proximal rollers;
the plurality of distal rollers; and
the plurality of intermediate rollers.

10. The workpiece diverter station of claim 1, wherein the base frame includes:
at least one support beam arranged within a cavity of the base frame, wherein the Z-direction lift assembly includes:
at least one axial lifter supported by the at least one support beam, wherein the Y-direction workpiece transporter subassembly is supported by the at least one axial lifter.

11. The workpiece diverter station of claim 1, further comprising:
a fluid source connected to at least one Z-direction lifting actuator of the Z-direction lift assembly.

12. The workpiece diverter station of claim 11, wherein the at least one Z-direction lifting actuator is an inflatable device.

13. The workpiece diverter station of claim 1, further comprising:
at least one motor connected to:
at least one roller of the first plurality of rollers of the X-direction workpiece transporter subassembly.

14. The workpiece diverter station of claim 1, further comprising:
at least one motor connected to:
at least one roller of the second plurality of rollers of the Y-direction workpiece transporter subassembly.

15. The workpiece diverter station of claim 1, further comprising:
a Y-direction workpiece guiding subassembly connected to the Y-direction workpiece transporter subassembly.

16. The portion of the workpiece diverter station of claim 5, wherein the at least one servicing access clamp plate includes:
a first servicing access clamp plate that removably-secures a first end of each roller of the plurality of intermediate rollers to the first panel extension bracket; and
a second servicing clamp plate that removably-secures a second end of each roller of the plurality of intermediate rollers to the second panel extension bracket.

17. A method for operating a workpiece diverter station of a conveyor system, the conveyor system including an upstream conveyor line branch, a first downstream conveyor line branch and a second downstream conveyor line branch, the method comprising:
providing a workpiece from the upstream conveyor line branch to the workpiece diverter station, the workpiece diverter station having a width extending in a Y-direction and length extending in an X-direction;
receiving an input at a central processing unit if the workpiece should be directed from the workpiece diverter station to the first downstream conveyor line branch or the second downstream conveyor line branch;
responsive to the received input, transporting the workpiece downstream of the workpiece diverter station by arranging a Y-direction workpiece transporter subassembly of the workpiece diverter station in one of two orientations including:
a down orientation that is axially aligned with a X-direction workpiece transporter subassembly of the workpiece diverter station for transporting the workpiece along a first conveyor path; and
an up orientation that is axially offset from and is not axially aligned with the X-direction workpiece transporter subassembly of the workpiece diverter station for transporting the workpiece along a second conveyor path that is different from the first conveyor path, and
wherein:
the X-direction workpiece transporter subassembly includes a first plurality of rollers extending across the width of the workpiece diverter station;
the Y-direction workpiece transporter subassembly includes a second plurality of rollers extending across a length of the workpiece diverter station;
a first set of loop members that rotatably couples the first plurality of rollers; and
a second set of loop members that rotatably couples the second plurality of rollers.

18. The method of claim 17, wherein the arranging a Y-direction workpiece transporter subassembly of the workpiece diverter station in the up orientation includes:
sending a signal from the central processing unit to at least one Z-direction lifting actuator of a Z-direction lift assembly that axially offsets the Y-direction workpiece transporter subassembly from the X-direction workpiece transporter subassembly.

19. A method for servicing a portion of a workpiece diverter station, the method comprising:
providing a plurality of loop members having a first set of loop members and a second set of loop members, wherein the first set rotatably couples a first plurality of rollers extending across a width of the workpiece diverter station, and wherein the second set of loop members rotatably couples a second plurality of rollers extending across a length of the workpiece diverter station;
providing at least one servicing access clamp plate that removably-connects at least two rollers of the first plurality of rollers or the second plurality of rollers to a base frame;
determining that a loop member of the plurality of loop members is compromised;
removing the at least one servicing access clamp plate from the base frame;
removing a set of rollers from the base frame;
replacing the compromised loop member with a new loop member; and
re-attaching the at least one servicing access clamp plate to the base frame.

20. The method of claim 19, wherein the removing the at least one servicing access clamp plate from the base frame includes:
removing one or more fasteners that secures the at least one servicing access clamp plate to the base frame;
lifting the at least one servicing access clamp plate axially away from the base frame; and
discarding the compromised loop member.

21. The method of claim 19, wherein after replacing the compromised loop member with a new loop member, the method further includes:

arranging the new loop member upon the removed rollers of the set of rollers that were removed from the base frame; and re-arranging the removed rollers back upon the base frame.

22. A portion of a workpiece diverter station comprising:
a base frame; and
at least one subassembly including:
   a plurality of rollers arranged in parallel with one another, the plurality of rollers including:
      a first powered roller supported by the base frame;
      a second powered roller supported by the base frame;
      at least one passive roller supported by the base frame;
   a plurality of loop members that rotatably connect the plurality of rollers for synchronized rotation;
   at least one servicing access clamp plate that removably-connects at least two rollers of the plurality of rollers to the base frame;
   an X-direction workpiece transporter subassembly;
   a Y-direction workpiece transporter subassembly;
wherein the plurality of rollers of the Y-direction workpiece transporter subassembly are orthogonally arranged with respect to the plurality of rollers of the X-direction workpiece transporter subassembly;
wherein a portion of the Y-direction workpiece transporter subassembly includes:
   at least one outer bracket connected to the base frame;
   at least one inner bracket connected to the base frame;
   at least one plurality of intermediate rollers extending between and directly supported by the at least one outer bracket and the at least one inner bracket, wherein the at least one passive roller includes the at least one plurality of intermediate rollers; and
wherein the at least one servicing access clamp plate includes:
   a first servicing access clamp plate that removably-secures a first end of each roller of a first plurality of intermediate rollers of the at least one plurality of intermediate rollers to a first region of the at least one outer bracket; and
   a second servicing access clamp plate that removably-secures a first end of each roller of a second plurality of intermediate rollers of the at least one plurality of intermediate rollers to a second region of the at least one outer bracket.

\* \* \* \* \*